(12) United States Patent
Hou et al.

(10) Patent No.: US 12,411,590 B2
(45) Date of Patent: Sep. 9, 2025

(54) METHOD FOR DISPLAYING MEDIA ASSET DATA AND DISPLAY APPARATUS

(71) Applicants: VIDAA USA, INC., Suwanee, GA (US); VIDAA (NETHERLANDS) INTERNATIONAL HOLDINGS B.V. VIDAA, Duiven (NL)

(72) Inventors: Qiuhao Hou, Suwanee, GA (US); Xin Zhang, Suwanee, GA (US); Huanhuan Zou, Suwanee, GA (US); Chen Sun, Suwanee, GA (US); Wenzhu Chen, Suwanee, GA (US); Xiaojie Sun, Suwanee, GA (US); Chunhui Wang, Suwanee, GA (US); Peng Li, Suwanee, GA (US); Chunyu Li, Suwanee, GA (US)

(73) Assignees: VIDAA USA, INC., Suwanee, GA (US); VIDAA (NETHERLANDS) INTERNATIONAL HOLDINGS B.V. VIDAA, Duiven (NL)

( * ) Notice: Subject to any disclaimer, the term of this patent is extended or adjusted under 35 U.S.C. 154(b) by 23 days.

(21) Appl. No.: 18/274,820

(22) PCT Filed: Jan. 28, 2022

(86) PCT No.: PCT/US2022/014278
§ 371 (c)(1),
(2) Date: Jul. 28, 2023

(87) PCT Pub. No.: WO2022/165153
PCT Pub. Date: Aug. 4, 2022

(65) Prior Publication Data
US 2024/0310973 A1    Sep. 19, 2024

(30) Foreign Application Priority Data

Jan. 28, 2021 (CN) .......................... 202110117077.7
Jan. 28, 2021 (CN) .......................... 202110117832.1
(Continued)

(51) Int. Cl.
G06F 3/0482 (2013.01)
H04N 21/431 (2011.01)
H04N 21/482 (2011.01)

(52) U.S. Cl.
CPC ....... *G06F 3/0482* (2013.01); *H04N 21/4316* (2013.01); *H04N 21/4821* (2013.01)

(58) Field of Classification Search
CPC .. G06F 3/0482; G06F 3/0483; G06F 3/04842; G06F 3/0485; G06F 3/04892;
(Continued)

(56) References Cited

U.S. PATENT DOCUMENTS 4,688,503 A    8/1987  Kato
5,337,957 A    8/1994  Olson
(Continued)

FOREIGN PATENT DOCUMENTS

CN    102687525 A    9/2012
CN    103389859 A    11/2013
(Continued)

OTHER PUBLICATIONS

First Office Action dated Jan. 10, 2024, Application No. 202110603513.1.
(Continued)

*Primary Examiner* — Cao H Nguyen
(74) *Attorney, Agent, or Firm* — ANOVA LAW GROUP, PLLC

(57) ABSTRACT

The disclosure discloses a method for displaying media asset data and a display apparatus. The method includes: receiving
(Continued)

an instruction for a selector to move to a media asset control on a primary page; if content corresponding to the media asset control is classified media assets and meets a preset condition, sending a request for previewing data, wherein the preset condition includes that when a duration that the selector is located on the media asset control reaches a preset duration or an instruction for selecting the media asset control is received, the request for previewing data is sent; receiving feedback content according to the request for previewing data from the server; and if the feedback content includes the media asset data, controlling a display to show the media asset data on the primary page.

22 Claims, 39 Drawing Sheets

(30) Foreign Application Priority Data

| | | |
|---|---|---|
| Apr. 21, 2021 | (CN) | 202110431045.4 |
| May 17, 2021 | (CN) | 202110536021.5 |
| May 27, 2021 | (CN) | 202110587568.8 |
| May 31, 2021 | (CN) | 202110603513.1 |
| Jun. 30, 2021 | (CN) | 202110736283.6 |

(58) Field of Classification Search
CPC ........... H04N 21/4316; H04N 21/4821; H04N 21/4826

See application file for complete search history.

(56) References Cited

U.S. PATENT DOCUMENTS

| | | | | |
|---|---|---|---|---|
| 8,250,614 | B1* | 8/2012 | Ellis | H04N 21/44218 725/100 |
| 2009/0189903 | A1* | 7/2009 | Imai | G06F 3/0485 345/660 |
| 2012/0026097 | A1 | 2/2012 | Gilson | |
| 2012/0203624 | A1* | 8/2012 | Curtis | H04N 21/4312 705/14.43 |
| 2013/0019263 | A1* | 1/2013 | Ferren | H04N 21/42209 725/37 |
| 2014/0333675 | A1 | 11/2014 | Nakaoka et al. | |
| 2016/0274686 | A1 | 9/2016 | Alonso Ruiz et al. | |
| 2018/0189076 | A1* | 7/2018 | Liston | H04N 21/4668 |
| 2018/0262812 | A1* | 9/2018 | Chai | H04N 21/4383 |
| 2018/0288465 | A1* | 10/2018 | Jarvis | H04N 21/41407 |
| 2018/0295421 | A1 | 10/2018 | Lim et al. | |
| 2019/0080685 | A1* | 3/2019 | Johnson, Jr. | G06Q 30/0256 |
| 2019/0394097 | A1* | 12/2019 | Ricci | G06F 16/29 |

FOREIGN PATENT DOCUMENTS

| | | |
|---|---|---|
| CN | 103530047 A | 1/2014 |
| CN | 104714735 A | 6/2015 |
| CN | 105144257 A | 12/2015 |
| CN | 105608170 A | 5/2016 |
| CN | 105630339 A | 6/2016 |
| CN | 105828119 A | 8/2016 |
| CN | 105892792 A | 8/2016 |
| CN | 107368243 A | 11/2017 |
| CN | 109656639 A | 4/2019 |
| CN | 109743605 A | 5/2019 |
| CN | 109743607 A | 5/2019 |
| CN | 109917986 A | 6/2019 |
| CN | 110058760 A | 7/2019 |
| CN | 111541929 A | 8/2020 |
| CN | 111836109 A | 10/2020 |
| CN | 112000820 A | 11/2020 |
| CN | 112051957 A | 12/2020 |
| CN | 112165641 A | 1/2021 |
| CN | 112272329 A | 1/2021 |
| EP | 2801203 A1 | 11/2014 |
| WO | 2013104005 A1 | 7/2013 |
| WO | 2020125660 A1 | 6/2020 |

OTHER PUBLICATIONS

First Office Action dated Sep. 10, 2023, Application No. 202110117077.7.

International Search Report issued in PCT/US2022/014278, mailed May 4, 2022.

English translation of Chinese Office Action issued in CN202110117832.1, mailed May 26, 2023.

English translation of Chinese Office Action issued in CN202110587568.8 mailed Nov. 18, 2022.

English translation of Chinese Office Action issued in CN202110587568.8 mailed May 12, 2023.

* cited by examiner

| Featured | Movies | TV Series | Games | VIP | Music |
|---|---|---|---|---|---|

| Section name | | | | |
|---|---|---|---|---|
| Media asset A1 | Media asset B1 | Media asset C1 | Media asset D1 | Media asset E1 |
| Media asset A | Media asset B | Media asset C | Media asset D | Media asset expansion control |
| Media asset A2 | Media asset B2 | Media asset C2 | Media asset D2 | Media asset E2 |

7201 points to the top row; 7101 points to the middle row.

Fig. 17

| Section name | | | | |
|---|---|---|---|---|
| Media asset A1 | Media asset B1 | Media asset C1 | Media asset D1 | Media asset E1 |
| Media asset A2 | Media asset B2 | Media asset C2 | Media asset D2 | Media asset E2 |
| Media asset A3 | Media asset B3 | Media asset C3 | Media asset D3 | Media asset E3 |
| Page scroller | | | | |

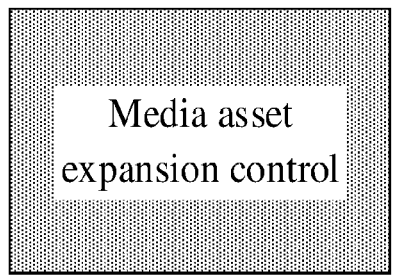 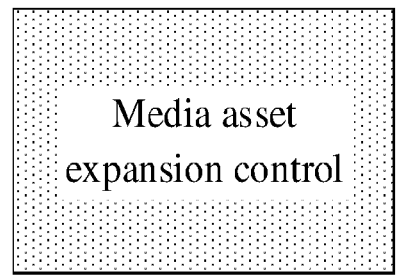
First style          Second style
Fig. 19
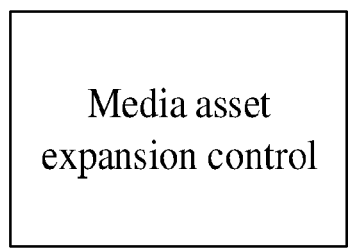 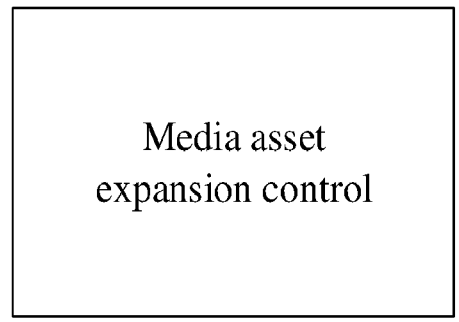
First style          Second style
Fig. 20
| Poster of a media asset A | Poster of a media asset B | Poster of a media asset expansion control |
|---|---|---|
| Title of the media asset A | Title of the media asset B | More |
Fig. 21

| Media asset A | Media asset B | Media asset expansion control |
|---|---|---|
| Title of the media asset A | Title of the media asset B | More |

METHOD FOR DISPLAYING MEDIA ASSET DATA AND DISPLAY APPARATUS

CROSS REFERENCE TO RELATED APPLICATIONS

The application is a National Stage of International Application No. PCT/US2022/014278, filed on Jan. 28, 2022, which claims priority to Chinese Patent Application No. 202110117832.1 filed on Jan. 28, 2021, No. 202110117077.7 filed on Jan. 28, 2021, No. 202110431045.4 filed on Apr. 21, 2021, No. 202110536021.5 filed on May 17, 2021, No. 202110587568.8 filed on May 27, 2021, No. 202110603513.1 filed on May 31, 2021, and No. 202110736283.6 filed on Jun. 30, 2021, the entire contents of which are incorporated herein by reference.

FIELD

The disclosure relates to display apparatuses, in particular to a method for displaying media asset data and a display apparatus.

BACKGROUND

In the related art, if media asset data belong to the same classified media asset, the classified media asset may be displayed on a primary page, and the corresponding media asset data may be displayed on a secondary page. When the media asset data need to be viewed, the media asset data may be viewed by skipping to the secondary page based on the primary page, which affects user experience.

SUMMARY

Embodiments of the disclosure provide a method for displaying media asset data and a display apparatus.

In a first aspect, embodiments of the disclosure provide a display apparatus, including: a display, configured to display a user interface; a user input interface, configured to receive an input signal; and a controller, connected with the display and the user input interface, and configured to: receive a first instruction for a selector to move to a first media asset control on a primary page displayed on the display; in response to content corresponding to the first media asset control being classified media assets and meeting a preset condition, send a request for previewing data, wherein the preset condition includes that a duration that the selector is located on the first media asset control reaches a preset duration or a second instruction for selecting the first media asset control is received through the selector when the selector is located on the first media asset control; receive feedback content returned from the server according to the request for previewing data; and in response to the feedback content including media asset data, control the display to present the media asset data on the primary page.

In a second aspect, an embodiment of the disclosure provides a method for displaying media asset data, including: receiving a first instruction for a selector to move to a first media asset control on a primary page shown on a display; in response to content corresponding to the first media asset control being classified media assets and meeting a preset condition, sending a request for previewing data, wherein the preset condition includes that a duration that the selector is located on the first media asset control reaches a preset duration or a second instruction for selecting the first media asset control is received through the selector; receiving feedback content returned from the server according to the request for previewing data; and in response to the feedback content including the media asset data, causing the display to present the media asset data on the primary page.

In a third aspect, an embodiment of the disclosure provides a display apparatus, including: a display, configured to display a user interface; and a controller, configured to: obtain at least one set of recommended media assets from a server; display a media asset recommendation interface, wherein the media asset recommendation interface includes a section list corresponding to the set of recommended media assets, the section list includes a first quantity of media asset recommendation sections and a media asset expansion control, the media asset recommendation sections are configured to display recommended media assets, and the media asset expansion control is configured to trigger display of hidden media asset recommendation sections of the section list; and in response to an operation to a media asset expansion control in a target section list, cause hidden media asset recommendation sections of the target section list to be displayed, and display more recommended media assets through the hidden media asset recommendation sections of the target section list.

In a fourth aspect, an embodiment of the disclosure provides a method for displaying media assets, including: obtaining at least one set of recommended media assets from a server; displaying a media asset recommendation interface, wherein the media asset recommendation interface includes a section list corresponding to the set of recommended media assets, the section list includes a first quantity of media asset recommendation sections and a media asset expansion control, the media asset recommendation sections are configured to display recommended media assets, and the media asset expansion control is configured to trigger display of hidden media asset recommendation sections of the section list; and in response to an operation for a media asset expansion control in a target section list, causing hidden media asset recommendation sections of the target section list to be displayed, and displaying more recommended media assets through the hidden media asset recommendation sections of the target section list.

In a fifth aspect, an embodiment of the disclosure provides a display apparatus, including: a display, configured to display a user interface; a user input interface, configured to receive an input signal; and a controller, connected with the display and the user input interface, and configured to: receive an instruction for displaying the user interface, and obtain cached data stored in a first server; if content of the cached data is less than preset full screen content, send, based on the content of the cached data, a data request to a second server to obtain display data matching the cached data in content; and receive matched content of the display data, and control the content of the cached data and the content of the display data to be displayed on the user interface.

In a sixth aspect, an embodiment of the disclosure provides a method for displaying a waterfall page, including: receiving an instruction for displaying a user interface, and obtaining cached data stored in a first server; if content of the cached data is less than preset full screen content, based on the content of the cached data, sending a data request to a second server to obtain display data matching the cached data in content; and receiving matched content of the display data, and causing the content of the cached data and the content of the display data to be displayed on the user interface.

In a seventh aspect, an embodiment of the disclosure provides a display apparatus, including: a display; and a controller, configured to: control the display to present content in a target region on a waterfall page, wherein a size of the target region is the same as a size of a display region, capable of displaying the waterfall page, on the display; and in the case that the content in the target region does not include entire content in a starting region on the waterfall page, in response to a command for moving a focus back to top from a user to the display apparatus, control the display to present the content in the starting region of the waterfall page, and, control the focus to be located on a first content available for selection in the starting region, wherein the starting region is configured to indicate a region including starting content of the waterfall page, and a size of the starting region is the same as the size of the target region.

In an eighth aspect, an embodiment of the disclosure provides a method for moving a focus to top on a display page, including: controlling a display to present content in a target region on a waterfall page, wherein a size of the target region is the same as a size of a display region, capable of displaying the waterfall page, on the display; and in the case that the content in the target region does not include entire content in a starting region on the waterfall page, in response to a command for moving the focus to top from a user to a display apparatus, controlling the display to present the content in the starting region of the waterfall page, and at the same time, controlling the focus to be located on a first content available for selection in the starting region, wherein the starting region is configured to indicate a region including starting content of the waterfall page, and a size of the starting region is the same as the size of the target region.

In a ninth aspect, an embodiment of the disclosure provides a display apparatus, including: a display, configured to display a user interface including content of a television (TV) homepage; a remote control, configured to control the display apparatus; and a controller, configured to: upon receiving a button long-press signal from the remote control, move content of the TV homepage to up by a preset offset distance at a preset time interval so that to-be-loaded objects included in the content of the TV homepage are uniformly displayed in the user interface in a scrolling manner; and after each movement of the content of the TV homepage, control a focus of the user interface to move to a to-be-loaded object, covering a lower edge of the user interface, in the content of the TV homepage via the to-be-loaded objects in sequence, and control the user interface to load and display the to-be-loaded objects the focus passing through.

In a tenth aspect, an embodiment of the disclosure provides a method for controlling loading and display content on a TV homepage, including: upon receiving a button long-press signal from a remote control, moving content on the TV homepage in a user interface up by a preset offset distance at a preset time interval so that to-be-loaded objects included in the content of the TV homepage are uniformly displayed in the user interface in a scrolling manner; and after each movement of the content of the TV homepage, controlling a focus of the user interface to move to a to-be-loaded object, covering a lower edge of the user interface, in the content of the TV homepage via the to-be-loaded objects in sequence, and controlling the user interface to load and display the to-be-loaded objects the focus passing through.

In an eleventh aspect, an embodiment of the disclosure provides a display apparatus, including: a display; and a controller, configured to: in response to a search command from a user, cause the display to present a display page including search results, wherein the search results are presented according to different resource categories, each search result includes a content title and a display image corresponding to the content title, and the content titles include search content input from the user; and the display page may expand horizontally and longitudinally to show more resource categories and to show more search results in each resource category; and in response to a command for moving a focus from the user, move a focus frame on the display page to a position of a target search result, and control the target search result to be enlarged for view.

In a twelfth aspect, an embodiment of the disclosure provides a method for processing research results on a display apparatus, including: in response to a search command from a user, causing a display to present a display page including the search results, wherein the search results are presented according to different resource categories, each search result includes a content title and a display image corresponding to the content title, and the content titles include search content from the user; and the display page may expand horizontally and longitudinally to show more resource categories and to show more search results in each resource category; and in response to a command for moving a focus from the user, causing a focus frame on the display page to move to a position of a target search result, and controlling the target search result to be enlarged for view.

In a thirteenth aspect, an embodiment of the disclosure provides a display apparatus, including: a display; and a controller, configured to: in response to a focus moving to an operation region, configure a prompt slider, wherein the prompt slider is configured to show prompt content related to the operation region; and control the display to present the prompt slider, wherein the prompt slider is configured to slide out from an edge of the display to a center of the display.

In a fourteenth aspect, an embodiment of the disclosure provides a method for prompting a message, including: in response to a focus moving to an operation region, configuring a prompt slider, wherein the prompt slider is configured to show prompt content related to the operation region; and controlling a display to present the prompt slider, wherein the prompt slider is configured to slide out from an edge of the display to a center of the display.

BRIEF DESCRIPTION OF THE DRAWINGS

FIG. 17 is a media asset expansion interface shown on a display in another embodiment.

FIG. 18 is a user interface that displays a page scroller on a display.

FIG. 19 is a schematic diagram of a media asset expansion control, a first style and a second style in an embodiment.

FIG. 20 is a schematic diagram of a media asset expansion control, a first style and a second style in another embodiment.

FIG. 21 is a schematic diagram of a template of a poster on a media asset expansion control in an embodiment.

DETAILED DESCRIPTION OF THE EMBODIMENTS

In order to make the purpose and implementation of the disclosure clearer, exemplary implementations of the disclosure will be described clearly and completely with reference to accompanying drawings in exemplary embodiments of the disclosure. Obviously, the described exemplary embodiments are only some but not all the embodiments of the disclosure.

It should be noted that brief description of terms in the disclosure is only for the convenience of understanding the implementations described below, and is not intended to limit the implementation of the disclosure. Unless otherwise stated, these terms should be understood according to their ordinary and plain meanings.

Figure 1:
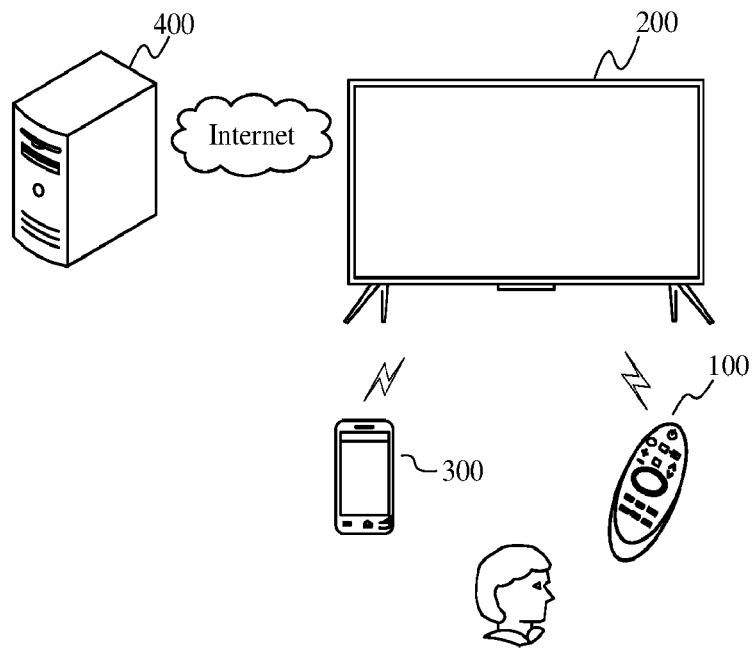
FIG. 1 is a scenario of a display apparatus according to some embodiments.

FIG. 1 is a schematic diagram of an operation scenario between a display apparatus and a control device according to an embodiment. As shown in FIG. 1, a user may operate the display apparatus 200 through a smart apparatus 300 or the control device 100.

In some embodiments, the control device 100 may be a remote control. Communications between the remote control and the display apparatus include infrared protocol communications or Bluetooth protocol communications, and other short-distance communication manners. The display apparatus 200 is controlled in a wireless or wired manner. The user may control the display apparatus 200 by inputting user commands through buttons on the remote control, voice input, control panel input, etc.

In some embodiments, the display apparatus 200 may also be controlled by using the smart apparatus 300 (for example, a mobile terminal, a tablet computer, a computer, a notebook computer, etc.). For example, the display apparatus 200 is controlled by using an application running on the smart apparatus.

In some embodiments, the display apparatus 200 may also be controlled in a manner other than the control device 100 and the smart apparatus 300. For example, the display apparatus 200 may be controlled by directly receiving a voice command from a user through a module for obtaining the voice command in the display apparatus 200, or by receiving the voice command from the user through a voice control device disposed outside the display apparatus 200.

In some embodiments, the display apparatus 200 is also in data communication with a server 400. The display apparatus 200 may be allowed to communicate via a local area network (LAN), a wireless local area network (WLAN), and other networks.

Figure 2:
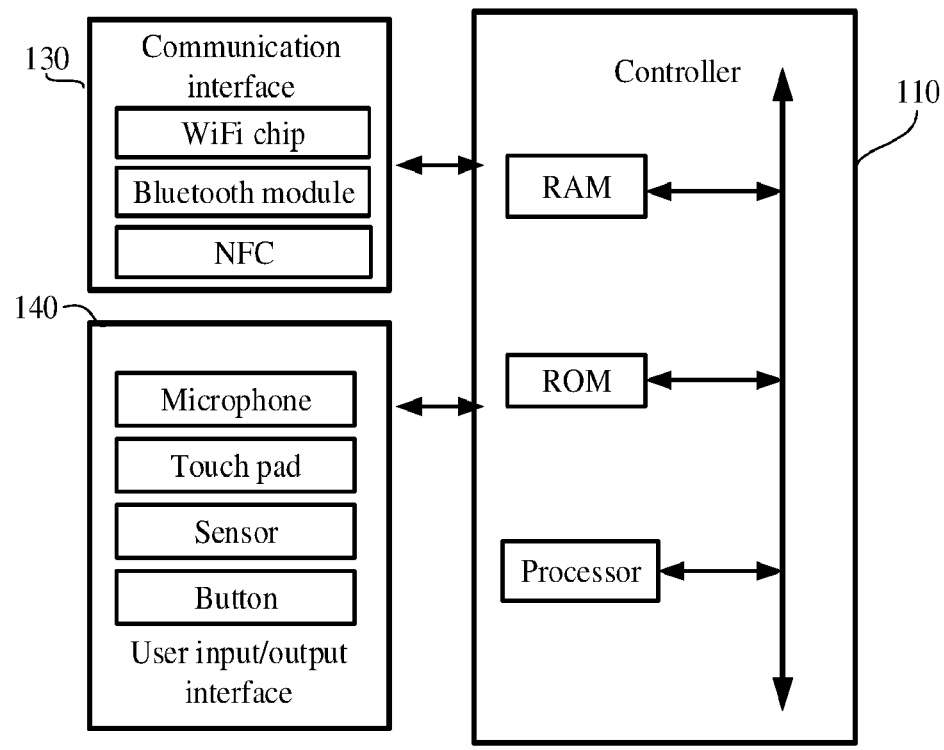
FIG. 2 is a block diagram of hardware configuration of a control device 100 according to some embodiments.

FIG. 2 is a block diagram of configuration of the control device 100 according to an exemplary embodiment. As shown in FIG. 2, the control device 100 includes a controller 110, a communication interface 130, a user input/output interface 140, a memory, and a power supply. The control device 100 may receive an operation command input from the user, and convert the operation command into an instruction that the display apparatus 200 may recognize and respond to, playing an intermediary role for interaction between the user and the display apparatus 200.

Figure 3:
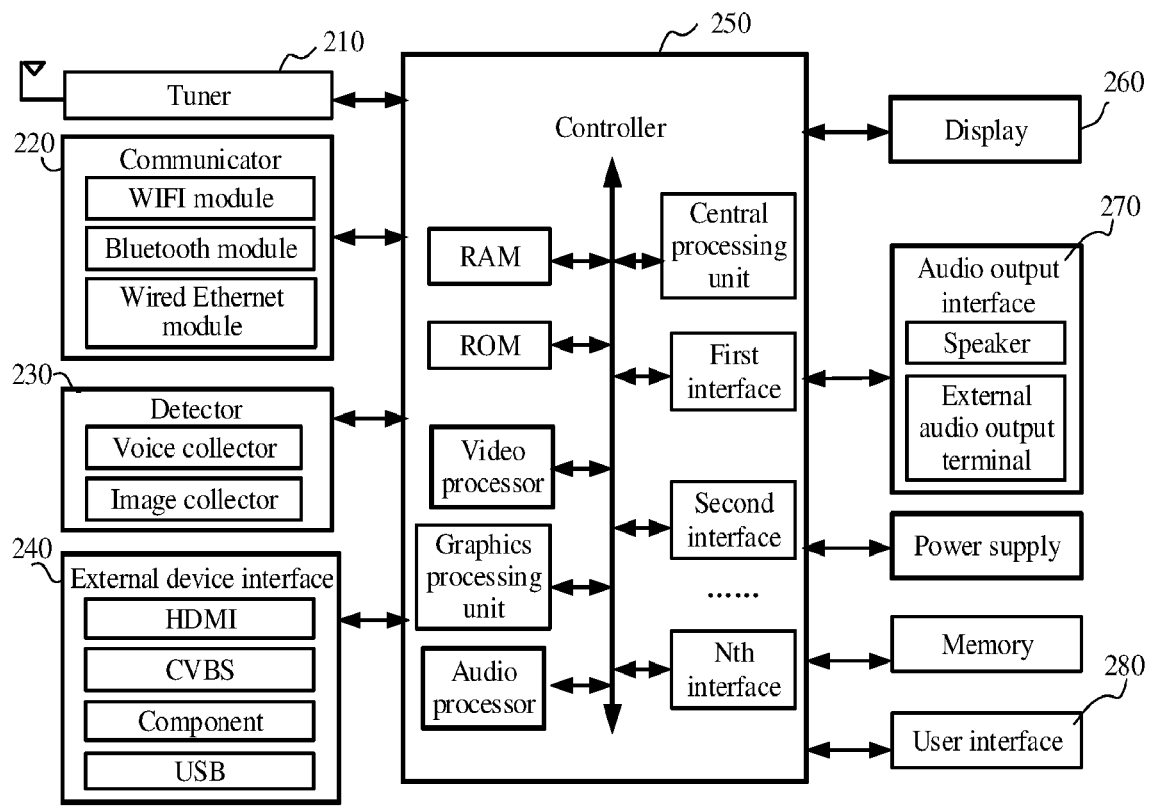
FIG. 3 is a block diagram of hardware configuration of a display apparatus 200 according to some embodiments.

FIG. 3 is a block diagram of hardware configuration of the display apparatus 200 according to an exemplary embodiment.

In some embodiments, the display apparatus 200 includes at least one of a tuner 210, a communicator 220, a detector 230, an external device interface 240, a controller 250, a display 260, an audio output interface 270, a memory, a power supply, or a user interface.

In some embodiments, the controller includes a processor, a video processor, an audio processor, a graphics processor, a RAM, a ROM, and first to nth interfaces for input/output.

Figure 4:
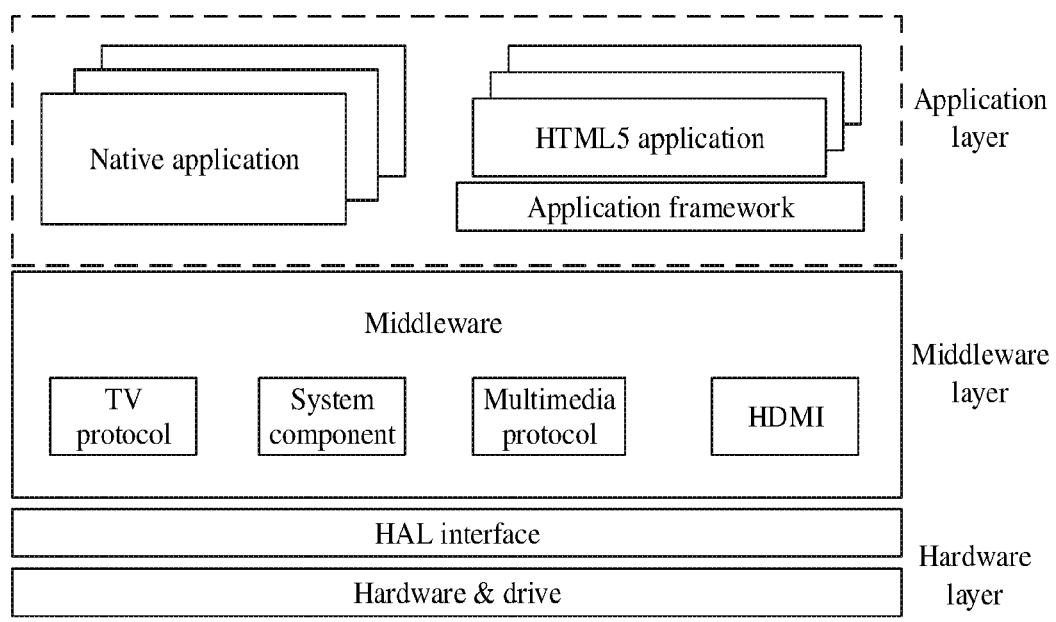
FIG. 4 is a diagram of software configuration in a display apparatus 200 according to some embodiments.

As shown in FIG. 4, a system of the display apparatus may include a kernel, a command parser (shell), a file system and one or more application. The kernel, the shell, and the file system together constitute a basic structure of the operating system, and they allow the user to manage files, run programs, and use the system. After power-on, the kernel starts, a kernel space is activated, hardware is abstracted, hardware parameters and so on are initialized, and a virtual memory, a dispatcher, signals and inter-process communications (IPCs) run and are maintained. After the kernel starts, the shell and a user application are loaded. The application is compiled into machine codes after startup, creating a process.

As shown in FIG. 4, the system of the display apparatus is divided into three layers, which are an application layer, a middleware layer and a hardware layer from top to bottom. The application layer mainly includes commonly used applications on a TV, and an application framework. The commonly used applications are mainly applications developed based on a browser, such as HTML5 APPs, and native APPs. The application framework is a complete program model, with all basic functions required by standard application software, such as: file access and data exchange, and use interfaces (toolbars, status bars, menus, dialogs) of these functions. The native APPs may support online or offline, message push or local resource access. The middleware layer includes middleware such as various TV protocols, multimedia protocols, and system components. The middleware may use basic services (functions) provided by system software to connect various parts of an application system or different applications on the network, and may achieve the purpose of resource sharing and function sharing. The hardware layer mainly includes a HAL interface, hardware and drivers. The HAL interface is a unified interface for connecting all TV chips, and a specific logic is implemented by each chip. The drivers mainly include: an audio driver, a display driver, a Bluetooth driver, a camera driver, a WIFI driver, a USB driver, an HDMI driver, a sensor driver (such as a fingerprint sensor, a temperature sensor, and a pressure sensor), a power driver, etc.

In the related art, if media asset data belong to the same classified media asset, the classified media asset may be displayed on a primary page, and the corresponding media asset data may be displayed on a secondary page. When the media asset data need to be viewed, the media asset data may be viewed by skipping to the secondary page based on the primary page, which affects user experience.

Exemplarily, the classified media asset may be displayed as variety shows on a user interface, and media asset data corresponding to the variety shows, for example, XX show and YY show, are displayed on the secondary page. It can be seen that, because the media asset data are displayed on the secondary page, the user cannot know specific content of the classified media asset from the primary page, and whether the user is interested, resulting in negative user experience.

Figure 5:
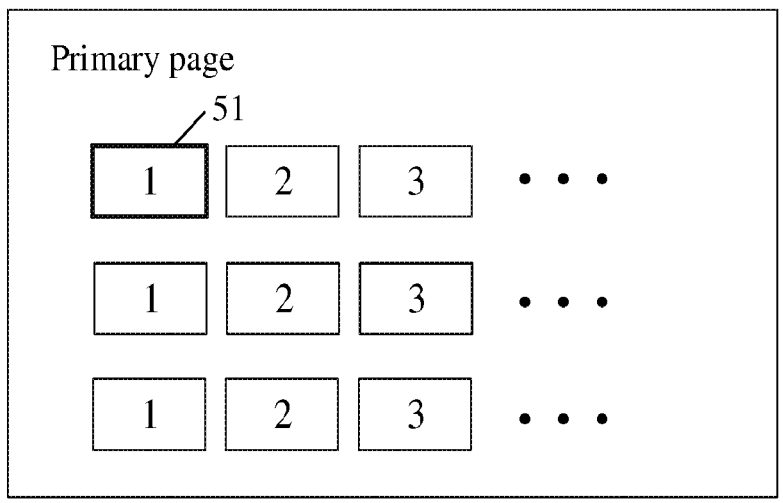
FIG. 5 is a schematic diagram of a primary page according to some embodiments.
Figure 6:
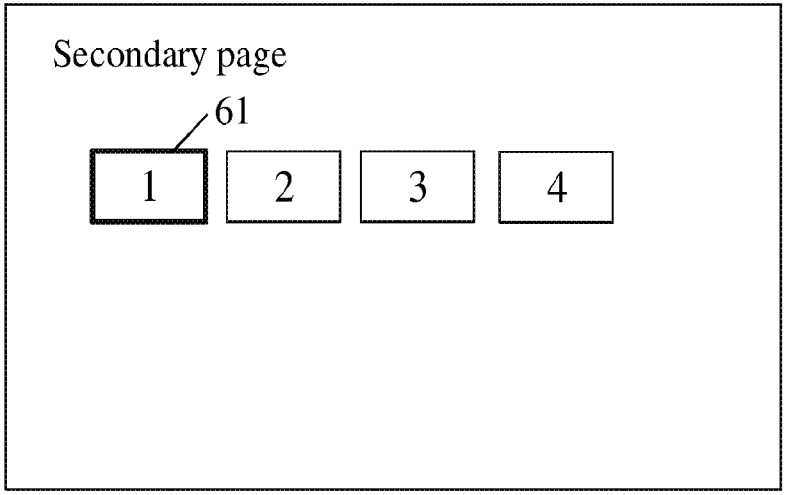
FIG. 6 is a schematic diagram of a secondary page according to some embodiments.

In the related art, a method for displaying the media asset data includes: on the primary page, upon receiving an instruction for selecting a media asset control, if content corresponding to the media asset control is the classified media asset, a request for displaying the media asset data on the secondary page is received, and if the media asset data on the secondary page are received, the display is controlled to present the secondary page. Exemplarily, the primary page is as shown in FIG. 5, and the secondary page is displayed as shown in FIG. 6.

An embodiment of the disclosure provides a method for displaying media asset data. The situation that in the related art, when media asset controls are classified media assets, media asset data corresponding to the media asset controls may be displayed by skipping to a secondary page based on a primary page can be avoided. The method of the disclosure includes the following.

An instruction for moving a selector to a media asset control is received on a primary page, and if content corresponding to the media asset control is not a classified media asset, and an instruction for selecting the media asset control is received, corresponding media asset data are played according to the media asset control. Exemplarily, the media asset control may be displayed as a name of a TV series "XXX". A user moves the selector to the "XXX" control by using a control device, and presses a confirm button on the control device, and a page plays a video of the TV series "XXX".

Figure 7:
FIG. 7 is a schematic diagram of some media asset controls on a primary page according to some embodiments.

If the content corresponding to the media asset control is the classified media asset and a preset condition is met, a request for previewing data is sent. The preset condition includes that when a duration that the selector is located on the media asset control reaches a preset duration or an instruction for selecting the media asset control is received, the request for previewing data is sent. Exemplarily, as shown in FIG. 7, some of media asset controls on the primary page are displayed on FIG. 7. In some embodiments, the media asset controls may be arranged in a row. For the convenience of description, in the embodiments of the disclosure, the media asset controls are numbered, exemplarily, denoted as 1, 2, 3, 4 . . . 7 in FIG. 7. When the selector moves to the media asset control with a numeral 1, if the duration that the selector is located on the media asset control reaches the preset duration, the request for previewing data is sent, or the selector is located on the media asset control and the user presses confirm button on the control device, the request for previewing data is also sent.

Feedback content returned according to the request for previewing data is received, and if the feedback content includes the media asset data, the display is controlled to present the media asset data on the primary page. In the embodiments of the disclosure, the media asset data are displayed on the primary page, so the problem that in the related art, it is necessary to skip to the secondary page to view the media asset data is avoided, and the media asset data corresponding to the media asset control may be presented for the user more easily and conveniently.

In some embodiments, preview data are stored in a server. The display apparatus sends the request for previewing data to the server. The server determines the feedback content according to the request for previewing data, and sends the feedback content to the display apparatus. The display apparatus receives the feedback content. In some embodiments, the feedback content includes media asset data, so the display is controlled to present the media asset data on the primary page.

However, in some embodiments, when obtaining the feedback content from the server, there may be a situation that the feedback content cannot be obtained due to network problems or other problems, or the obtained feedback content does not include the media asset data, the step of sending the request for previewing data is re-executed until the times of request sending reaches a preset number.

In some embodiments, if the media asset data fed back do not include media asset data, the display is controlled to present a prompt for a data error. Exemplarily, a prompt "something went wrong" is displayed on the user interface.

In some embodiments, the step that the display is controlled to present the media asset data on the primary page includes: the display is controlled to present a preview box, and the media asset data fed back are located in the preview box. The preview box is displayed on one side of the media asset control.

In some embodiments, the step that the display is controlled to present the preview box and the media asset data fed back are located in the preview box includes: when a quantity of the media asset data fed back is less than a preset quantity, all the media asset data are set in the preview box; and when the quantity of the media asset data is not less than the preset quantity, a portion of the media asset data are set in the preview box, and meanwhile, a control for entering the secondary page is disposed in the preview box.

Figure 8:
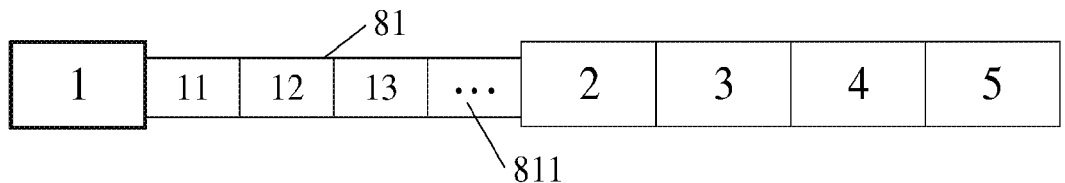
FIG. 8 is a schematic diagram of some media asset controls and preview boxes on a primary page according to some embodiments.
Figure 9:
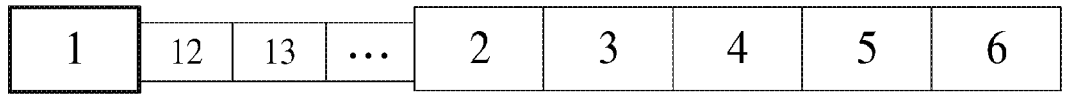
FIG. 9 is another schematic diagram of some media asset controls and preview boxes on a primary page according to some embodiments.
Figure 10:
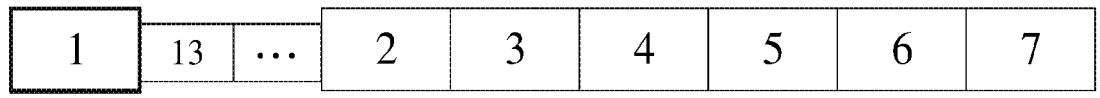
FIG. 10 is a schematic diagram of some media asset controls and preview boxes on a primary page according to other embodiments.
Figure 11:
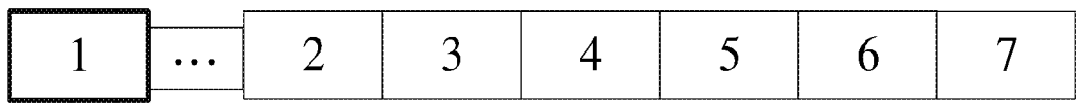
FIG. 11 is a schematic diagram of some media asset controls and preview boxes on a primary page according to still other embodiments.

Exemplary, the preset quantity may be 3, as shown in FIG. 8, the preview box is disposed on the right side of the media asset control, if the quantity of the media asset data fed back is not less than 3, first three of the media asset data fed back are displayed in the preview box 81, and a control 811 for entering the secondary page is disposed in the preview box. An instruction for selecting the first three media asset data 11, 12 or 13 displayed in the preview box 81 through the selector may be received, and in response to the instruction, the corresponding media asset data are played. In some embodiments, a height of the preview box may be smaller than a height of the media asset control. A media asset control originally adjacent to the media asset control is located on the other side of the preview box. In some embodiments, an instruction for selecting the entry control for the secondary page through the selector may be received, and in response to the instruction, the user interface is controlled to display the secondary page. The media asset data are displayed on the secondary page, for example, media asset data as shown in FIG. 6.

In some embodiments, the method further includes: when the media asset data fed back are displayed on the primary page, an instruction for selecting the media asset control corresponding to the media asset data fed back is received, and the display is controlled to display the media asset data fed back on the secondary page. Exemplarily, as shown in FIG. 8, the user moves the selector to the media asset control with a numeral 1 through the control device, and presses the confirm button on the control device, and the user interface skips to the secondary page as shown in FIG. 6.

In the embodiments of the disclosure, by selecting the control for entering the secondary page, and when the media asset data fed back are displayed on the primary page, the instruction for selecting the media asset control corresponding to the media asset data is received, the secondary page may be opened to display the media asset data. Since there are already part or all of the media asset data in the primary page, a speed for displaying the media asset data when entering the secondary page may also be higher than that of an ordinary method, which may greatly improve the user experience.

In some embodiments, the method further includes: when the media asset data fed back are displayed on the primary page, an instruction for the selector to move to a media asset control other than the media asset control corresponding to the media asset data fed back and the preview box is received, and the preview box displaying the media asset data fed back is controlled to retract. Exemplarily, as shown in FIG. 8, the user moves the selector to the media asset control with a numeral 2 through the control device, and presses the confirm button on the control device, and the preview box 81 retracts. In some embodiments, the method further includes: the displayed preview box is controlled to retract at a preset speed. Exemplarily, a process for retracting the preview box refers to FIGS. 8-11, and media asset controls on a final page are as shown in FIG. 7.

In the above embodiments, according to the method for displaying the media asset data and the display apparatus, the embodiments of the disclosure may enable the user to view the media asset data without displaying the secondary page, thereby improving the user experience. The method includes: the instruction for moving the selector to the media asset control is received on the primary page, and if the content corresponding to the media asset control is the classified media asset and the preset condition is met, the request for previewing data is sent, wherein the preset condition includes that when the duration the selector is located on the media asset control reaches the preset duration or the instruction for selecting the media asset control is received, the request for previewing data is sent; and the feedback content fed back according to the request for previewing data is received, and if the feedback content includes the media asset data, the display is controlled to display the media asset data on the primary page.

The media asset in the above embodiments may also be displayed by a display method in the following embodiments or through an interface on a display in the following embodiments.

Figure 12:
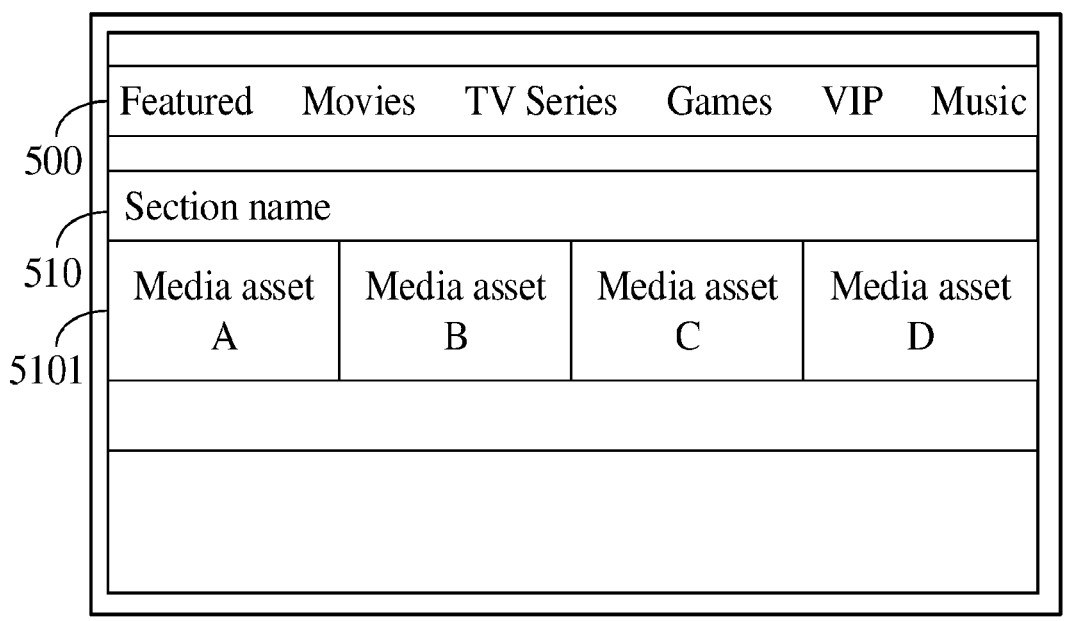
FIG. 12 is a user interface shown on a display.

FIG. 12 is an exemplary media asset recommendation interface. The media asset recommendation interface may be a media asset recommendation interface that the user enters after inputting an operation for selecting a recommended section control by clicking on the recommended section control. As shown in FIG. 12, the media asset recommendation interface includes a navigation bar 500 and a section list 510 located below the navigation bar. The section list 510 includes a certain quantity of media asset recommendation sections 5101. The media asset recommendation sections 5101 are configured to display recommended media assets, such as "media asset A" and "media asset B", etc. Content displayed in the section list 510 may change with selected controls in the navigation bar 500. When the media asset recommendation interface is displayed, the user may click on any media asset recommendation section 5101 to input a command for playing any media asset to trigger playing of the media asset. Exemplarily, after the user clicks on "media asset A" in FIG. 12, "media asset A" may be played. It should be noted that, the user may also input an operation for selecting the media asset in other manners to play the selected media asset. For example, the media asset is played by using a voice control function or a search function. However, in the process of displaying the media asset, due to the very limited quantity of media assets displayed in regular sections, the user cannot be guided to discover more recommended media assets, and may not contribute to displaying complete resources by the display apparatus, resulting in a great waste of media asset resources.

Figure 13:
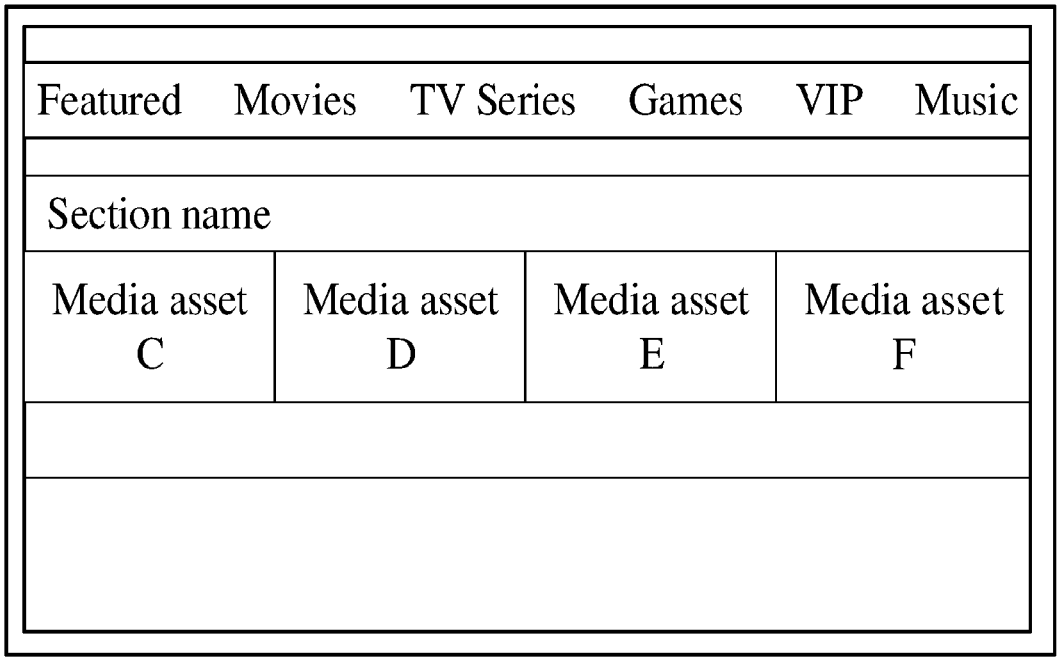
FIG. 13 is another user interface shown on a display.

More media assets are further displayed by inputting a scroll command to the section list in the media asset recommendation interface shown in FIG. 12 from the user. However, every time the user scrolls the section list once, only one more media asset is displayed. For example, FIG. 13 is an exemplary media asset recommendation interface, which may be a media asset recommendation interface obtained after the user continuously inputs the scroll command twice, and compared with the media asset recommendation interface in FIG. 12, only "media asset E" and "media asset F" are additionally displayed when the user inputs the scroll command twice, so the user may not quickly obtain desired video resources. Therefore, how to display more media assets in a section is an urgent problem that needs attention at present.

An interaction process of a user interface, displaying the recommended media assets, of the display apparatus will be illustrated below in combination with FIGS. 14 to 18.

First, the user enters the media asset recommendation interface after inputting the operation for selecting the recommended section control by clicking the recommended section control. In some embodiments, the controller may obtain at least one set of recommended media assets from the server, and themes of media assets in the same set of recommended media assets are the same. The controller displays the media asset recommendation interface according to the set of recommended media assets returned from the server. A plurality of section lists may be displayed on the interface. Different section lists correspond to different themes, and the recommended media assets in the same set of recommended media assets may be displayed in the section list of the corresponding theme. The media asset recommendation interface may further include a media asset expansion control configured to trigger display of more media assets.

Figure 14:
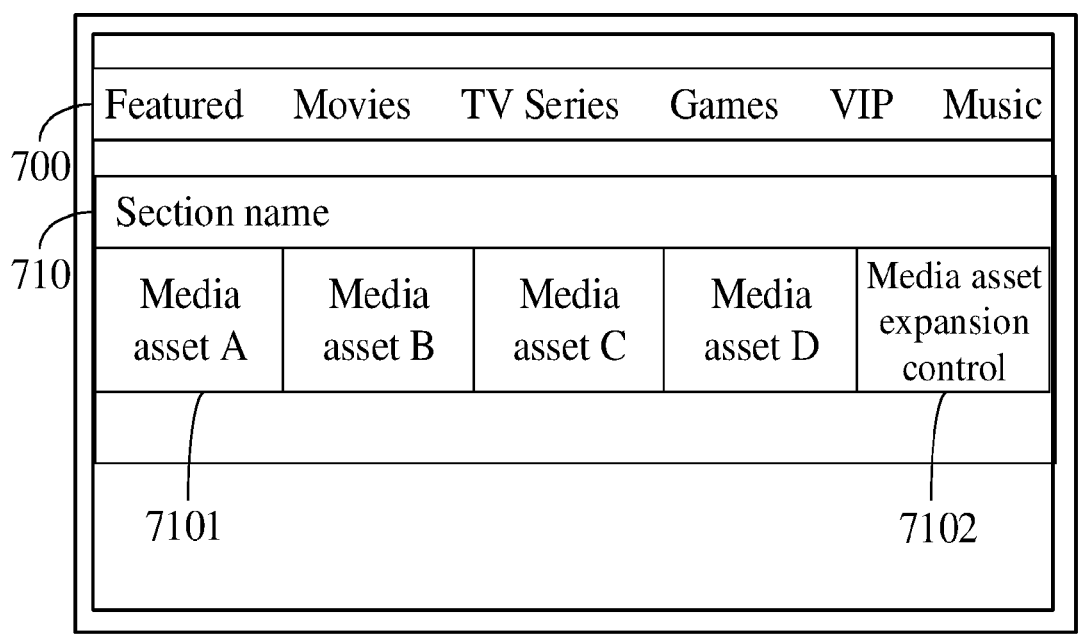
FIG. 14 is yet another user interface shown on a display.

FIG. 14 is an exemplary media asset recommendation interface including a navigation bar 700 and a section list 710 located below the navigation bar. The section list 710 includes a first quantity of media asset recommendation sections 7101 and a media asset extension control 7102. The user may click on any one of the media asset recommendation sections to input a command for playing the corresponding media asset. Exemplarily, after the user clicks on "media asset C" in FIG. 14, "media asset C" may be played. It should be noted that, the user may also input an operation for selecting the media assets in other manners to play the selected media asset. For example, the media assets may be played using a voice control function or a search function. It should be noted that the first quantity is a preset quantity, a specific value of the first quantity may be set by an operation staff, configured on the server, and issued to the display apparatus by the server, and the first quantity may also be pre-configured on the display apparatus. In FIG. 14, the value of the first quantity is 4.

Figure 15:
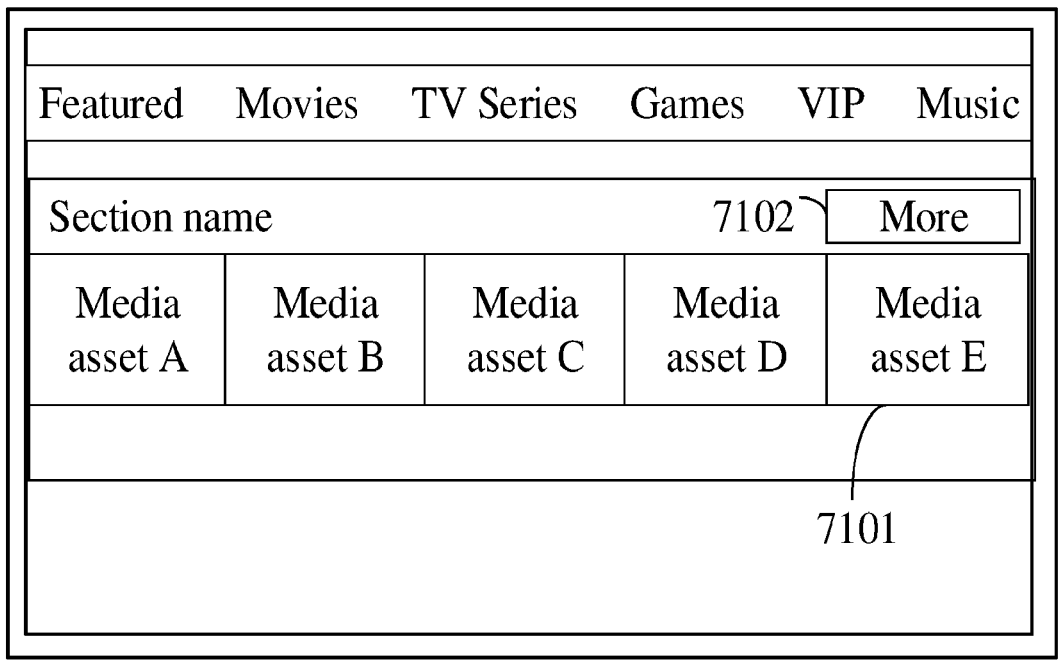
FIG. 15 is a media asset recommendation interface shown on a display.

In some embodiments, the media asset expansion control may also be shown in other forms. As shown in FIG. 15, the media asset expansion control 7102 is displayed above the rightmost media asset recommendation section 7101, and a control name may be "More".

Figure 16:
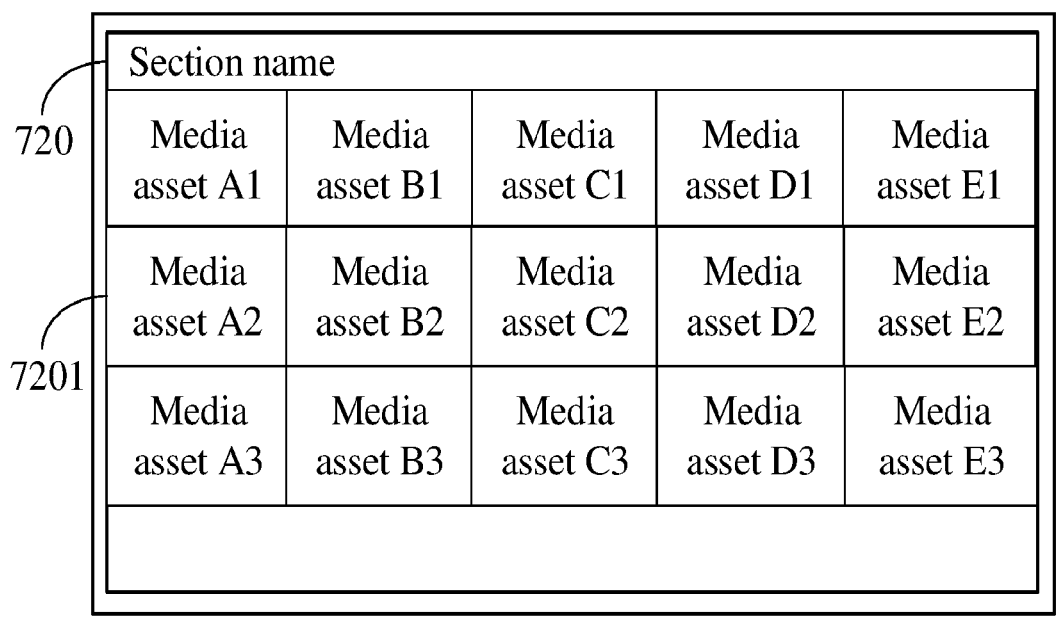
FIG. 16 is a media asset expansion interface shown on a display in an embodiment.

Then, when user inputs a command for selecting the media asset expansion control 7102, the controller may respond to the user command to display a hidden media asset recommendation section 720 of the section list 710 as shown in FIG. 16 on the display, namely, entering a next level of interface of FIG. 14. The interface includes a second quantity of media asset recommendation sections 7201, and through the second quantity of media asset recommendation sections 7201, a second quantity of media assets may be additionally displayed. It should be noted that the second quantity is a preset quantity, and a specific value of the second quantity may be set by the operation staff, configured on the server, and sent to the display apparatus by the server, and the second quantity may also be pre-configured on the display apparatus. The value of the second quantity in FIG. 16 is 15.

In some embodiments, the next level of interface of the media asset recommendation interface entered in response to the user's operation on the media asset expansion control is referred to as a media asset expansion interface.

In some embodiments, the server sends the preset quantity of recommended media assets to the display apparatus according to settings of the operation staff. In other words, the quantity of the media assets in each piece of media asset information set delivered by the server to the display apparatus is the preset quantity. The preset quantity may be greater than or equal to the first quantity, and a specific value of the preset quantity may be adjusted in real time by the operation staff according to needs. Based on this, before displaying the media asset recommendation interface, the display apparatus first determines whether the quantity of the recommended media assets in each set of recommended media assets is greater than the first quantity. If the quantity of the recommended media assets in a set of recommended media assets is greater than the first quantity, the media asset expansion control is displayed in the section list corresponding to the set of recommended media assets. If the quantity of recommended media assets in a set of recommended media assets is not greater than the first quantity, the media asset expansion control is not displayed in the section list corresponding to the set of recommended media assets.

Exemplarily, when the quantity of the media assets in the set of recommended media assets obtained by the controller from server is 5, and the quantity of the media asset recommendation sections in the section list is 8, the section list may display all the media assets in the set of recommended media assets, and the media asset expansion control is no longer displayed in the media asset recommendation interface.

As can be seen from the above example, by no longer displaying the media asset expansion control, the following situation can be avoided, like as there are too few media assets in a set of recommended media assets, other media assets may not be displayed after the user selects the media asset expansion control, which affects the user experience.

In some embodiments, the controller is also configured to: control, in response to an operation on a media asset expansion control in a target section list, a hidden media asset recommendation section of the target section list to be displayed in the media asset recommendation interface. The target section list here refers to a section list corresponding to the media asset expansion control selected by the user in the media asset recommendation interface.

Referring to FIG. 17, when the user selects the media asset expansion control, the hidden media asset recommendation sections 7201 of the section list are displayed on both sides of the media asset recommendation sections 7101 of the media asset expansion interface. By displaying the hidden media asset recommendation section 7201 on both sides of the media asset recommendation sections 7101 on the media asset recommendation interface, the user may quickly select desired media assets according to own preferences, which improves the user experience and allow the user not need to repeatedly search the same page.

In some embodiments, at least one media asset recommendation section is displayed in the media asset expansion interface, including: remaining recommended media assets in a target set of recommended media assets are displayed through the media asset recommendation section in the media asset expansion interface. The target set of recommended media assets refers to a set of recommended media assets corresponding to the section list. The remaining recommended media assets refer to recommended media assets that are not displayed in the target section list.

In some embodiments, a quantity of the media asset recommendation sections in the media asset expansion interface is the second quantity. The remaining recommended media assets in the target set of recommended media assets are displayed through the media asset recommendation sections in the media asset expansion interface includes: whether a quantity of the remaining recommended media assets in the target set of recommended media assets is less than the second quantity is determined, and if the quantity of the remaining recommended media assets is less than the second quantity, a third quantity of recommended media assets are obtained from the server, where the third quantity is a difference between the second quantity and the quantity of the remaining recommended media assets, the remaining recommended media assets and the third quantity of recommended media assets are respectively displayed in each media asset recommendation section in the media asset expansion interface.

When the quantity of the media assets in the set of recommended media assets from the server is 30, a quantity of recommendation positions in the media asset recommendation interface is 20, and the quantity of the media asset recommendation sections in the media asset expansion interface is 20, 20 media assets are displayed in the recommendation positions of the media asset recommendation interface, and after obtaining 10 media assets from the server again, 20 media assets are displayed in the media asset expansion interface, which may recommend more media assets and facilitate the user to locate the desired media assets. In this embodiment, the value of the first quantity is 20, the value of the second quantity is 20, and the value of the third quantity is 10.

In some embodiments, referring to FIG. 18, when the quantity of the remaining recommended media assets in the target set of recommended media assets is greater than the second quantity, the media asset expansion interface further includes a page scroller 7202. The controller is further configured to: display a next page of the current media asset expansion interface in response to an operation on the page scroller 7202, so as to display remaining recommended media assets not displayed in the current media asset expansion interface through media asset recommendation sections in the next page of the current media asset expansion interface.

Exemplarily, when the quantity of the media assets in the set of recommended media assets from the server is 40, the quantity of the recommendation positions in the media asset recommendation interface is 10, and the quantity of the media asset recommendation sections in the media asset expansion interface is 15, 10 media assets are displayed in the recommendation positions of the media asset recommendation interface, 15 media assets are displayed in the media asset expansion interface, and at the same time, the page scroller is displayed in the media asset expansion interface. When the user selects the page scroller, the media asset expansion interface displays the next page, and the remaining 15 media assets not displayed are displayed on the next page of the media asset expansion interface. By setting the page scroller in the media asset expansion interface, it may be effectively ensured that all the media assets in the set of recommended media assets are displayed, which is beneficial for users to search for the desired media assets and improves the user experience. In this embodiment, the value of the first quantity is 10, and the value of the second quantity is 15.

Further, when the user selects the page scroller, if a quantity of media assets not displayed on the media asset recommendation interface and the media asset expansion interface is less than the second quantity, recommended media assets of a fourth quantity is obtained from the server. The fourth quantity is a difference between the second quantity and the quantity of the media assets not displayed on the media asset recommendation interface and the media asset expansion interface. The media assets not displayed on the media asset recommendation interface and not displayed on the media asset expansion interface and the recommended media assets of the fourth quantity are displayed in the media asset recommendation sections in the media asset expansion interface.

Exemplarily, when the user selects the page scroller, the quantity of the media assets not displayed on the media asset recommendation interface and not displayed on the media asset expansion interface is 10, and the quantity of the media asset recommendation sections in the media asset expansion interface is 15, 5 recommended media assets are obtained from the server again, and the 15 media assets are displayed in the media asset recommendation sections in the media asset expansion interface. In this embodiment, the value of the second quantity is 15, and the value of the fourth quantity is 5.

It should be noted that if the recommended media assets are all displayed in the media asset recommendation sections, after the user selects the page scroller, the controller is configured to, according to the quantity of the media asset recommendation sections in the media asset expansion interface, obtain the same quantity of recommended media assets from the server, and display the recommended media assets in the media asset recommendation sections.

In some embodiments, the controller is further configured to obtain the first quantity and the second quantity from the server while obtaining the at least one set of recommended media assets from the server. The first quantity and the second quantity are preset by the operation staff, and sent to the display apparatus through the server. The controller sets the quantity of the media asset recommendation sections in the media asset recommendation interface according to the first quantity from the server, and sets the quantity of the media asset recommendation sections in the media asset expansion interface according to the second quantity from the server. The operation staff may set the quantity of the media asset recommendation sections in the media asset recommendation interface and the media asset expansion interface according to needs of different scenarios, making the media assets recommendation more flexible.

Further, if the numerical value of the first quantity from the server is less than or equal to 25, the server sets the first quantity to 25, and sends it to the display apparatus. If the numerical value of the first quantity is greater than 25, the server sets the first quantity to 25, and sends it to the display apparatus, avoiding the situation that as there are too many media asset recommendation sections in the media asset recommendation interface, too many media assets are displayed, which is not convenient for a user to search. Exemplarily, the operation staff of a certain section sets the first quantity to 40, since the numerical value of the first quantity is greater than 25, the server changes the numerical value of the first quantity to 25, and sends it to the display apparatus.

In some embodiments, the controller is further configured to: display the media asset expansion control as a first style when a focus does not stay on the media asset expansion control, and display the media asset expansion control as a second style when the focus stays on the media asset expansion control.

Exemplarily, referring to FIG. 19, when the focus selected by the user does not stay on the media asset expansion control, the first style is that the transparency of the media asset expansion control is 40%, and when the focus of the user's selection stays on the media asset expansion control, the second style is that the transparency of the media asset expansion control is 100%. By changing the transparency of the first style and the second style, a presentation effect of the media asset expansion control can be effectively highlighted, which improves the user experience.

Additionally, referring to FIG. 20, when the focus selected by the user does not stay on the media asset expansion control, the first style is that a size of the media asset expansion control is 100% that of the media asset recommendation positions, and when the focus selected by the user stays on the media asset expansion control, the second style is that the size of the media asset expansion control is 150% that of the media asset recommendation positions. By changing the sizes of the first style and the second style, the display effect of the media asset expansion control can be effectively highlighted, which improves the user experience.

In some embodiments, the media asset expansion control further includes control posters. The controller is also further configured to: obtain a scale and size of media asset posters in the set of recommended media assets, select, according to the scale and size of the media asset posters, control posters with the same scale and size as the media asset posters, and display the control posters in the media asset expansion control.

It should be noted that, because there are various kinds of media assets, the scales and sizes of the media asset posters in each set of recommended media assets may be completely different, and by setting the control posters of the media asset expansion control to be of the same scale and size, the interface can be organized, which improves the user experience.

Referring to Table 1, the control posters are provided with following templates including scales and corresponding sizes.

TABLE 1

| Template | Scale | Size |
|---|---|---|
| 1 | 16:9 | 410 px * 230 px |
| 2 | 4:3 | 306 px * 230 px |
| 3 | 1:1 | 230 px * 230 px |
| 4 | 3:4 | 290 px * 387 px |
| 5 | 2:3 | 258 px * 387 px |

Exemplarily, referring to FIG. 21 where the scale of the media asset posters is 1:1, the scale of the media asset expansion control is set to 1:1 through the template. By setting the templates for the control posters, the control posters may adapt to different section templates to meet needs different use environments.

In some embodiments, the media asset expansion control further includes a control title. The controller is further configured to: obtain a format of a media asset title in the set of recommended media assets, and set a format of the title of the media asset expansion control according to the format of the media asset title. It should be noted that the title format includes one or more of title font, color, position, or size. By setting the title of the media asset extension control to be of the same format as the media assets, the interface can be beautified, and the user experience can be improved. Exemplarily, referring to FIG. 22, the media asset titles of the media assets are centrally set below the media asset recommendation sections, and the title of the media asset expansion control is kept consistent with the format of the media asset titles, and is also centrally set below the media asset expansion control.

Figures 22, 23:
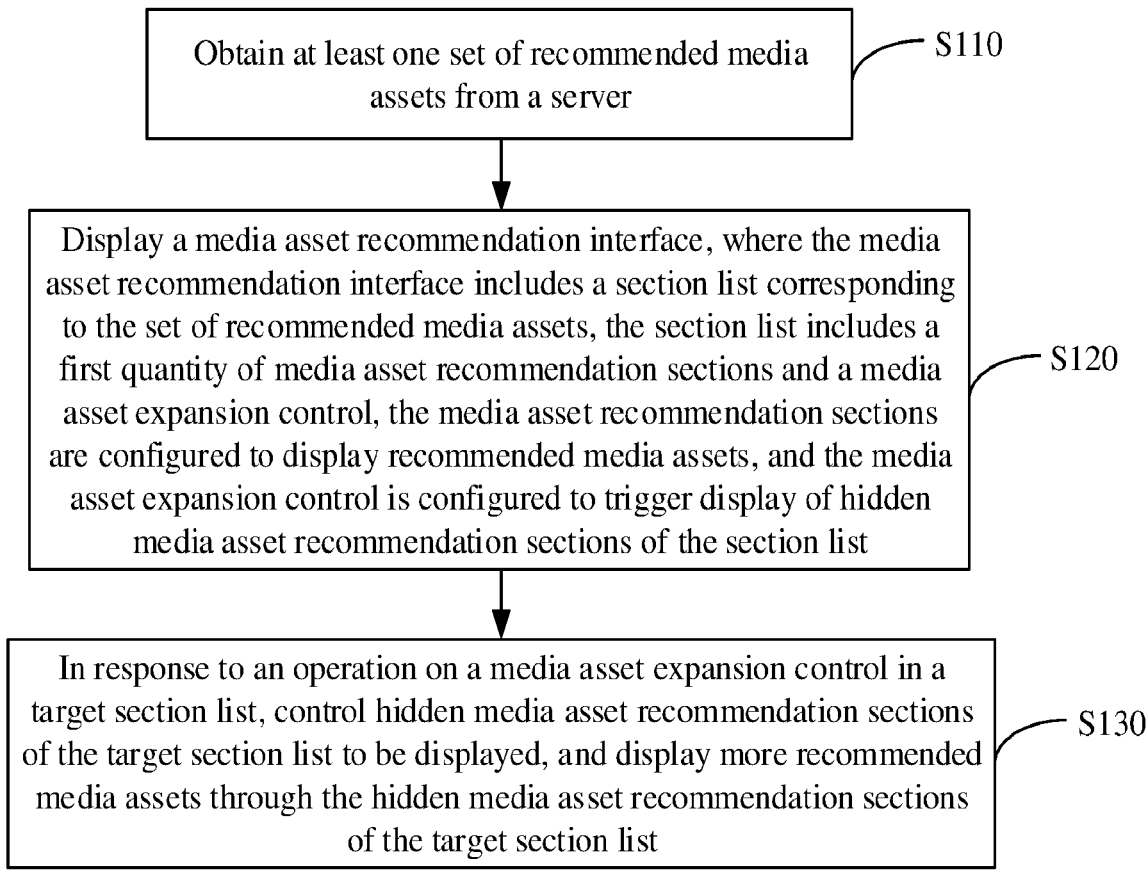
FIG. 22 is a schematic diagram of a title of a media asset expansion control in an embodiment.
FIG. 23 is a flowchart of a method for displaying media assets according to an exemplary embodiment.

Considering the above problems, the disclosure provides a method for displaying media assets. FIG. 23 is a flowchart of the method for displaying the media assets according to an exemplary embodiment of the disclosure.

As shown in FIG. 23, the method may be executed by the controller, and the method includes the following steps, but is not limited thereto.

S110: at least one set of recommended media assets is obtained from the server.

In some embodiments, the set of recommended media assets includes a specified quantity of recommended media assets, and types of the recommended media assets include: Movies, TV series, Variety Shows, News, and so on.

Exemplarily, when the display apparatus needs to obtain at least one set of recommended media assets from the server, the server generates a corresponding media asset recommendation set, and sends all recommended media assets in the media asset recommendation set to the display apparatus.

In some embodiments, the quantity of the recommended media assets is configured by the server according to the user's historical viewing data, and may also be configured by the operation staff.

In some embodiments, the server sends all the recommended media assets in the media asset recommendation set to the display apparatus in batches. The time lag issue due to sending to much data at a time may be avoided.

S120: the media asset recommendation interface is displayed. The media asset recommendation interface includes a section list corresponding to the set of recommended media assets. The section list includes a first quantity of media asset recommendation sections and a media asset expansion control. The media asset recommendation sections are configured to show recommended media assets. The media asset expansion control is configured to trigger display of hidden media asset recommendation sections of the section list.

S130: in response to an operation on the media asset expansion control in the target section list, the hidden media asset recommendation sections of the target section list are controlled to be displayed, and more recommended media assets are displayed through the hidden media asset recommendation sections of the target section list.

As can be known from the above embodiments, in the method for displaying the media assets in the disclosure, by obtaining at least one set of recommended media assets from the server, the media asset recommendation interface is displayed, the media asset recommendation interface includes the section list corresponding to the set of recommended media assets, the section list includes the first quantity of media asset recommendation sections and the media asset expansion control, the media asset recommendation sections are configured to display the recommended media assets, and the media asset expansion control is configured to trigger the display of the hidden media asset recommendation sections of the section list. In response to the operation on the media asset expansion control in the target section list, the hidden media asset recommendation sections of the target section list are controlled to be displayed, and more recommended media assets are displayed through the hidden media asset recommendation sections of the target section list. In this way, the quantity of displayed media assets is expanded in the section list through the media asset expansion control, and the user is guided to discover more media assets.

When the user interface is displayed on the display apparatus, the media asset data on the user interface are provided by media asset providers. Some media asset providers provide metadata (metaData) of the media asset data. For example, the metadata include information such as display pictures, playback addresses, and titles of one or more media assets. The media assets may be movies, TV dramas, live broadcasts, etc. Because other media resource providers do not have the right to store metadata, the provided metadata also need to be obtained in cooperation with other media asset platforms in a business model. Therefore, when the user interface is displayed and data in a data source are not sufficient to be displayed in a full screen state, not only locally cached data in a first server may be displayed, but also the data of the third-party provider that is directed to the second server may be obtained through url access request. However, in the process of obtaining third-party data, after the data are organized by a background organization system, the data need to go through a content system, namely, a content management system and a content distribution system for data search and filter, and finally, the content actually delivered to the cloud may not be sufficient to fill up the screen due to the following reasons: some of the content has expired, fields of the operation and organization content field are wrong, or the organized content has just been offline in the management system, etc., and the user intuitively feels that there is no more content to recommend below, resulting in poor user experience.

Figure 24:
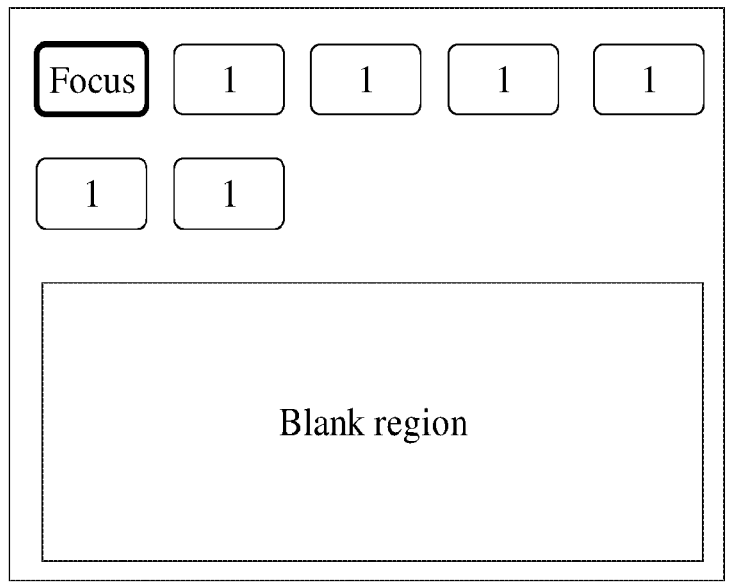
FIG. 24 is a partial schematic diagram of a user interface according to some embodiments.
Figure 25:
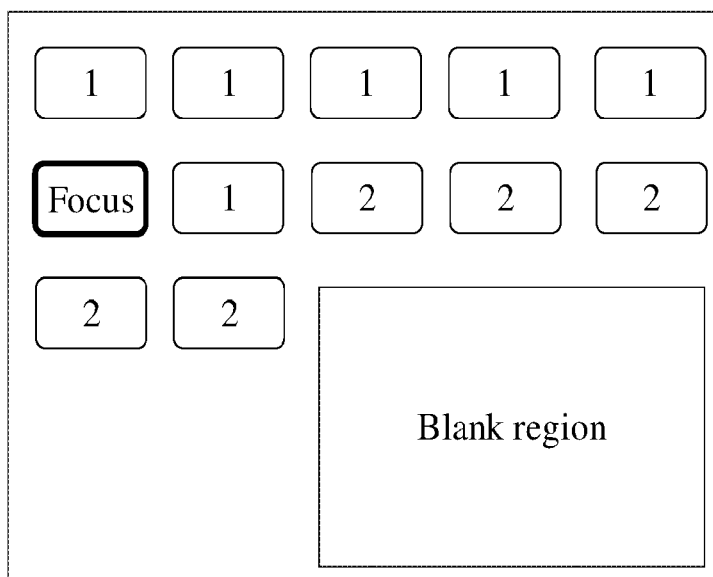
FIG. 25 is a partial schematic diagram of a user interface according to other embodiments.
Figure 26:
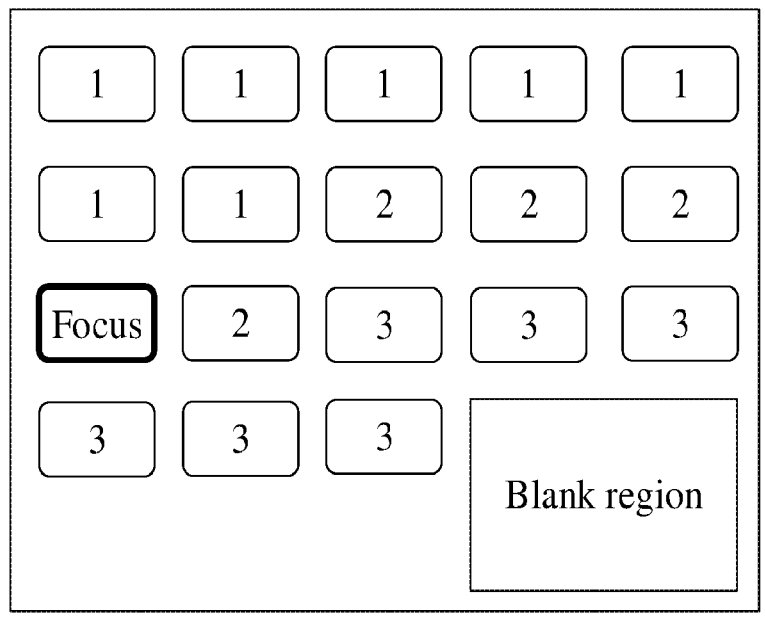
FIG. 26 is a partial schematic diagram of a user interface according to still other embodiments.
Figure 27:
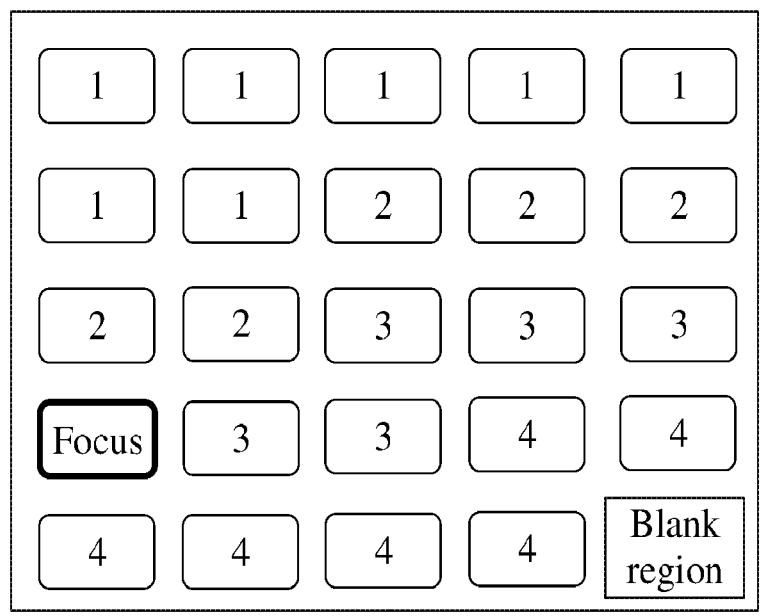
FIG. 27 is a partial schematic diagram of a user interface according to still other embodiments.

Exemplarily, on the display content when the page is started, the quantity of the issued sections triggered by the user is less and not sufficient to fill the screen, resulting in the blank region as shown in FIG. 24. When the user operates at the focus area, if the down button is pressed, the pages shown in FIG. 25, FIG. 26 and FIG. 27 may appear with the movement of the focus. Under each display page, there is a phenomenon of half screen and blank screen, which makes the user think that the display page only has the above display content, causing negative experience to the user and resulting in poor user experience.

The media assets in the above embodiments may also be implemented by a method for displaying a waterfall page in the following embodiments.

Figure 28:
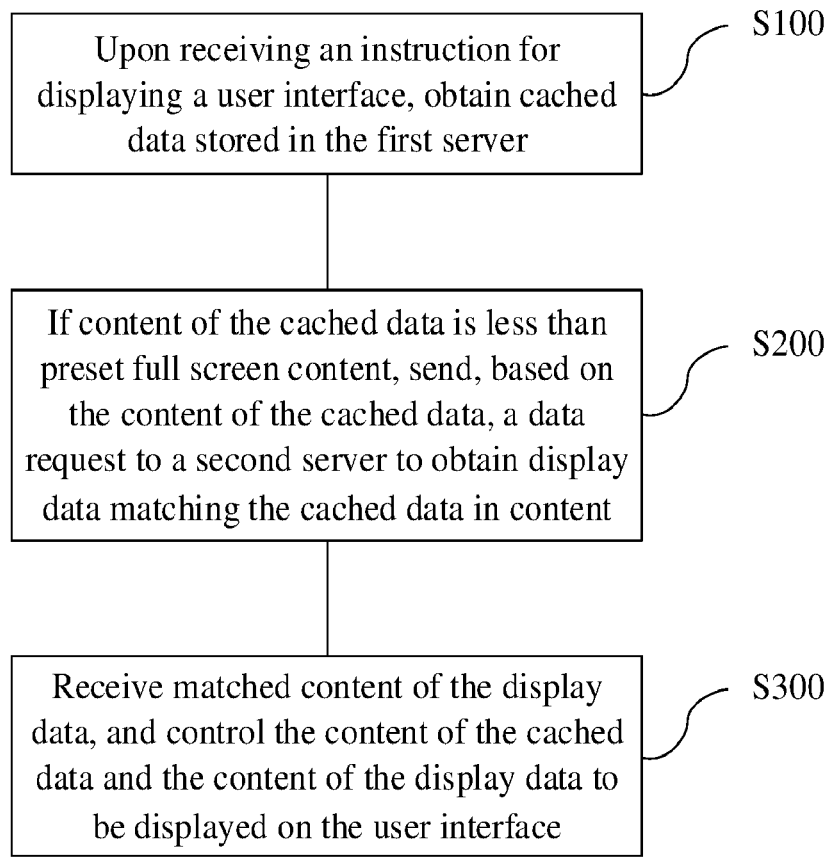
FIG. 28 is a schematic flowchart of a method for displaying a waterfall page according to an embodiment.

In view of the above issues, an embodiment of the disclosure provides a method for displaying a waterfall page. As shown in FIG. 28, the method includes the following.

S100, upon receiving an instruction for displaying a user interface, obtaining cached data stored in the first server.

In some embodiments, the instruction for displaying the user interface may be generated by operating the control device, for example, the user may move the selector to a preset application displayed on the user interface through the control device, and press the confirm button on the control device. At the moment, an instruction for displaying a homepage interface of the preset application is generated. In some embodiments, the display apparatus is powered on, and an instruction for displaying a homepage interface of a system is generated at the moment.

In some embodiments, the cached data include data with a row as a unit, and each row is a section, i.e., a multi-section waterfall display page. The quantity of media assets in a section on the display page is not constant, so it is convenient for the operation staff to configure media assets displayed by each section on the user interface, and the operation staff may set the cached data in one section according to needs.

In some embodiments, the cached data include horizontal data of the display page that may not be extended backwards, content displayed in each row is fixed, and the data may be extended downwards longitudinally, i.e., a single-section waterfall display page. The quantity of media assets displayed in each row is fixed, and the page is filled down by dropdown.

The cached data may be pictures or videos, etc.

S200, if content of the cached data is less than the preset full screen content, sending a data request, based on the content of the cached data, to the second server to obtain display data matching the cached data in content.

Exemplarily, the step that the display data matching the content of the cached data are obtained includes based on display content of the cached data, an access request for a third-party provider data corresponding to the display content of the cached data is sent to the second server through url request. For example, if the cached data are displayed as a variety show, a request for media asset data corresponding to the variety show is sent to the second server as the display data.

S300, receiving matched content of the display data, and controlling the content of the cached data and the content of the display data to be displayed on the user interface.

In some embodiments, the controller is further configured to: if the content of the cached data is not less than the preset full screen content, control the cached data to be displayed on the user interface.

In the embodiments of the disclosure, in order to avoid the half-screen or empty screen in the display interface, according to setting conditions, if the content of the cached data is not less than the preset full-screen content, the cached data are displayed on the user interface. When the content of the cached data is not less than the preset full-screen content, there will be no half-screen or empty screen problem, thereby improving the user experience.

In some embodiments, the controller is further configured to: calculate a first data length required for the full screen on the user interface and a second data length of the obtained content of the cached data according to a configuration manner of a preset interface for media resource management; and if the first data length is greater than the second data length, send the data request to the second server to obtain the display data matching the content of the cached data based on the content of the cached data.

Figure 29:
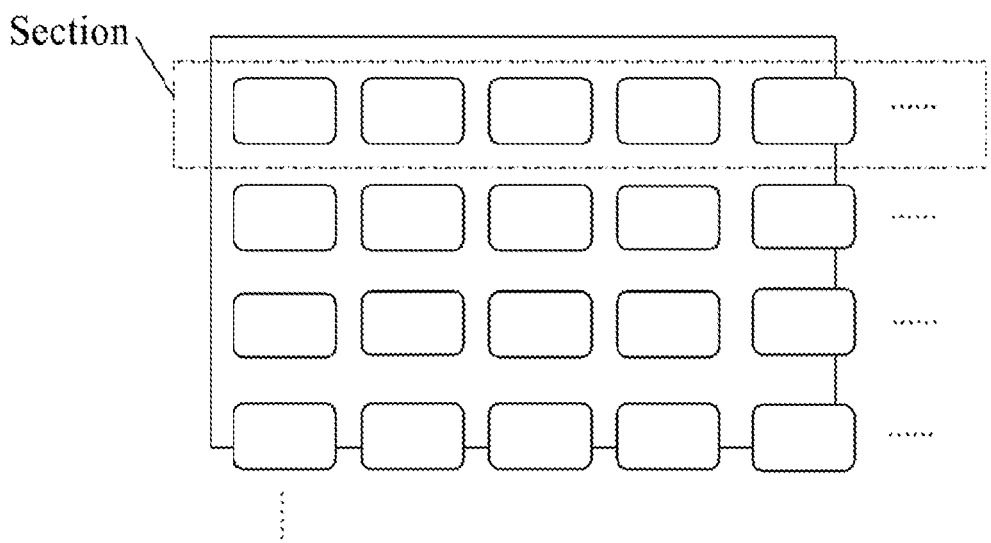
FIG. 29 is a schematic diagram of a multi-section waterfall display page according to an embodiment.

Exemplary, for the above multi-section waterfall display page, in order to realize multiple content recommendations, a terminal requests data from the cloud by requesting page by page, that is, each request only obtains the display content of one page, if more content needs to be displayed, a request will be issued again. A page described here is generally a quantity of sections agreed upon between the cloud and the terminal, and a value thereof may be configured by an operation manager. For example, according to a design effect of UE, the quantity of sections on one page is set to be 4, that is, the configuration manner of the preset interface for media asset management is that the quantity of sections displayed on one page is 4. When an application page starts and content of a first page is obtained, an expected effect is that the operation manager configures 4 rows of sections, and the terminal requests for 4 rows of sections to fill the screen, as shown in FIG. 29.

After the content of the first page is obtained, whether the quantity of the obtained sections is 4 is determined. If the quantity of the obtained sections is less than 4, a request continues for the next page. After data are returned, if the data are still less than the full screen, a request continues until the screen is full.

After a first screen is full, the user scrolls down to view content of a next screen, and initiates a cloud request for data of the next page. At this time, whether content returned this time is a full screen is determined. If not, a request is automatically sent again.

Whether one screen is full refers to: whether the request for the first page is 4 sections needs to be determined. In the drop-down process of a waterfall, it is unnecessary to perform automatic acquisition.

If the first data length is not greater than the second data length, the cache data are controlled to be displayed on the user interface.

Exemplarily, if the first data length is not greater than the second data length, it indicates that display content of a current page is sufficient for full-screen display, so the cached data are directly displayed on the user interface without sending the data request to the second server.

In some embodiments, the controller is further configured to: receive an instruction for moving a focus to the media asset control on the user interface; if a preset condition is met, send a data request for obtaining the display data matching the content of the cache data to the second server. The preset condition includes that when the focus is located at a specific area of the media asset control or a duration that the focus is located on the media asset control reaches a preset duration, a request for previewing data is sent to the second server.

The focus is configured to indicate that any one of controls has been selected. In one aspect, according to the user's input through the control device, a focus object displayed on the display apparatus may be controlled to move to select or control a control. For example, the user may control the movement of the focus object between the controls through direction buttons on the control device so as to select and control a control. In another aspect, according to a user's input through the control device, each control displayed in the display apparatus may be controlled to move to do the focus object selection or control a control. For example, the user may control the controls to move left and right together through the direction buttons on the control device so as to make the focus object selection and control a control while keeping the position of the focus object unchanged. Identification forms of the selector are usually diverse. Exemplarily, data in FIG. 27 display that an entry control may identify the position of the focus object by changing the border, size, color, transparency and outline and/or font of text or image of a focus control, and the position of the focus object is realized or identified by setting a background color for the control.

Exemplarily, taking the multi-section waterfall display page in FIG. 29 as an example, in the drop-down process of the waterfall, the focus is always on the last row of the screen. The controller is configured to monitor the position of the page focus. Every time the user performs a drop-down operation on the penultimate row of displayed data on the whole existing page, a control instruction for requesting the next page may be triggered, and the request for previewing data may be sent to the second server, thereby avoiding a half-empty screen.

Or, the controller is configured to trigger, when the duration that the focus is located on the last row of the screen reaches the preset duration, the control instruction for requesting the next page.

Figure 30:
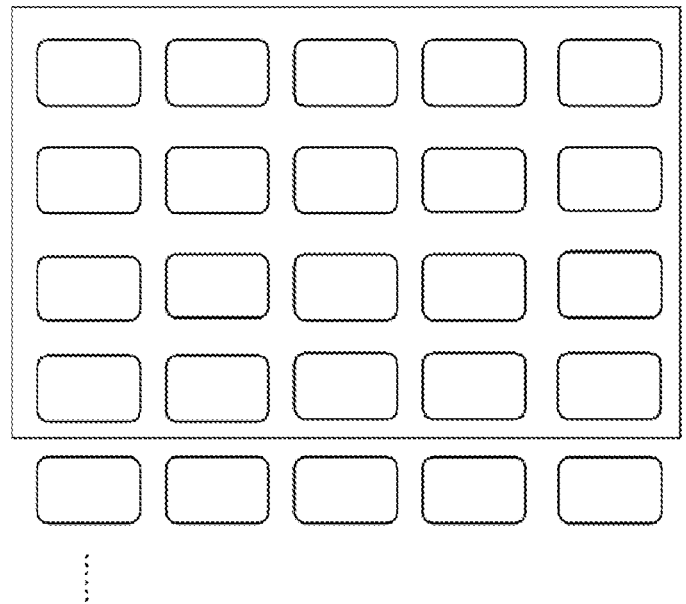
FIG. 30 is a schematic diagram of a single-section waterfall display page according to an embodiment.

Exemplarily, as shown in FIG. 30, FIG. 30 is a schematic diagram of the above single-section waterfall display page, in the configuration manner of this media asset management interface, the requested data content is equivalent to one row of sections of a multi-section page, and when the requested content is arranged, the quantity of each row is fixed and does not exceed the range of the right side of the screen.

The quantity of recommended data in a single section is very large, and in order to provide a fast display experience for user, a page-by-page request is also adopted. That is, every time a data request is issued, the quantity of data requested is configured by an operation staff. For example, the maximum quantity of delivery and configuration of each page is configured to be 25.

Like the multi-section page, there are also some scenarios that may cause failures like the following scenarios.

After the configured content is obtained, filtered and delivered by a content system, content finally sent to the terminal may be filtered out due to deletion of media assets from the system, field configuration errors, etc.

When data are obtained and delivered from third-party data, the quantity is uncontrollable.

All of the above scenarios may lead to a poor display effect, an unfilled screen, and poor user experience.

Based on this, different from the multi-section display page, a single-section display page has different determinations and standards for whether a screen is full.

In the single-section page display, as to whether one screen is full, whether data of the last row covers the entire row also needs to be determined except that the bottom row of the screen has data. In order to ensure a better display effect, a controller is configured to monitor the position of the page focus, and when the focus moves to the penultimate row of currently existing data, more content is requested for filling. The operation includes the following.

Upon receiving an instruction for displaying a user interface, obtaining cached data stored in a first server.

A first data length required for the full screen on the user interface and a second data length of the obtained content of the cached data are calculated according to a configuration manner for a preset interface for media resource management.

Whether the last row of the data obtained covers the last display position of the screen is determined according to the first data length and the second data length.

If the last row of the data obtained covers the last display position of the screen, the cached data are controlled to be displayed on the user interface.

If the last row of the obtained data does not cover the last display position of the screen, a data request is sent to a second server based on the content of the cached data to obtain display data matching the cached data in content.

The matched content of the display data is received, and the content of the cache data and the content of the display data are controlled to be displayed on the current user interface.

In some embodiments, the controller is further configured to: if the matched content of the display data is not received, control the display to display a prompt for a data error or retry on the user interface.

Figure 31:
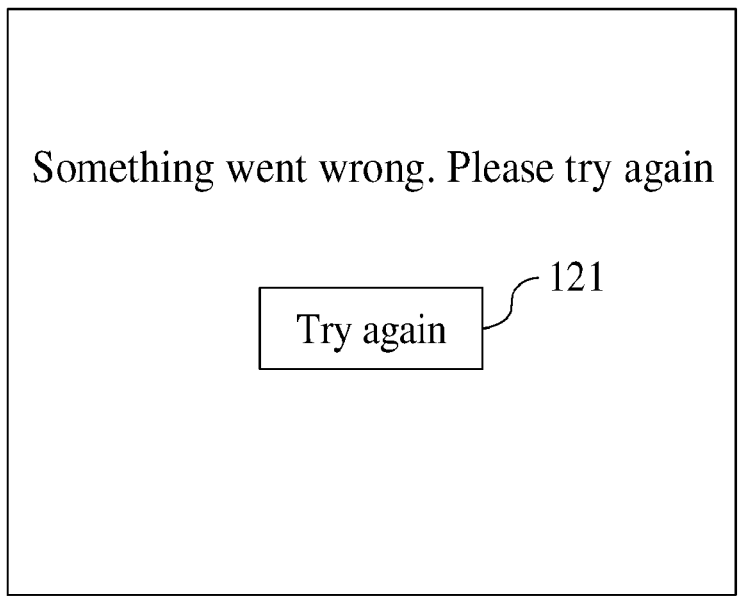
FIG. 31 is a schematic diagram of a user interface according to some embodiments.

Exemplarily, a prompt "Something went wrong. Please try again" is displayed on the user interface. Exemplarily, a retry control 121 is shown in FIG. 31.

In some embodiments, the controller is configured to control the cached data to be displayed on the user interface according to the following steps.

According to a configuration manner for a preset interface in media resource management, a preset quantity of display positions are reserved on the user interface, and the cached data are displayed at display positions.

In some embodiments, the controller is further configured to: if no display data matching the cached data in content is obtained from the second server, if data displayed on the current user interface is empty, control the user interface to display a prompt "Try again"; and if the data displayed on the current user interface is not empty, stop sending the data request, controlling the user interface to display current content, and relocate the position of the focus. In the embodiments of the disclosure, since no display data matching the cached data in content is obtained from the second server, the entire user interface changes, and thus the position of the focus displayed on the user interface also needs to be relocated.

In some embodiments, the configuration manner for the preset interface in media resource management includes: a manner for configuring a data page with a variable quantity of media assets and a manner for configuring the data page with a fixed quantity of media assets, i.e. a manner of multi-section page display and a manner of single-section page display.

An embodiment of the disclosure further provides a method for displaying a waterfall page. The method includes: receiving an instruction for displaying a user interface, obtaining cached data stored in a first server; if content of the cached data is less than preset full screen content, sending a data request for obtaining display data matching the cached data in content, based on the content of the cached data, to a second server; and receiving matched content of the display data, and controlling the content of the cached data and the content of the display data to be displayed on the user interface.

According to the method for displaying the waterfall page of the embodiments of the disclosure, a first data length required for a full screen on the user interface and a second data length of the obtained content of the cached data are calculated according to a configuration manner for a preset interface in media resource management.

If the first data length is greater than the second data length, the data request is sent, based on the content of the cached data, to the second server to obtain the display data matching the cached data in content.

If the first data length is not greater than the second data length, the cache data are controlled to be displayed on the user interface.

In the above embodiments, the method for displaying the waterfall page and the display apparatus are provided. The problem that the content in the waterfall display page is not sufficient to fill the screen, resulting in poor user experience may be alleviated. The method includes: receiving an instruction for displaying the user interface, obtaining the cached data stored in the first server; if the content of the cached data is less than the preset full screen content, sending the data request, based on the content of the cached data, to the second server to obtain the display data matching the cached data in content; and receiving the matched content of the display data, and controlling the content of the cached data and the content of the display data to be displayed on the user interface.

The embodiments of the disclosure provide a display apparatus, including a memory, a processor, and computer instructions stored on the memory and configured for running on the processor. The processor is configured to implement steps of any one of the above methods for displaying the waterfall page when executing the instructions.

The embodiments of the disclosure provide a computer-readable non-transitory storage medium on which computer instructions are stored. The instructions are executed by a computer to implement steps of any one of the above methods for displaying the waterfall page.

In a display apparatus 200, a more popular waterfall type page layout is added. In the waterfall type page layout, a user may only see content of one display page on which one or more rows of content may be displayed. The display page may continuously expand down or up to new pages to display more rows of data and content. When a display page currently displayed by the display apparatus 200 is a home page, the user may obtain new display data continuously only by controlling a focus on the display page to move down, and the new display data may be added to the end of the current home page. If the focus keeps moving down, a second page, a third page, and so on may be added continuously as display pages.

At present, for a mobile terminal, such as a mobile phone, a function of one-key back to the top has been realized in applications on it. For example, an icon for back to the top is displayed on a page, and the user may touch or click it. Or, on a PC side, the user may click the icon with a mouse. However, for other large display apparatuses 200, such as a TV, it is relatively difficult to perform touch operations on a screen, and a mouse or the like cannot be used. In addition, in order to realize the above function for back to the top in a display apparatus 200 such as a TV, a logic to be designed inside the display apparatus 200 is also relatively complex. Therefore, large display apparatuses 200 on the market, such as TVs, have not yet realized the function of back to the tip by a click.

For the above large display apparatus 200, such as a TV, the focus on the display page may only move up and down, and left and right. When data on the display page are sufficient and the display page is divided into multiple pages for display, if the user wants to cause the focus dropped down to the bottom of the last page back to the top of the home page, the user may only control the focus to move up row by row until it moves to the top of the home page. Obviously, the operation step for moving the focus to the top is relatively inconvenient and time-consuming, which may lead to poor user experience.

In view of inconvenience caused by the above traditional manner for backing the focus to the top of the home page, for the waterfall display page in the above embodiments, the display apparatus 200 in the embodiments of the disclosure may display a prompt or floating window for moving a focus to the top by one operation on the waterfall display page for the user, and the user may perform an operation according to the prompt or floating window, so that the focus may be directly located at starting content on the waterfall page through the user's one key control, therefore there is no need for the user to use the traditional manner of moving the focus step by step.

In order to facilitate the illustration of the manner for moving the waterfall page and the focus in the embodiments of the disclosure, the content on the waterfall page is displayed in order in rows and columns, that is, a displayed waterfall page may include several rows of content, and each row also includes several content. Moreover, the content in each row is content available for selection that may be located by the focus.

Figure 32:
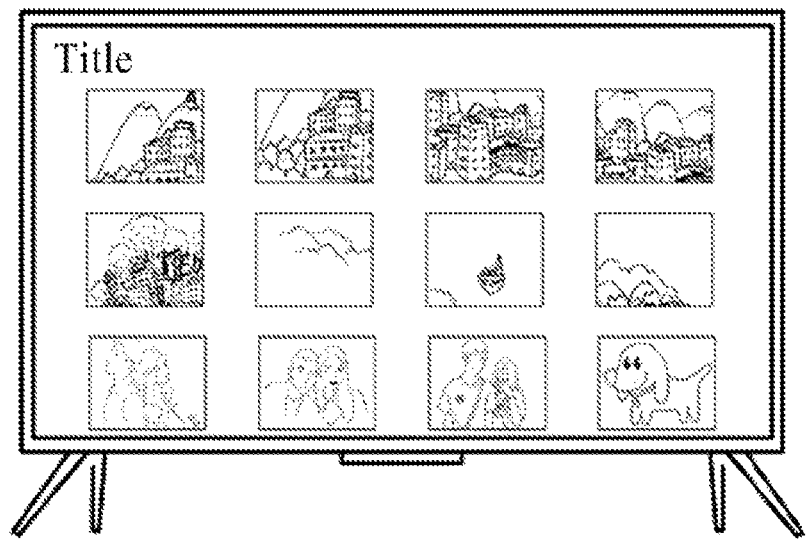
FIG. 32 is a first schematic diagram of a waterfall page on a display apparatus 200 according to some embodiments.
Figure 33:
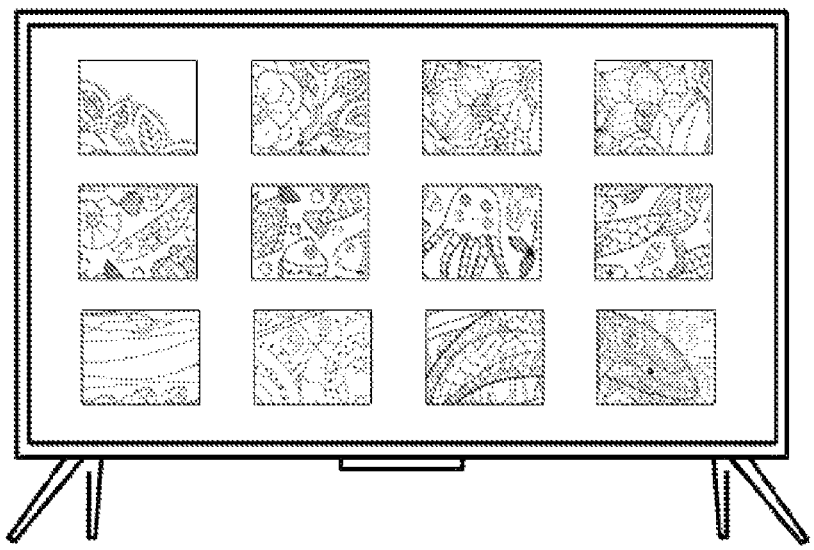
FIG. 33 is a second schematic diagram of a waterfall page on a display apparatus 200 according to some embodiments.

FIG. 32 is a first schematic diagram of the waterfall page on the display apparatus 200 according to some embodiments. As shown in FIG. 32, the waterfall page currently includes a title and some resource content or applications under the title. Usually, the starting page of the waterfall page includes the title, but as the page is scrolled, when brand new content is displayed on the waterfall page, the current page does not include the title. FIG. 33 is a second schematic diagram of the waterfall page on the display apparatus 200 according to some embodiments. As shown in FIG. 33, when the brand new content is displayed on the same waterfall page, the title or the like for representing display content of the waterfall page may not be displayed, and only some resource content or applications are displayed.

In the embodiments of the disclosure, in order to distinguish each page including different content after scrolling on the waterfall page, a region where the title and starting content are displayed on the waterfall page as shown in FIG. 32 may be divided into a starting region. Entire content that may be displayed by the display apparatus 200 is included in the starting region. When the content the user selects is in the current starting region, the waterfall page may not be page scrolled. When the content the user selects is not in the current starting region, the user may control the focus to move down so as to control the waterfall page to scroll down to display new content.

In the above focus moving process, the user may control a move direction of the focus by pressing direction buttons on the control device 100 such as a remote control. The operation of the user pressing a direction button may be regarded as inputting a command for moving the focus to the display apparatus 200. In the focus move process, the controller 250 of the display apparatus 200 may be configured to: first, receive the command for moving the focus in the display apparatus 200 from a user; then, in response to the command for moving the focus, determine whether the focus moves out of the starting region; and in the case where the focus moves out of the starting region, scroll down the waterfall page so that new content is displayed in a target region on the waterfall page.

Figure 34:
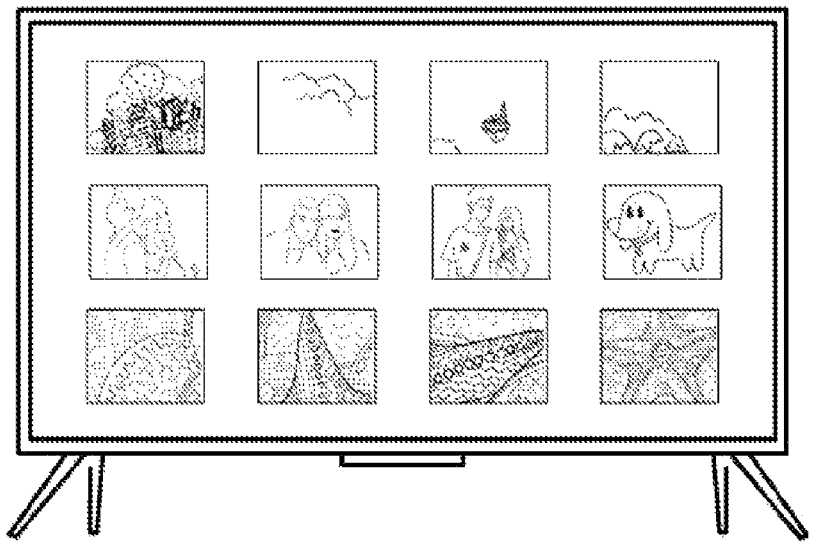
FIG. 34 is a third schematic diagram of a waterfall page on a display apparatus 200 according to some embodiments.

FIG. 34 is a third schematic diagram of the waterfall page on the display apparatus 200 according to some embodiments. As shown in FIG. 34, when the user controls the focus to move down one row from the last row of the starting region as shown in FIG. 32, content of a new row may be displayed on the waterfall page, and since the display region is not changed, the content and the title in the starting row may both disappear. It can be seen that new content is displayed on a current waterfall page, and in order to distinguish it from the starting region, a current region displaying the new content may be referred to as a target region. If the user finds the content that he wants to select in the new row in FIG. 34, the user may directly control the focus to move for locating. If the user does not find the content that he wants to select in the new row in FIG. 34, the user may continue to control the focus to move down so as to control the waterfall page to continue to scroll down to display content of a new row, and content of a first row in FIG. 34 will also disappear. At this time, a region including new content may also be referred to as a target region.

In the focus move process within the target region, the controller 250 of the display apparatus 200 may also be configured to: first, receive the command for moving the focus in the display apparatus 200 from a user; then, in response to the command for moving the focus, determine whether the focus moves out of the target region; and in the case where the focus moves out of the target region, continue to scroll down the waterfall page so that new content is displayed in the new target region on the waterfall page.

In some embodiments, when the user does not find the target content in the current target region, the user may also re-control the waterfall page to scroll up so as to redisplay content that disappears before. A region including the redisplayed content displayed after scrolling up may also be referred to as a target region. In this process, the controller 250 of the display apparatus 200 may also be configured to: in the case where the focus moves out of the target region, scroll up the waterfall page so that new content is displayed in the new target region on the waterfall page.

In the embodiments of the disclosure, there may be a plurality of target regions in addition to the starting region, and the target regions may include part of content in the starting region or may not include the content in the starting region. In addition, a size of the starting region is the same as a size of the target regions.

Figure 35:
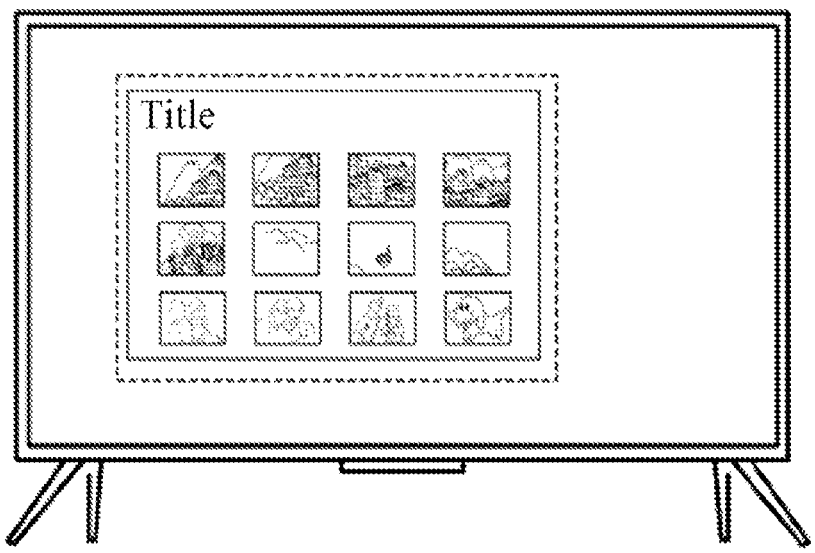
FIG. 35 is a fourth schematic diagram of a waterfall page on a display apparatus 200 according to some embodiments.

FIG. 35 is a fourth schematic diagram of the waterfall page on the display apparatus 200 according to some embodiments. In some embodiments, as shown in FIG. 35, there may also be a situation where the display apparatus 200 does not display the waterfall page in a full screen. In this case, a region that displays the title and the starting content on the waterfall page displayed on the display apparatus 200 may still be divided as the starting region, for example, a region in the dotted box in FIG. 35. Besides, when new content is displayed in the region, the region becomes the target region again.

As described above, when the target region appears, it indicates that an operation similar to page turning has occurred on the waterfall page. At this time, if the user wants to relocate the focus in the target region to a starting position of the waterfall page, the display apparatus 200 in the embodiments of the disclosure also provides the user with a function of moving the focus back to top by one operation, so as to avoid using the above traditional manner of moving the focus step by step.

Figure 36:
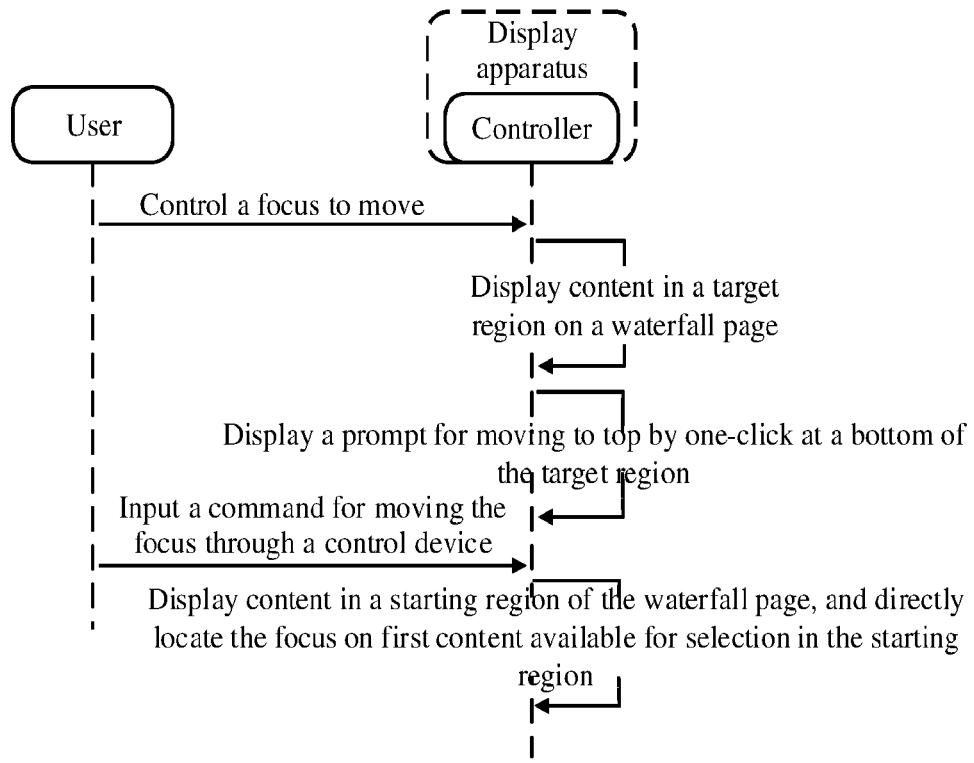
FIG. 36 is a first flowchart for moving a focus on top by one-click in a display apparatus 200 according to some embodiments.

FIG. 36 is a first flowchart for moving a focus back to top by one operation in the display apparatus 200 according to some embodiments. As shown in FIG. 36, in order to move the focus to top by one operation, in some embodiments, the display apparatus 200 may first display the content in the target region on the waterfall page according to the user's control, and display a prompt for moving the focus to top at the bottom of the target region.

Figure 37:
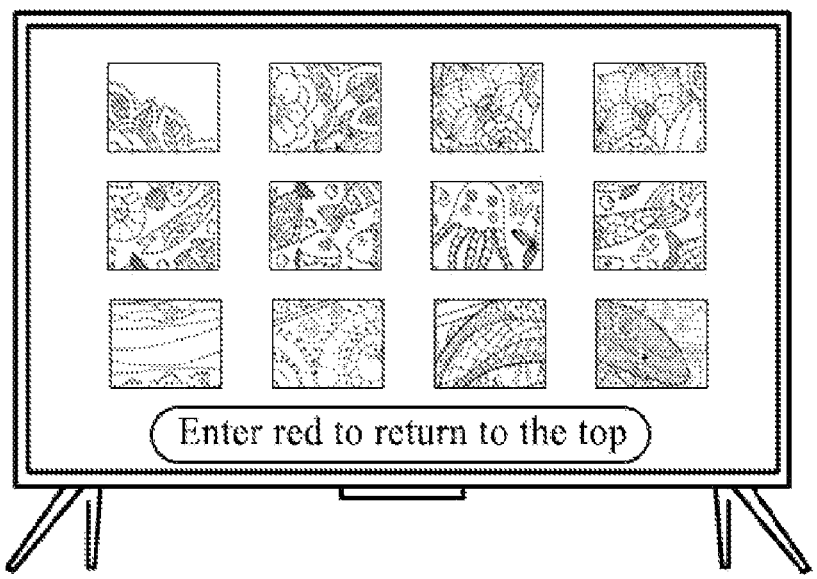
FIG. 37 is a first schematic diagram of a alert for moving to top by one-click in a target region according to some embodiments.

The prompt for moving the focus to top is configured to display information of a target button that may implement the focus move to the top in the control device 100 to the user, for example, "Enter red to return to the top" displayed at the bottom of the target region in FIG. 37, and the user may control the focus to return to the top by pressing a red button on the control device 100 such as a remote control. In addition, when the user presses the red button of the control device 100, it may be regarded as inputting a command for returning the focus to the top to the display apparatus 200.

After receiving the command for returning the focus to the top, the display apparatus 200 may display the content in the starting region of the waterfall page, and directly locate the focus on a first content available for selection in the starting region, for example, the focus is located on the first content available for selection in a first row in FIG. 37. In this way, the operation of moving the focus to top is implemented.

In the above process, the controller 250 of the display apparatus 200 may be configured to: first, display a prompt for moving a focus to top at the bottom of the target region; then, receive a command for returning the focus to the top in the display apparatus 200 from a user, where the command is input by pressing a target button on the control device 100; and finally, in response to the command for returning the focus to the top, control the display 260 to display the content in the starting region of the waterfall page, and at the same time, control the focus to be located at a first content available for selection in the starting region.

The control device 100 may refer to a physical remote control connected with the display apparatus 200 through Bluetooth, or may be a virtual remote control installed on a mobile terminal. But whether the control device 100 is the physical remote control or the virtual remote control, the control device 100 needs to have some function buttons that may be used for controlling the focus, for example, a shortcut button like a red button, a blue button, etc. on the physical remote control.

Figure 38:
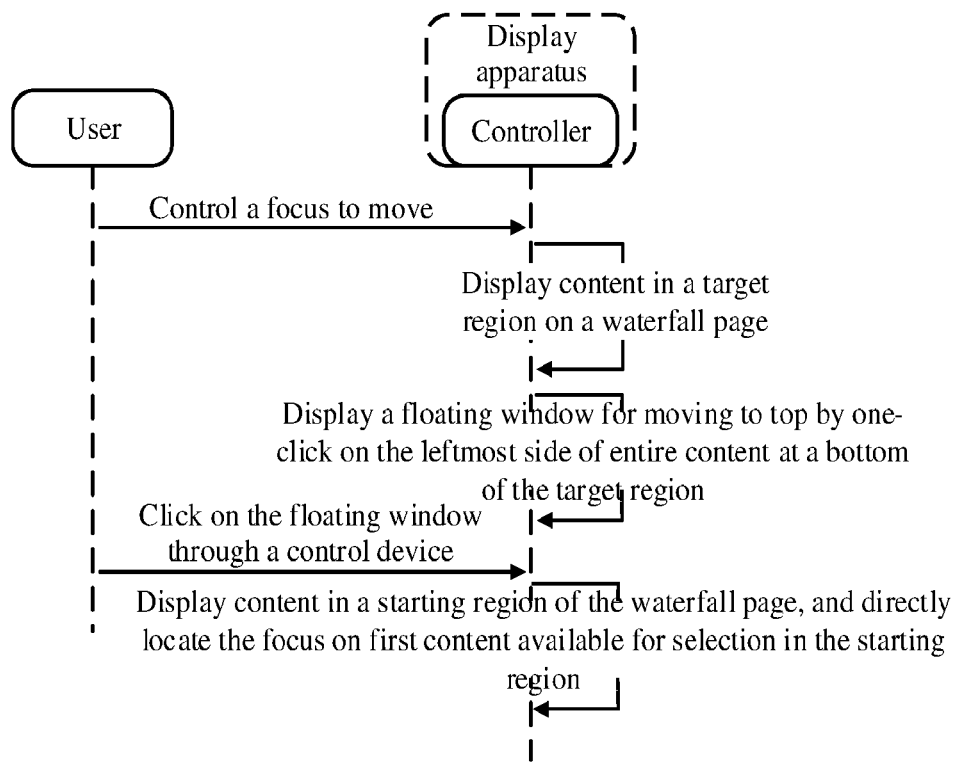
FIG. 38 is a second flowchart for moving a focus to top by one-click in a display apparatus 200 according to some embodiments.

FIG. 38 is a second flowchart for moving the focus to top by one operation in the display apparatus 200 according to some embodiments. As shown in FIG. 38, in order to move the focus to top by one operation, in some embodiments, the display apparatus 200 may first display the content in the target region on the waterfall page according to the user's control, and display a floating window for moving the focus to top, like on the leftmost side of entire content at the bottom of the target region.

Figure 39:
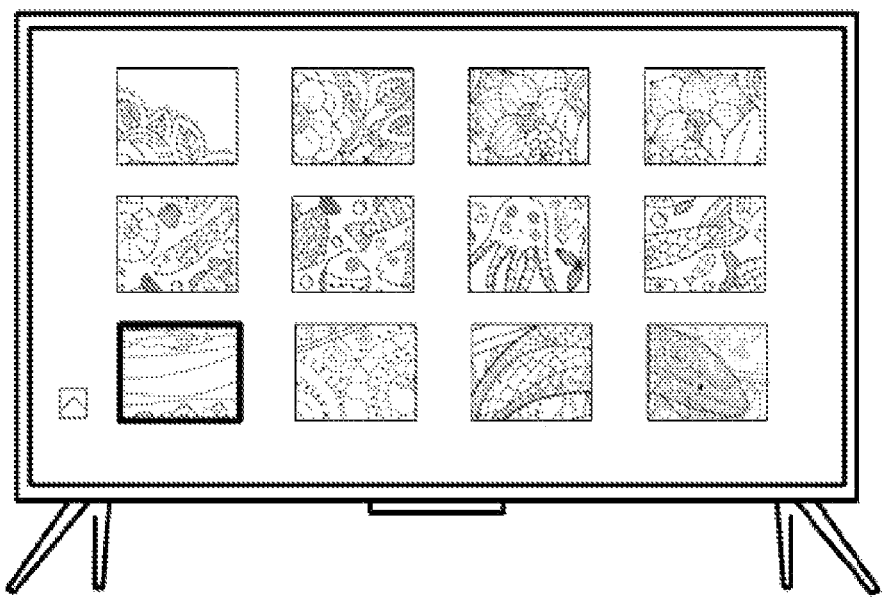
FIG. 39 is a first schematic diagram of a floating window for moving to top by one-click in a target region according to some embodiments.

As shown in FIG. 39, a floating window with an upward arrow is displayed on the leftmost side of content of the last row in the target region. The user may also move the focus to locate the focus on the floating window through the control device 100 such as a remote control, and then click a confirm button on the control device 100. This process may be regarded as inputting a command for returning the focus to the top to the display apparatus 200.

After receiving the command for returning the focus to the top, the display apparatus 200 may display the content in the starting region of the waterfall page, and directly locate the focus on the first content available for selection in the starting region. In this way, the operation of moving the focus to top by one operation is implemented.

In the above process, the controller 250 of the display apparatus 200 may be configured to: first, display a floating window for moving a focus to top by one operation at the leftmost side of the entire content at the bottom of the target region; then, receive a command for returning the focus to the top from a user, wherein the command for returning the focus to the top is input by selecting the floating window; and finally, in response to the command for returning the focus to the top, control the display 260 to display the content in the starting region of the waterfall page, and at the same time, control the focus to be located at a first content available for selection in the starting region.

Similarly, the control device 100 may refer to the physical remote control connected with the display apparatus 200 through Bluetooth, or may be the virtual remote control installed on the mobile terminal. In addition, when the user moves the focus through the control device 100, the user needs to press a direction button and a confirm button on the control device 100.

In the above embodiments, the display apparatus 200 may display the prompt or floating window for moving a focus to top to the user only when the target region is not the starting region. However, in some embodiments, when the display apparatus 200 displays content of a certain target region on the waterfall page, the user may either control the waterfall page to scroll down or scroll up to continue to select the target content. The target region displayed after scrolling may include all, part, or no content in the starting region on the waterfall page. Therefore, in this case, the display apparatus 200 also needs to determine whether the current target region is the starting region, that is, whether the content in the target region includes the entire content in the starting region. If yes, it is determined that the current target region is the starting region, and in this case, the display apparatus 200 does not need to display the prompt or floating window for moving a focus to the top to the user. If not, it is determined that the current target region is not the starting region, which is like having performed page-turning operation on the waterfall page, and in this case, the display apparatus 200 needs to display the prompt or floating window for moving the focus to top to the user.

Then, after watching the prompt, the user may input the command for returning the focus to the top to the display apparatus 200 by pressing s corresponding function button on the control device 100, or by clicking on the floating window through the control device 100.

In the above process, the controller 250 of the display apparatus 200 may further be configured to: first, control the display 260 to display the content in the target region on the waterfall page; then, in the case where the content in the target region does not include the entire content in the starting region on the waterfall page, in response to the command for returning the focus to the top from a user to the display apparatus 200, control the display 260 to display the content in the starting region of the waterfall page, and at the same time, control the focus to be located at a first content available for selection in the starting region.

The controller 250 may further be configured to: in the case where the content in the target region does not include the entire content in the starting region on the waterfall page, display a prompt for moving a focus to top at the bottom of the target region; or, in the case where the content in the target region does not include the entire content in the starting region on the waterfall page, display a floating window for moving a focus to top on the leftmost side of the entire content at the bottom of the target region.

In some embodiments, in order to avoid affecting the user's impressions on the target region, the display apparatus 200 may display the floating window only when having detected that the focus is located at a specific position. For example, a position with a bold black solid line in FIG. 39 represents the area where the focus is located, and only when the focus is located on a first content available for selection from the left at the bottom of the target region, the display apparatus 200 may display the floating window on the left of the first content.

Figure 40:
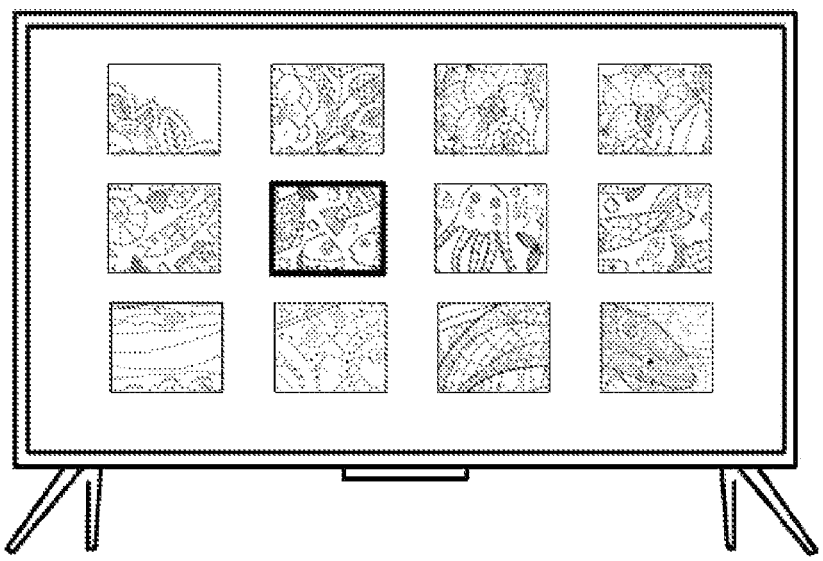
FIG. 40 is a schematic diagram of a target region according to some embodiments.

When the focus is located on other content available for selection in the target region, the display apparatus 200 may hide the floating window. FIG. 40 is a schematic diagram of the target region according to some embodiments. As shown in FIG. 40, the area with the bold black solid line represents the area where the focus is located. When the focus is located on second content available for selection in a second row, since it is not on the first content available for selection on the left side of the bottom, the display apparatus 200 may not display the floating window.

In the above process for displaying the floating window, the controller 250 of the display apparatus 200 may further be configured to: first, in the case where the content in the target region does not include the entire content in the starting region on the waterfall page, detect whether the focus in the target region is located on the first content from the left at the bottom of the target region; and then, in the case where the focus in the target region is located on the first content from the left at the bottom of the target region, display the floating window for moving the focus to top on the left of the first content.

In some embodiments, if the display apparatus 200 determines that the target region on the waterfall page currently viewed by the user is the starting region, that is, the content in the target region includes the entire content in the starting region, the display apparatus 200 does not need to display the prompt or floating window or the like. In addition, the user may directly move the focus in the target region to complete selection of the target content.

In this process, the controller 250 of the display apparatus 200 may be configured to: in the case where the content in the target region includes the entire content in the starting region on the waterfall page, in response to the user's command for moving the focus on the waterfall page, control the focus to be located on the target content in the target region.

In addition, when returning the focus to the top is implemented on a current mobile terminal, a PC terminal, etc., a page usually skips based on a hyper text markup language (HTML) native tag. However, in the manners for returning the focus to the top in the above embodiments of the disclosure, skipping of the waterfall page to the starting region is implemented based on modifying an attribute value of a waterfall component in the apparatus.

The display apparatus 200 usually has waterfall components for layout of the waterfall page, and there is a waterfallOffset attribute in the waterfall page. Whether the waterfallOffset attribute has an offset may indicate whether the waterfall page is scrolled through pages or is in the starting region. When the waterfallOffset attribute is 0, it does not have an offset, which indicates that the waterfall page is currently displaying the content in the starting region. When the waterfall Offset attribute is not 0, it has an offset, which indicates that the waterfall page has scrolled and the content in the target region is currently displayed.

The display apparatus 200 may also directly determine whether the waterfallOffset attribute has an offset. If the waterfallOffset attribute has an offset, it indicates that the display apparatus 200 is currently displaying the target region of the waterfall page. In this case, the prompt for moving a focus to top may be displayed at the bottom of the target region, or the floating window for moving the focus to top may be displayed on the leftmost side of the content at the bottom of the target region for the user to click on.

If the user presses a certain function button that may control the focus to return to the top on the control device 100 according to the top prompt, the display apparatus 200 may directly modify the waterfallOffset attribute and set its value to 0. In this way, the waterfall component may rearrange the waterfall page to display the content in the starting region according to the current value of the waterfallOffset attribute.

Alternatively, if the user moves the focus to the floating window and selects the floating window, the display apparatus 200 may also directly modify the value of the waterfallOffset attribute to 0 so that the waterfall component may rearrange the layout of the display content of the waterfall page.

After the waterfall component rearranges the waterfall page to display the content in the starting region, the display apparatus 200 relocates the focus to the first content available for selection in the starting region, thereby completing the operation for returning the focus to the top.

In some current mobile terminals or PC terminals, when the operation for returning the focus to the top is implemented, the waterfall page usually directly skips to the starting region. This manner of direct skipping takes a short time. However, because the content in the starting region needs to be reloaded and displayed, after the skip, there may be some content waiting to be loaded in the starting region, and the user may not immediately view the entire content in the starting region. Based on this, in some embodiments, the display apparatus 200 may control the waterfall page to scroll up after receiving the command for returning the focus to the top from the user until the content in the starting region is finally displayed.

The dynamic effect of such scrolling needs to take a certain period of time to scroll back to the starting region. Within this period of time, the display apparatus 200 may cache the content in the starting region, so that after the waterfall page scrolls back to the starting region, the content in the starting region may be displayed immediately.

Figure 41:
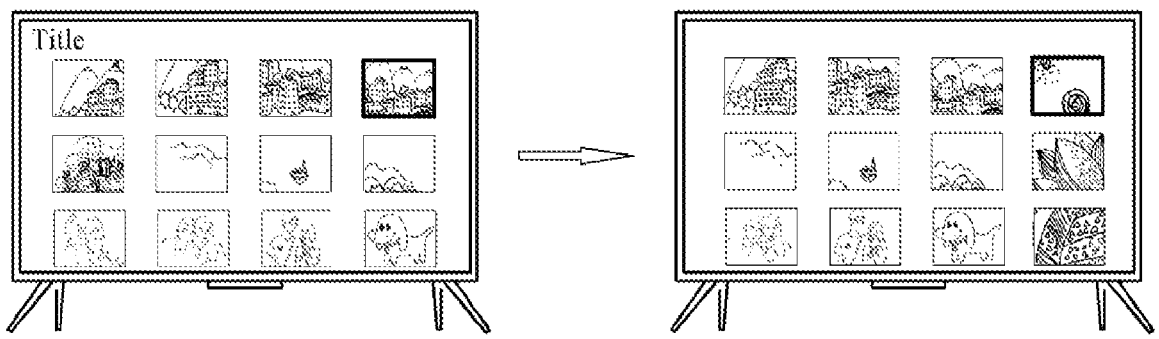
FIG. 41 is a schematic diagram of scrolling to right of a waterfall page according to some embodiments.

The above embodiments of the disclosure all take the situation that the waterfall page expands up and down as an example for description. However, in practice, the waterfall page may also expand left and right, as shown in FIG. 41, for example. Therefore, in some other embodiments, the user may also control the focus to keep moving to the right, so as to scroll the waterfall page to the right to display new content on the right. In this case, a region including the new content may also be used as the target region in the above embodiments of the disclosure.

Figure 42:
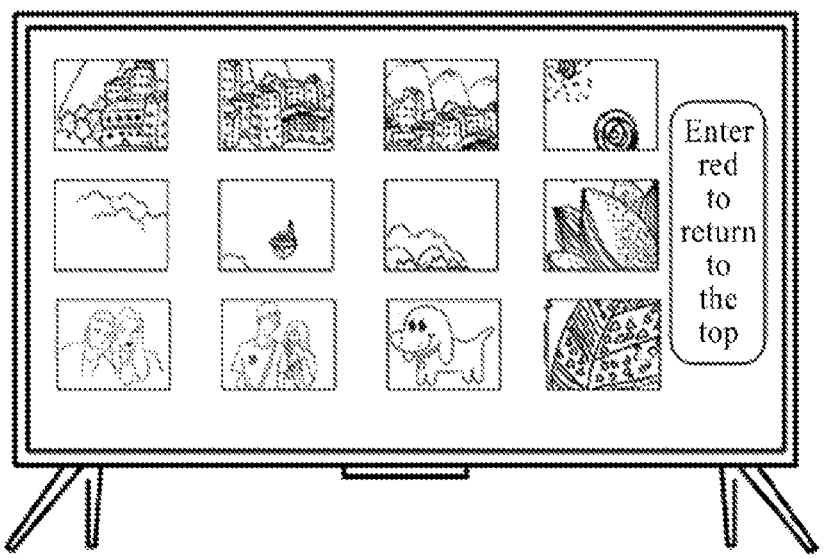
FIG. 42 is a second schematic diagram of an alert for moving to top by one-click in a target region according to some embodiments.

In the case where the waterfall page scrolls to the right to display the target region, as shown in FIG. 42, the display apparatus 200 may also display the prompt for moving the focus to top on the rightmost side of the target region. Or, as shown in FIG. 43, the display apparatus 200 may also display the floating window with an arrow pointing to the left at the bottom of rightmost content in the target region.

Figure 43:
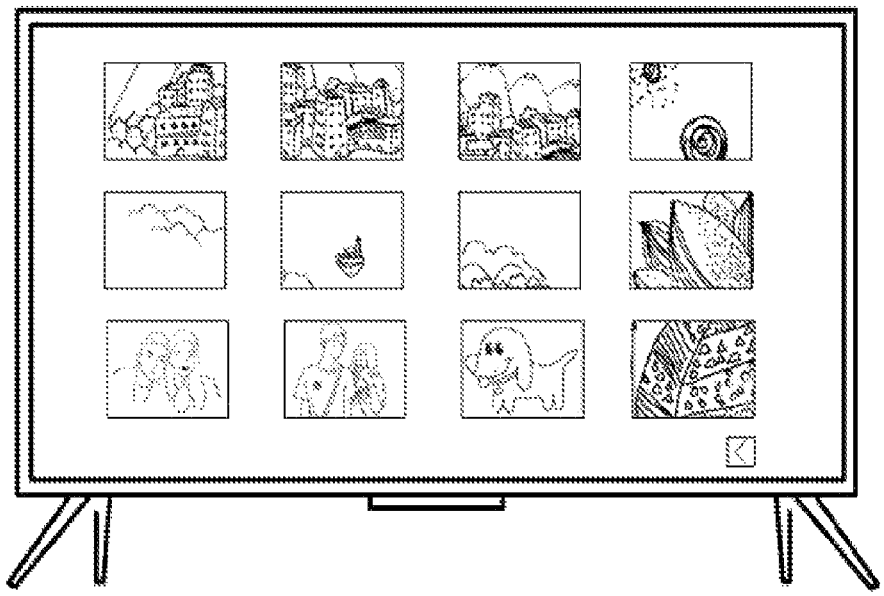
FIG. 43 is a second schematic diagram of a floating window for moving to top by one-click in a target region according to some embodiments.

When the target region on the waterfall page adopts the display manners as shown in FIG. 42 and FIG. 43, the user may still input the command for returning the focus to the top to the display apparatus 200 in the manners described in the above embodiments.

As can be seen from the above, the display apparatus 200 in the embodiments of the disclosure may display the prompt or floating window on a non-starting region of the waterfall page. The user inputs the command for returning the focus to the top to the display apparatus 200 according to the prompt or the floating window, for example, pressing a corresponding button on the control device according to the prompt, or directly selecting the floating window on the display apparatus. The display apparatus 200 then directly switches the current display content to the content in the starting region of the waterfall page in response to the command for returning the focus to the top, and relocates the focus on the first content available for selection in the starting region, thereby completing the operation of returning the focus to the top. It can be seen that the embodiments of the disclosure may provide the user with the prompt or floating window for completing returning the focus to the top, and then instruct the user to realize the purpose of moving the focus to top, avoiding the user to gradually move the focus on the waterfall page to complete the operation of returning the focus to the top, and saving a lot of time. The operation steps are also simple.

It should be noted that, the content available for selection displayed on the waterfall page on the display apparatus 200 in the embodiments of the disclosure may be pictures, applications, etc., or some other resource content suitable for waterfall display. In addition, in the embodiments of the disclosure, the operation of returning the focus to the top is to directly locate the focus on the first content available for selection in the starting region, but in other cases, the focus may also be directly located on any one of content available for selection in the first row in the starting region.

In view of the inconvenience caused by the above traditional manner of returning the focus to the top of the home page, an embodiment of the disclosure provides a method for returning a focus to top of a display page. The method may be applied to the display apparatus 200 in the above embodiments. The method may include: controlling a display 260 to display content in a target region on a waterfall page; in the case where the content in the target region does not include entire content in a starting region on the waterfall page, in response to a command for returning the focus to the top from a user to the display apparatus 200, controlling the display 260 to display the content in the starting region of the waterfall page, and at the same time, controlling the focus to be located on first content available for selection in the starting region.

In some embodiments, the method may further include: in the case where the content in the target region does not include the entire content in the starting region on the waterfall page, displaying a prompt for moving the focus to top at the bottom of the target region; and receiving a command for returning the focus to the top from the user to the display apparatus 200 by pressing a target button on a control device 100.

In some embodiments, the method may further include: in the case where the content in the target region does not include the entire content in the starting region on the waterfall page, displaying a floating window for moving the focus to top on the leftmost side of entire content at the bottom of the target region; and receiving a command for returning the focus to the top from the user by selecting the floating window.

The embodiments of the disclosure may be applied to various types of display apparatuses (including but not limited to: smart TVs, LCD TVs, set-top boxes, and other apparatuses). The following will take a control scheme of a smart TV for realizing loading and display content of a TV homepage as well as a user interface as an example to describe a display apparatus and a method for controlling loading and display the content of the TV homepage.

Figure 44:
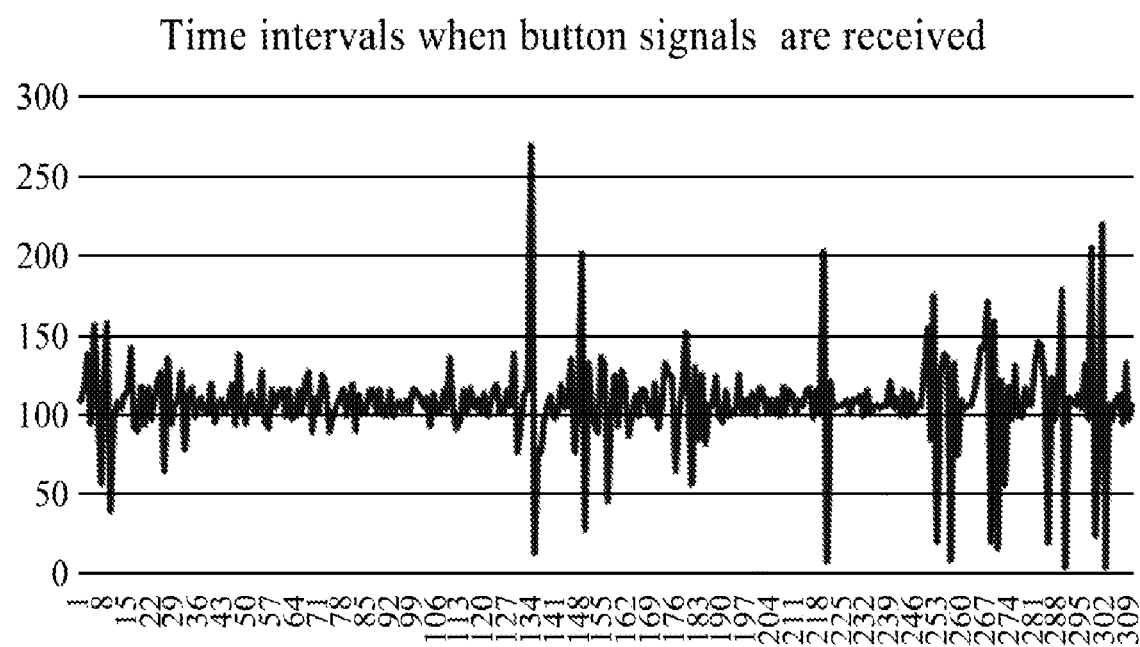
FIG. 44 is a schematic diagram of time intervals when a TV user interface receives a signal from a button on the remote control according to an embodiment.

FIG. 44 is a schematic diagram of time intervals when a TV user interface receives button signals of a remote control according to an embodiment of the disclosure.

In some embodiments, a TV controller moves a focus once every time it receives a button signal sent from the remote control. Then, the controller recalculates a position of the focus in the user interface, and shifts content of the TV homepage to re-arrange the focus so that the focus is located in a visible region of the user interface. It should be noted that the user interface mentioned below refers to a user interface configured to display the content of the TV homepage, and the user interface may cover an entire display, or may only occupy a partial region of a display screen.

In some embodiments, the user long presses a down button on the remote control to scroll up the content of the TV homepage in the user interface.

In the process of long pressing a button on the remote control, theoretically the remote control may continuously send button signals at a uniform time interval, so as to continuously control the focus on the user interface to move among objects in the content of the TV homepage.

However, in the process from sending, from the remote control, the button signals for controlling the TV user interface to receiving, by the user interface, the button signals, signal transmission needs to pass through a plurality of software and hardware nodes, and each node may have errors or be interfered by external environmental factors. Therefore, when the user long presses a button on the remote control, time intervals when the user interface receives the button signals are not uniform, which also means that time intervals when the controller receives the button signals are not uniform.

As shown in FIG. 44, in order to illustrate the instability of the time intervals of the button signals, button signals with time intervals exceeding 300 ms have been filtered out for a waveform shown in the figure. It can be seen that when the user long presses a button on the remote control, the time intervals when the TV user interface finally receives the button signals from the remote control fluctuate significantly. That is because in the process that the button signals are initially sent from the remote control, pass through a driver and a system control layer, and finally reach the user interface, each node may be interfered, and interference is continuously enlarged through continuous accumulation, which may eventually lead to large fluctuation and instability in the time intervals when the user interface receives the button signals.

Figure 45:
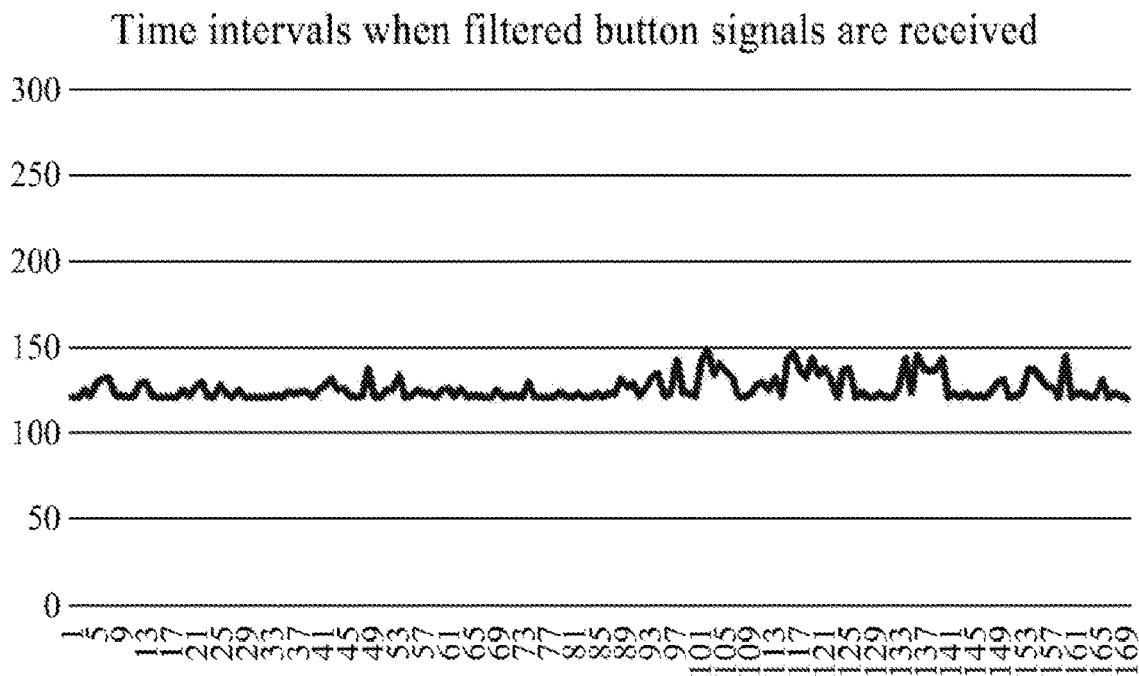
FIG. 45 is a schematic diagram of time intervals when a TV user interface receives a signal from a button on the remote control according to another embodiment.

FIG. 45 is a schematic diagram of the time intervals when the TV user interface receives the button signals on the remote control according to another embodiment of the disclosure.

In some embodiments, an event of long pressing a button on the remote control is used as a trigger condition. When the TV controller determines a first event of long pressing the button on the remote control, a switch for smoothly scrolling the page may be activated and a self-triggering process is started in order to isolate a change in time intervals caused in the retransmission process of the button signals. As shown in FIG. 45, the waveform of the time intervals when the button signals are received is relatively smooth, and fluctuation is substantially controlled within 30 ms, which is a precondition to ensure fluency of scrolling display of data in a waterfall list.

In some embodiments, after the TV controller receives a button long-press signal sent from the remote control, the controller generates a smoothing button signal at a preset time interval. It can be understood that the smoothing button signal is a set of a plurality of button signals, and configured to replace the button long-press signal from the remote control.

When generating a first smoothing button signal, the controller controls the content of the TV homepage to start to be loaded and displayed. After the preset time interval, a second smoothing button signal is generated to control the content of the TV homepage to scroll and display again. Then the controller generates a third smoothing button signal, a fourth smoothing button signal, . . . , and an Nth smoothing button signal. The controller stops generating smoothing button signals until the user releases the button on the remote control or the content of the TV homepage has been loaded to the bottom.

It can be understood that the time interval between the smoothing button signals is a preset value, which may be configured according to needs to control the trigger frequency for loading and displaying the content of the TV homepage in the TV user interface as well as the speed of scrolling display.

It can be understood that, through the smoothing button signals, the disclosure converts the button signals with unstable time interval characteristics received by the user interface into the button signals with stable time interval characteristics. The problems that scrolling display is not uniform in speed and not frequent during loading and display of the content of the TV homepage may be solved with respect to the quality of the button signals from the remote control.

Figure 46:
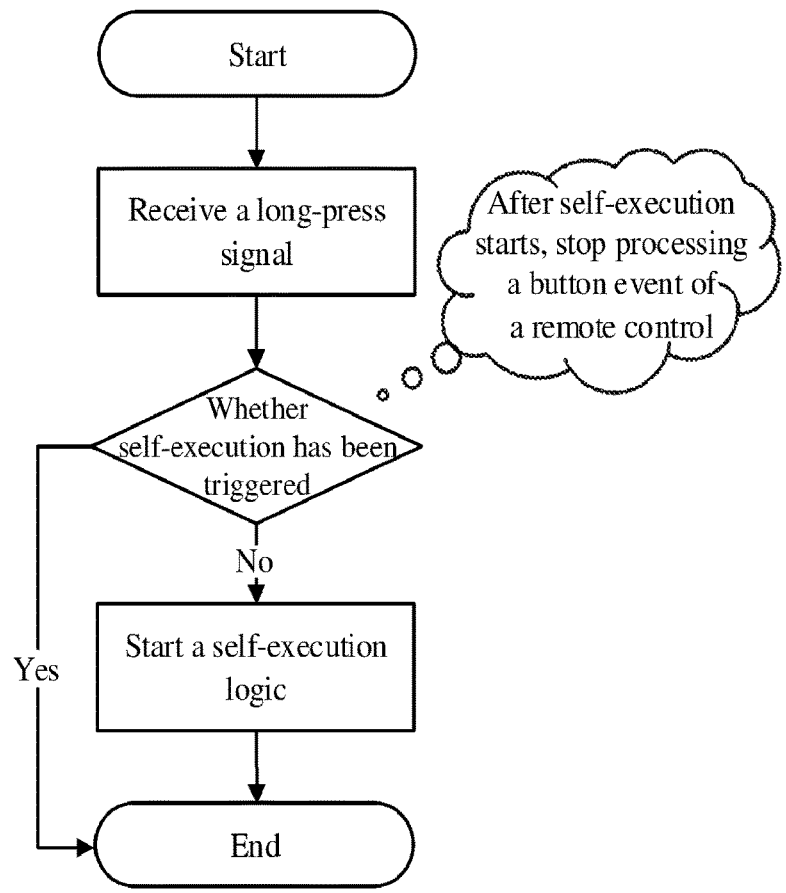
FIG. 46 is a schematic logic diagram of invoking self-execution based on key control signals from a remote control according to an embodiment.

FIG. 46 is a schematic logic diagram of invoking self-execution based on key control signals from a remote control according to an embodiment of the disclosure.

In some embodiments, the loading and displaying the content of the TV homepage no longer directly uses the button long-press signal sent from the remote control, but uses the button long-press signal on the remote control as a trigger.

The remote control sends the button long-press signal that controls the scrolling display of the content of the TV homepage to the controller. After the controller receives the button long-press signal sent from the remote control, self-execution may be triggered to produce the smoothing button signals. When the controller receives the button long-press signal again from the remote control, the controller may determine whether the self-execution has been triggered. If the controller determines that the self-execution has been triggered, the controller may no longer process the button event from the remote control and end the processing procedure. If the controller determines that the self-execution has not been triggered, the controller triggers the self-execution to generate the smoothing button signals.

It can be understood that after the controller receives the button long-press signal sent from the remote control for the first time and before the user releases the button, the TV controller may continuously receive the button long-press signal sent from the remote control, and by determining whether a logic for the self-execution has been triggered, it may be realized that no signaling conflict occurs in the process of generating the smoothing button signals.

It can be understood that the above embodiment may solve the problem caused by the non-uniform time intervals when the button signals of the remote control are received to a certain extent. Hereinafter, the disclosure may present an embodiment in view of page loading lag caused by the content of the TV homepage including media asset data in different formats.

Figure 47:
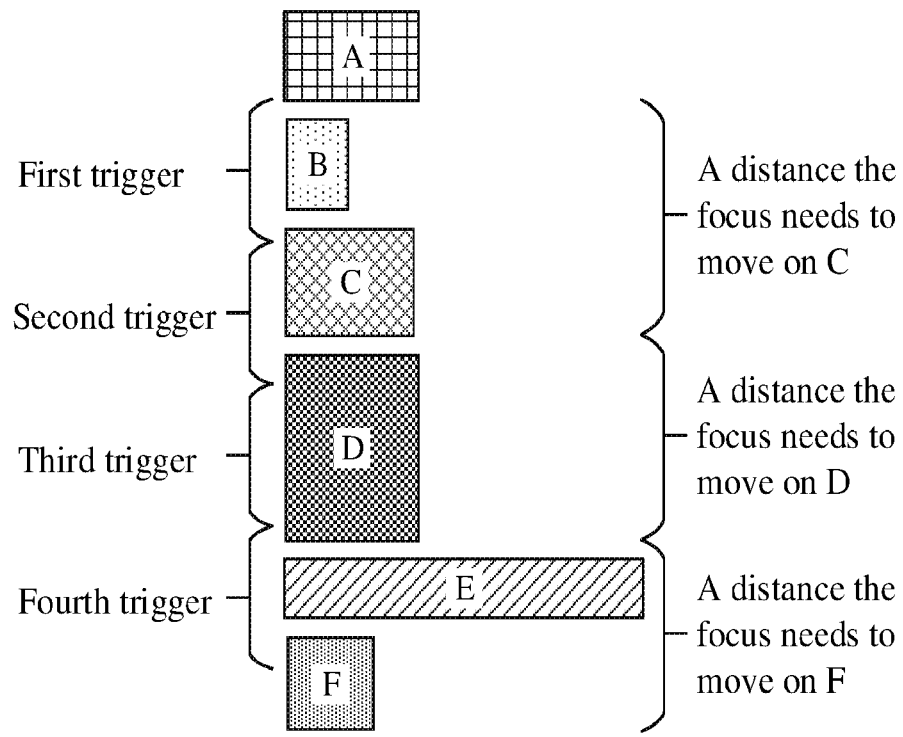
FIG. 47 is a schematic diagram of moving content of a TV homepage and a focus according to an embodiment.

FIG. 47 is a schematic diagram of moving the content of the TV homepage and the focus according to an embodiment of the disclosure.

In some embodiments, when the user long presses a button on the remote control to control the content of the TV homepage to be loaded, and uses the button long-press signal sent from the remote control to directly control the page, a time interval the controller triggers the page to scroll may be inconsistent with a time interval when the remote control actually sends the button signals. In addition, when the media asset data in the content of the TV homepage are different in display size, a manner of first moving the focus and then re-exposing it by calculating the position of the focus may result in non-uniform speed of moving the page. A difference effect is enlarged due to combination of the above two uncertain factors, which may cause browsing lag and delay of waterfall data of the TV user interface.

For example, formats of the media asset data that need to be displayed in the content of the TV homepage may include ratios such as 16:9, 4:3, 3:4, 1:1, etc. The heights are not uniform either, and there is a large difference between the smallest advertising media asset and ordinary media assets.

If the focus is moved at the same time interval, it is like moving by different distances at the same time interval. According to the speed formula: v=s/t, it can be known that when the time is the same and the distances are different, the page scrolling speed must be different. If the above speed difference is too large, issues like a lag effect that page loading scrolling is sometimes fast and sometimes slow may be apparent for the user.

In some embodiments, the content of the TV homepage in the disclosure is loaded and displayed based on movement of the page. After receiving the button long-press signal sent from the remote control, the controller may control the content of the TV homepage to move up by a preset offset distance every preset time length so that to-be-loaded objects included in the content of the TV homepage are uniformly scrolled and displayed on the user interface.

As shown in FIG. 47, the content of the TV homepage includes the loaded object A that has been displayed and loaded, and the to-be-loaded objects B, C, D, E, F, etc. When the focus is on the loaded object A, the user long presses the button on the remote control, the controller controls the content of the TV homepage to move up by the preset offset distance multiple times at a fixed time interval after receiving the button long-press signal sent from the remote control. After each upward movement, the to-be-loaded objects not displayed on the user interface may be located in a visible position of the user interface. Then the focus of the user interface is controlled to move, so as to load content corresponding to the to-be-loaded objects. FIG. 47 is a schematic diagram of a preset offset distance every time the content of the TV homepage moves in 4 times of trigger. The curly bracket on the left represents the distance, and the curly bracket on the right represents the distance the focus moves in the process of moving the content of the TV homepage up.

The following may take the implementation of the content of the TV homepage shown in FIG. 47 as an example to further describe move of the content of the TV homepage and the focus each time.

Figure 48A:
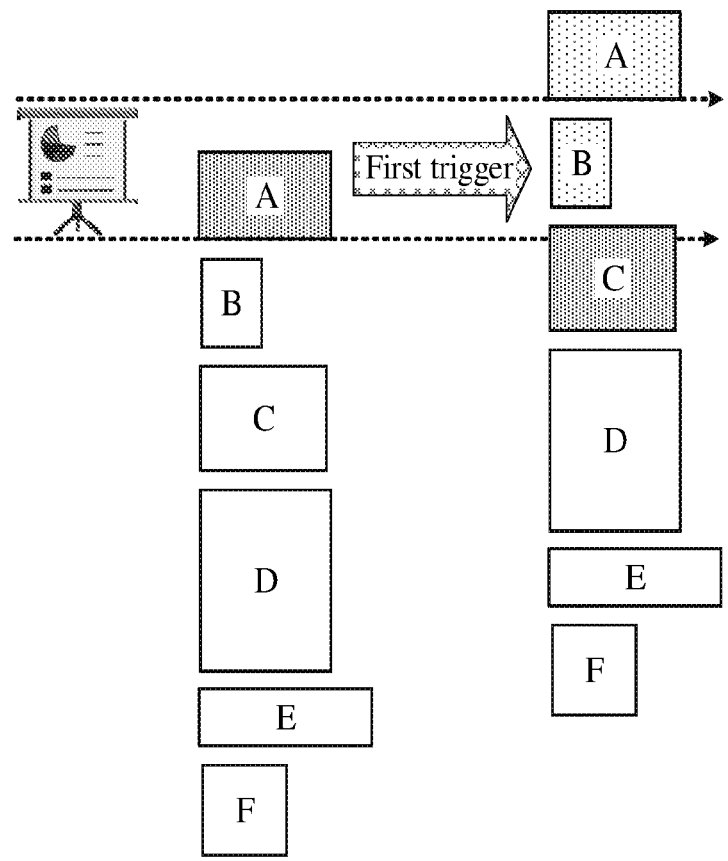
FIG. 48A is a schematic diagram of moving content of a TV homepage and a focus according to another embodiment.

FIG. 48A is a schematic diagram of moving the content of the TV homepage and the focus according to another embodiment of the disclosure.

In some embodiments, a blue object A shown on the left side of the figure is the loaded object where the focus is located, and a region where it is located between dotted lines is the visible range of the user interface. It can be noted that only after any of the to-be-loaded objects B, C, D, E, F, etc. is moved to the visual range of the user interface, the controller may load, render and display the object located in the region between the dotted lines. It can be understood that when the to-be-loaded objects are located below the region between the dotted lines, they exceed the visual range of the user interface, and the corresponding to-be-loaded objects will not load display content; and when the to-be-loaded objects are located at the top between the dotted lines, the corresponding objects have been loaded and displayed, and as the page scrolls, the loaded and displayed objects have exceeded the visible range of the user interface.

In some embodiments, the controller configures the preset offset distance as a distance in the longitudinally direction of the visible range of the user interface in the figure, namely, a distance between the dotted lines. An upper dotted line may be considered as an upper edge of the user interface, and a lower dotted line may be considered as a lower edge of the user interface.

In some embodiments, after the controller controls the overall content of the TV homepage to move up for the first time, the relative position of the content of the TV homepage and the user interface is as shown on the right side in FIG. 48A. The grey object A and the grey object B indicate that the objects have been loaded and displayed, and the blue object C indicates where the focus is.

Every time after the content of the TV homepage moves, the controller may control the focus to move to the to-be-loaded object, covering the lower edge of the user interface, in the content of the TV homepage via the to-be-loaded objects in sequence, and control the user interface to load and display the to-be-loaded objects the focus passes by, thereby realizing the effect of loading and display the content of the TV homepage.

Corresponding to a first trigger shown in the figure, the controller first assigns the focus on the user interface from object A to object B. In this case, whether the focus needs to continue moving to the object C or not needs to be taken into consideration.

It can be found that, for a waterfall layout page that adopts data loading on demand manner, if the focus stops moving at this time, the controller may not render and display the to-be-loaded object C, consequently, a region where part of the object C should be displayed on the back side of the object B in the user interface is displayed as blank, which may cause abnormal loading and display of the content of the TV homepage. Therefore, in this case, the controller may control the focus to move to the to-be-loaded object C that covers the lower edge of the user interface for the second time so that part of the content of the object C may be displayed within the visible range of the user interface.

Figure 48B:
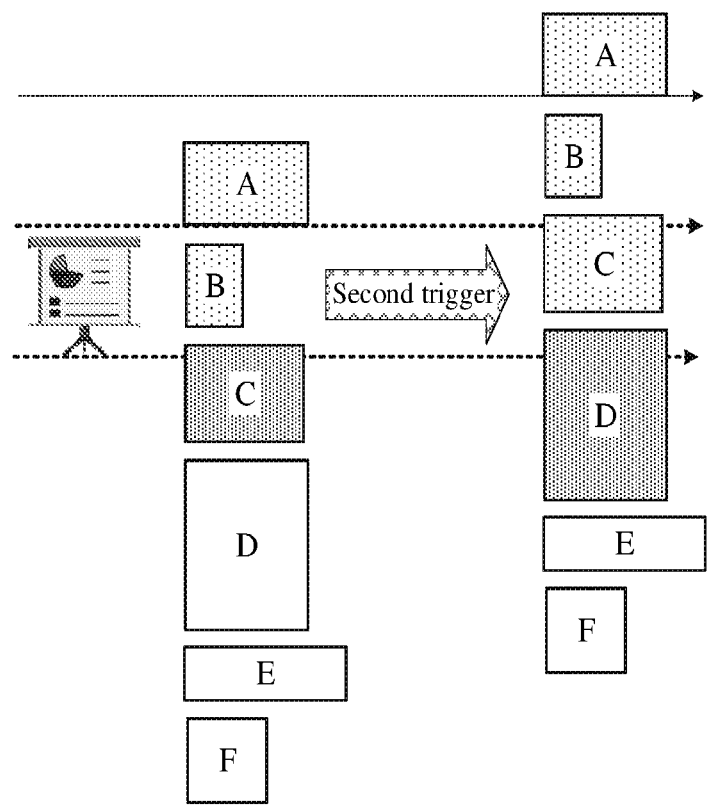
FIG. 48B is a schematic diagram of moving content of a TV homepage and a focus according to yet another embodiment.

FIG. 48B is a schematic diagram of moving the content of the TV homepage and the focus according to yet another embodiment of the disclosure.

In some embodiments, based on the content of the TV homepage on the right side in FIG. 48A and the position of the focus in the user interface, the controller triggers, for the second time, the content of the TV homepage to move up by a preset offset distance for the second time. The preset offset distance is still configured as the distance between the dotted lines.

After the second trigger is implemented, the to-be-loaded object D covers the lower edge of the user interface, and the controller may control the focus to move from the object C to the to-be-loaded object D, namely, controlling the focus to move one time. In this case, the content displayed in the user interface may be part of the content of the object C and part of the content of the object D. The focus of the user interface is located on the object D.

It is noted that as it is determined that a remaining movement distance of the object C in the user interface is not sufficient to support the content of the TV homepage to move up one time, the controller assigns the focus to object D, and as a required movement distance of the object D is sufficient to move the preset offset distance, the controller no longer moves the focus after the focus reaches the object D.

Figure 48C:
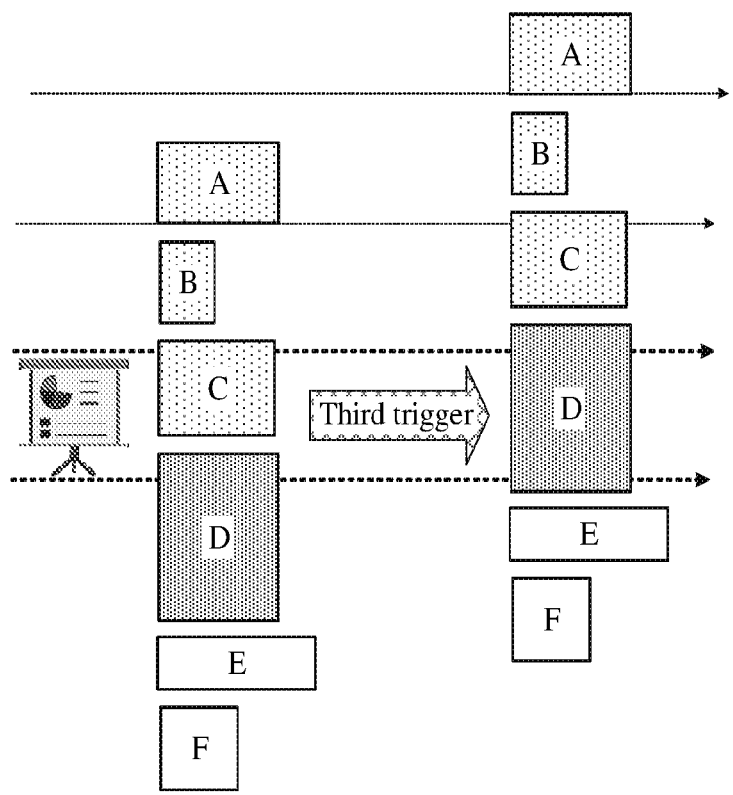
FIG. 48C is a schematic diagram of moving content of a TV homepage and a focus according to yet another embodiment.

FIG. 48C is a schematic diagram of moving the content of the TV homepage and the focus according to yet another embodiment of the disclosure.

In some embodiments, based on the content of the TV homepage on the right side in FIG. 48B and the position of the focus in the user interface, the controller triggers, for the third time, the content of the TV homepage to move up by the preset offset distance, namely the distance between the dotted lines, for the third time.

After the third trigger is implemented, the to-be-loaded object D changes from partially covering the lower edge of the user interface to completely covering the upper edge and lower edge of the user interface. In this case, the focus does not need to be moved because no new object is displayed on the user interface. In the process that the controller controls the focus to move to the to-be-loaded object covering the lower edge of the user interface in the content of the TV homepage via the to-be-loaded objects in sequence, if a to-be-loaded object covering the lower edge of the user interface after moving the content of the TV homepage is the same as that before the content of the TV homepage is moved, the controller may no longer move the focus of the user interface.

It can be understood that as a remaining distance of the object D in the user interface is sufficient to support movement of the page in the process of moving the content of the TV homepage, the focus does not need to be moved for moving the content of the TV homepage this time.

Figure 48D:
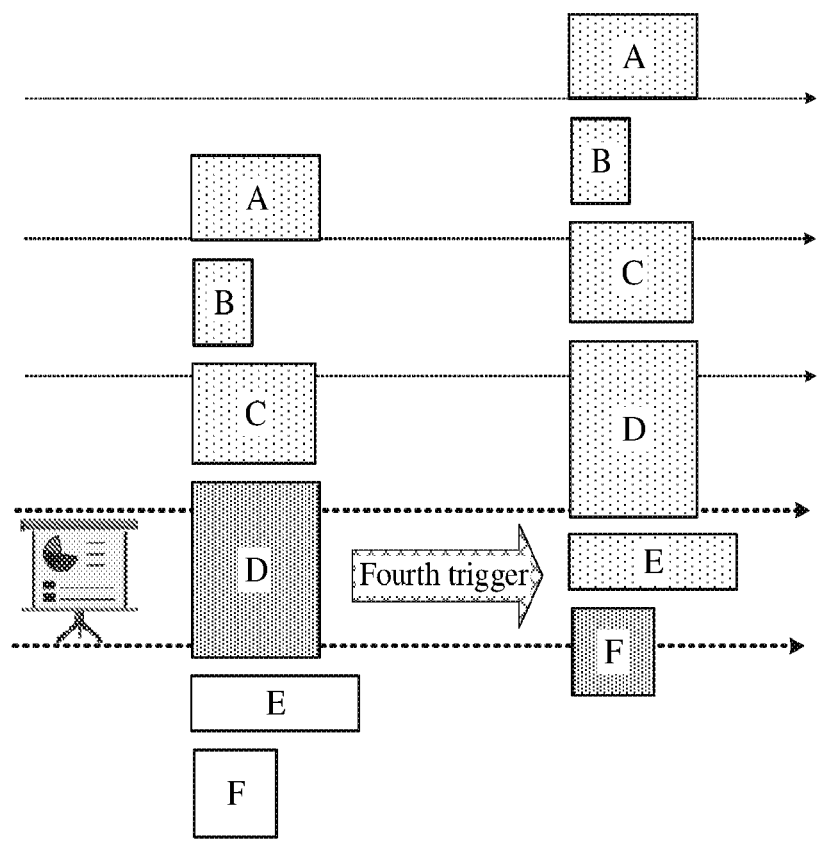
FIG. 48D is a schematic diagram of moving content of a TV homepage and a focus according to yet another embodiment.

FIG. 48D is a schematic diagram of moving the content of the TV homepage and the focus according to yet another embodiment of the disclosure.

In some embodiments, based on the content of the TV homepage on the right in FIG. 48C and the position of the focus in the user interface, the controller triggers, for the fourth time, the content of the TV homepage to move up by the preset offset distance, namely the distance between the dotted lines, for the fourth time.

After the fourth trigger is implemented, the to-be-loaded object D changes from completely covering the upper edge and lower edge of the user interface to partially covering the upper edge of the user interface. In this case, the to-be-loaded object F covers the lower edge of the user interface, and the controller may control the focus to finally land on the to-be-loaded object F via the to-be-loaded object E.

When it is determined that the remaining distance of the object D cannot support the fourth movement of the content of the TV homepage, the controller first moves the focus to the object E, and when it is determined that the moving distance of the object E is not sufficient to support the fourth movement of the content of the TV homepage either, the controller moves the focus to the object F. In this case, the movement distance of the focus has been sufficient for the fourth movement of the content of the TV homepage, and the controller may stop moving the focus.

Figure 48E:
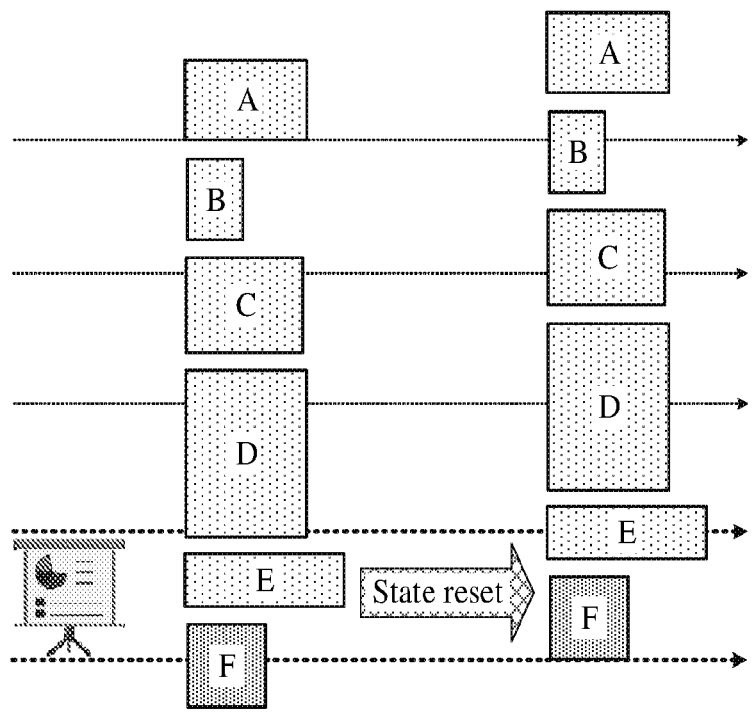
FIG. 48E is a schematic diagram of moving content of a TV homepage and a focus according to yet another embodiment.

FIG. 48E is a schematic diagram of moving the content of the TV homepage and the focus according to yet another embodiment of the disclosure.

In some embodiments, if the button is released or the bottom of the waterfall has been reached, self-triggering may stop running and a state is reset. The rest of the object F is moved to the visible range of the page.

Figure 49:
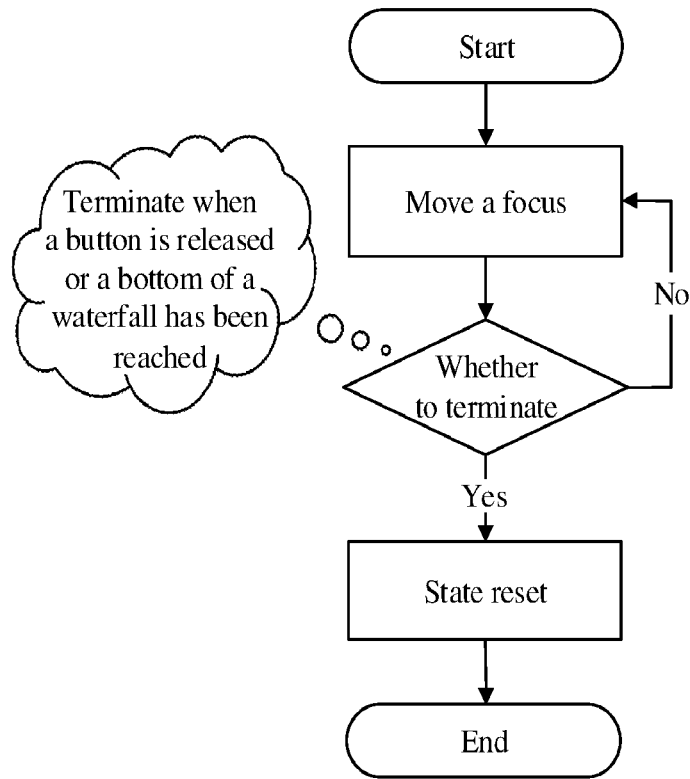
FIG. 49 is a schematic logic diagram of terminating loading and display of content of a TV homepage according to another embodiment.

For example, after scrolling loading and display of the content of the TV homepage start, the controller may control the focus to move according to the displacement of the content of the TV homepage in the manner in the above embodiments. At the end of each focus movement, the controller may determine whether it is necessary to terminate moving the focus. If it is unnecessary to terminate moving the focus, the focus continues to be moved in the manner in the above embodiments. If the button long-press signal of the remote control is canceled, or the content of the TV homepage has been completely loaded, that is, the bottom of the waterfall is reached, the controller may control the content of the TV homepage to reset the state in the user interface, and to-be-loaded objects at the end of the content of the TV homepage are displayed at the bottom of the user interface by moving. It should be noted that displaying the to-be-loaded objects at the end at the bottom of the user interface means that, as shown in the figure, the lower edge of the to-be-loaded object F is displayed at a visible area of the user interface and is at the bottom of the visible position. The flow diagram is as shown in FIG. 49.

When a height of the to-be-loaded object F is less than a height of the visible range of the user interface, the to-be-loaded object is controlled to be displayed at the bottom of the visible range, and the to-be-loaded object may be completely displayed in the visible range. When the height of the to-be-loaded object F is greater than or equal to the height of the visible range of the user interface, the lower edge of the to-be-loaded object is controlled to be displayed close to the upper side of the lower edge of the user interface so that as many to-be-loaded objects are displayed in the visible range of the user interface as possible.

In some embodiments, when the focus is moved to a target to-be-loaded object, such as the to-be-loaded object covering the lower edge of the user interface, via the to-be-loaded objects in sequence, the controller controls all the to-be-loaded objects the focus passing by not to be assigned with corresponding focus types, thereby reducing calculation burden of the display apparatus.

In some embodiments, when a spacing distance between the to-be-loaded objects included in the content of the TV homepage is large, there may be no to-be-loaded object covering the lower edge of the user interface after the TV homepage is offset. Thus, after each movement of the content of the TV homepage, if the content displayed in the user interface does not include a to-be-loaded object covering the lower edge of the user interface, the controller may control the focus to move to a to-be-loaded object, closest to the upper side of the lower edge of the user interface, in the content of the TV homepage via the to-be-loaded objects in sequence.

Figure 48F:
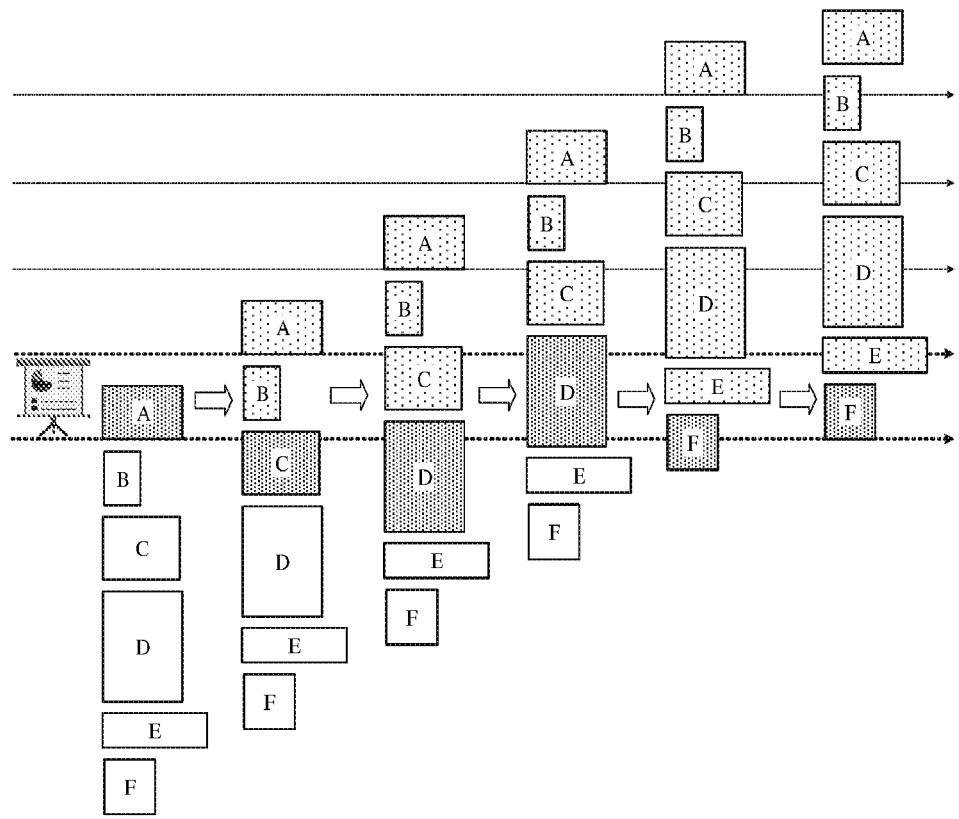
FIG. 48F is a schematic diagram of moving content of a TV homepage and a focus according to yet another embodiment.

FIG. 48F is a schematic diagram of moving the content of the TV homepage and the focus according to yet another embodiment of the disclosure.

FIGS. 48A to 48F are the schematic diagrams of the complete move process of the content of the TV homepage and the focus. In view of the non-uniform reception of the button signals from the remote control on browsing of the waterfall list data, the disclosure does not directly use the button event from the remote control to drive focus switching and page scrolling, but trigger the controller to control the loading and display of the content of the TV homepage based on the button signals from the remote control.

In some embodiments, after the controller receives the button long-press signal sent from the remote control, the controller generates the smoothing button signals at a preset time interval. It can be considered that the controller produces a plurality of smoothing button signals. If every two smoothing button signals have the same preset duration, it can be regarded that the controller outputs the uniform button signals.

The smoothing button signals are used for the controller to control the content of the TV homepage to move up by the preset offset distance, and to control the focus to follow correspondingly downward according to the movement of the page. After the user releases the button on the remote control, namely the button long-press signal is canceled, the controller may no longer generate the smoothing button signals, and the content of the TV homepage may no longer scroll for display.

Figure 50:
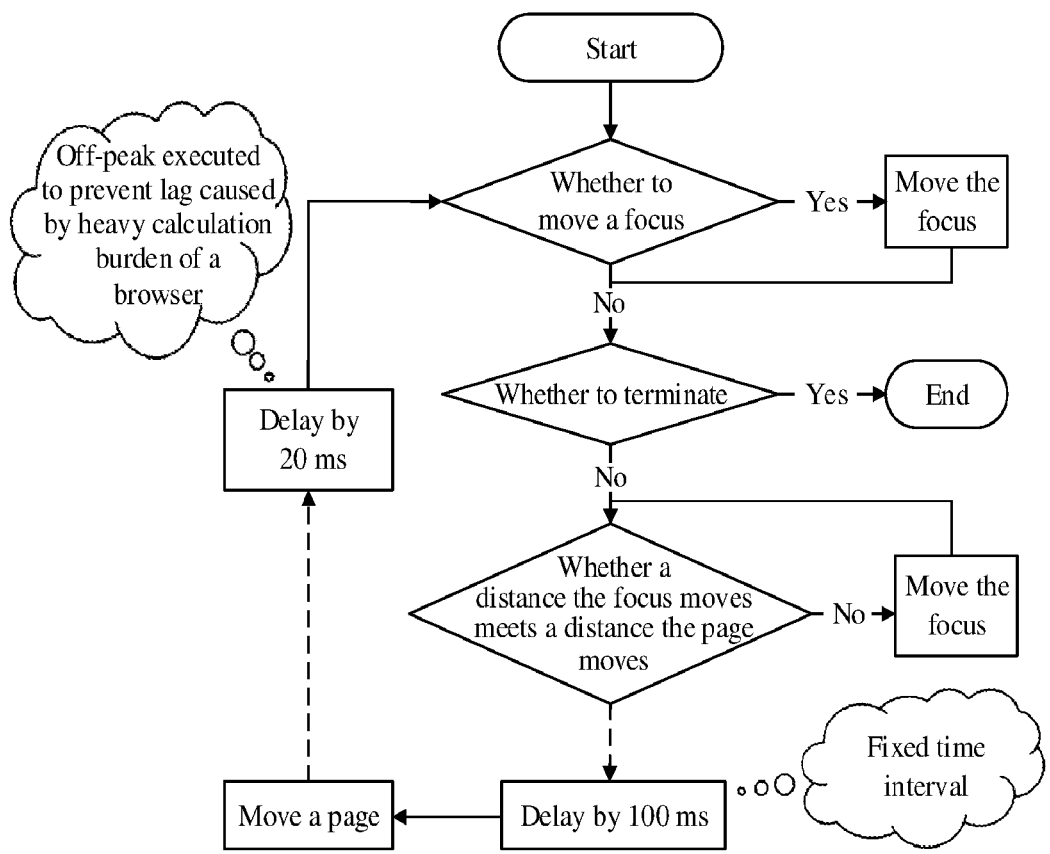
FIG. 50 is a schematic logic diagram of moving content of a TV homepage and a focus according to yet another embodiment.

FIG. 50 is a schematic logic diagram of moving the content of the TV homepage and the focus according to another embodiment of the disclosure.

In some embodiments, the controller controls the content of the TV homepage to move up by the preset offset distance after receiving the button long-press signal from the remote control.

Then the controller determines whether the focus needs to be moved according to the scheme for moving the focus in the above embodiments. If the focus needs to be moved, the focus is controlled to move to the next to-be-loaded object, and whether to terminate the process for loading the page is further determined. If the focus does not need to be moved, whether to terminate the process for loading the page is directly determined. A condition for determining whether to terminate the process for loading the page may be implemented as the user canceling the button long-press signal of the remote control, or the waterfall page being completely loaded.

The controller continues to determine whether the movement distance of the focus meets the movement distance of the page. If not, the controller controls the focus to continue to move and performs determination again. If yes, the controller moves the content of the TV homepage after a first preset time length, such as 100 ms.

Then after a second preset time length, such as 20 ms, the controller determines whether the focus in the user interface needs to be moved again until a termination condition is met.

Based on the embodiments of the display apparatus for controlling loading and display of the content of the TV homepage as well as the related drawings, the disclosure further provides a method for controlling loading and display of the content of the TV homepage. The method includes: upon receiving a button long-press signal sent from a remote control, controlling the content of the TV homepage in a user interface to move up by a preset offset distance at a preset time interval so that to-be-loaded objects included in the content of the TV homepage are uniformly scrolled and displayed on the user interface. After each movement of the content of the TV homepage, a focus of the user interface is controlled to move to a to-be-loaded object, covering a lower edge of the user interface, in the content of the TV homepage via the to-be-loaded objects in sequence, and the user interface is controlled to load and display the to-be-loaded objects the focus passing by. The specific steps of the method for controlling loading and display of the content of the TV homepage may refer to the above embodiments.

In some embodiments, when the content of the TV homepage does not include the to-be-loaded object covering the lower edge of the user interface, the controller is further configured to: after each movement of the content of the TV homepage, control the focus of the user interface to move to a to-be-loaded object, closest to the upper side of the lower edge of the user interface, in the content of the TV homepage via the to-be-loaded objects in sequence. The specific steps of the method for controlling loading and display of the content of the TV homepage may refer to the above embodiments.

In some embodiments, the controlling the focus to move to the to-be-loaded object, covering the lower edge of the user interface, in the content of the TV homepage via the to-be-loaded objects in sequence includes: if a to-be-loaded object covering the lower edge of the user interface after moving the content of the TV homepage is the same as that before the content of the TV homepage is moved, not moving the focus of the user interface. The specific steps of the method for controlling loading and display of the content of the TV homepage may refer to the above embodiments.

In some embodiments, the controller is further configured to: when the button long-press signal is canceled or the content of the TV homepage has been completely loaded, control the content of the TV homepage to move so that the to-be-loaded objects at the end are displayed at the bottom of the user interface; and control a to-be-loaded object where the focus is located to display its corresponding focus type. The specific steps of the method for controlling loading and display of the content of the TV homepage may refer to the above embodiments.

In some embodiments, in the process that the controller controls the focus to move to the to-be-loaded object, covering the lower edge of the user interface, in the content of the TV homepage via the to-be-loaded objects in sequence, the controller is further configured to: control the to-be-loaded objects the focus passing by not to be assigned with their corresponding focus types, so as to reduce the calculation of the display apparatus. The specific steps of the method for controlling loading and display of the content of the TV homepage may refer to the above embodiments.

In some embodiments, upon receiving the button long-press signal from the remote control, the controller is further configured to: generate smoothing button signals at a preset time interval. The smoothing button signals are used for the controller to control the content of the TV homepage to move up by the preset offset distance, and to control the focus to follow correspondingly downward. After the button long-press signal is canceled, the smoothing button signals stop being generated. The specific steps of the method for controlling loading and display of the content of the TV homepage may refer to the above embodiments.

The embodiments of the disclosure, by constructing the preset offset distance, uniformly loading and display of the content of the TV homepage on the user interface can be realized; further, by controlling the focus to a specific to-be-loaded object, the user interface can be prevented from displaying blank space; and further, by smoothing the button long-press signal, the content of the TV homepage can be driven by the uniform signals to move at uniform time intervals, so as to realize control over movement of the focus, improve the fluency of data browsing, and reduce lag and non-fluency in the process of data browsing.

Figure 51:
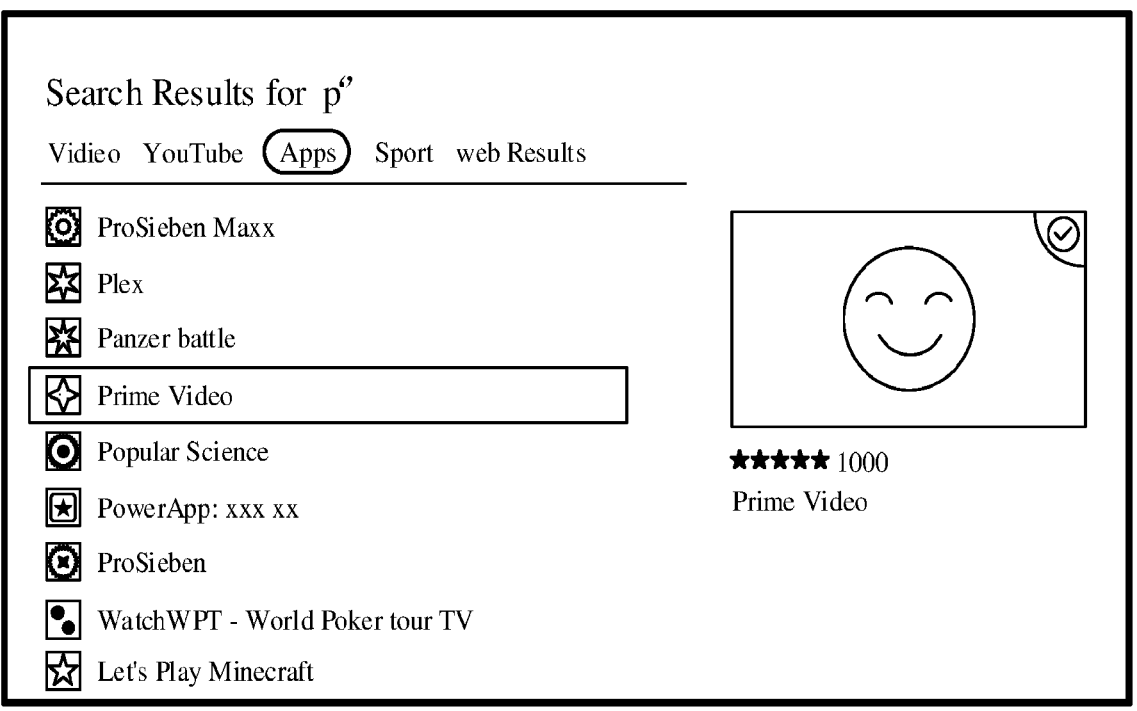
FIG. 51 is a schematic diagram of a page for presenting search results commonly used in a current display apparatus 200 according to some embodiments.

In a display apparatus in the related art, search results displayed for the needs of the user are only displayed in a form of tab pages according to their categories. Taking a display page shown in FIG. 51 as an example, search content "P" input from the user is first displayed at the top of the display page, and then type tabs of search results are displayed below the search content, such as Video, Apps, Sport, and Web Results. When the user selects any type of tab, all search results in the type may be displayed below a label bar. When the user browses to a search result, a poster corresponding to the search result may be displayed on the right of the display page accordingly.

With the development of science and technology, the quantity of media assets and applications that may be applied in the display apparatus 200 grows very rapidly. However, the quantity of media assets, applications, etc. that may be displayed on the interface of the display apparatus 200 is limited. Therefore, for other media assets, applications, etc. that may not be displayed on the display apparatus 200, the display apparatus 200 may provide the user with a content search function. The user enters a keyword, phrase or full name of content in a search page, and the display apparatus 200 may display searched content matching the keyword, phrase or full name for the user to select.

However, in the current display apparatus 200, the search results displayed for the needs of the user are only displayed in the form of tab pages according to their categories. Taking the display page shown in FIG. 51 as an example, the search content "P" input from the user is first displayed at the top of the display page, and then the type tabs of the search results are displayed below the search content, such as Video, Apps, Sport, and Web Results. When the user selects any type of tab, all search results within the type may be displayed below the label bar. When the user browses to a search result, a poster corresponding to the search result may be displayed on the right of the display page accordingly. For example, if the user selects P4 (which may be video software), a poster about the P4 video software is displayed on the right of the display page.

However, the content that may be presented by the above display method is limited. Only search content under the type tab selected by the user may be displayed, and for search results under other types, the user needs to re-select corresponding type tabs to view. In addition, only when the user browses to a certain search result the display page will display the corresponding poster and so on. It can be seen that the search results that may be presented by this method for showing the search results are not comprehensive or intuitive.

In view of the above issues, an embodiment of the disclosure provides a method for displaying search results on a display apparatus, and the display apparatus 200. The search results may be displayed in a waterfall manner, so that the search results are more intuitively and clearly presented for a user. Meanwhile, the user is also provided with more types of search results, thereby improving user experience.

As described in the above embodiments, the display apparatus 200 in the embodiment of the disclosure has a controller 250. The controller 250 may receive some commands for content search and so on input from the user to the display apparatus 200, and control a display 260 to show corresponding search results according to the various commands.

Figure 52:
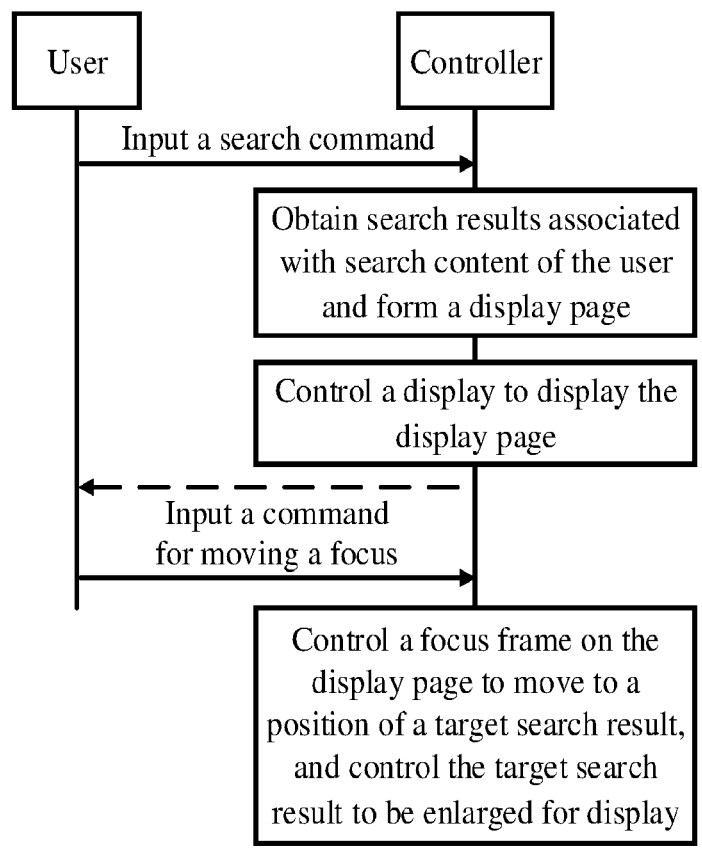
FIG. 52 is a control flowchart of a controller 250 according to some embodiments.
Figure 53:
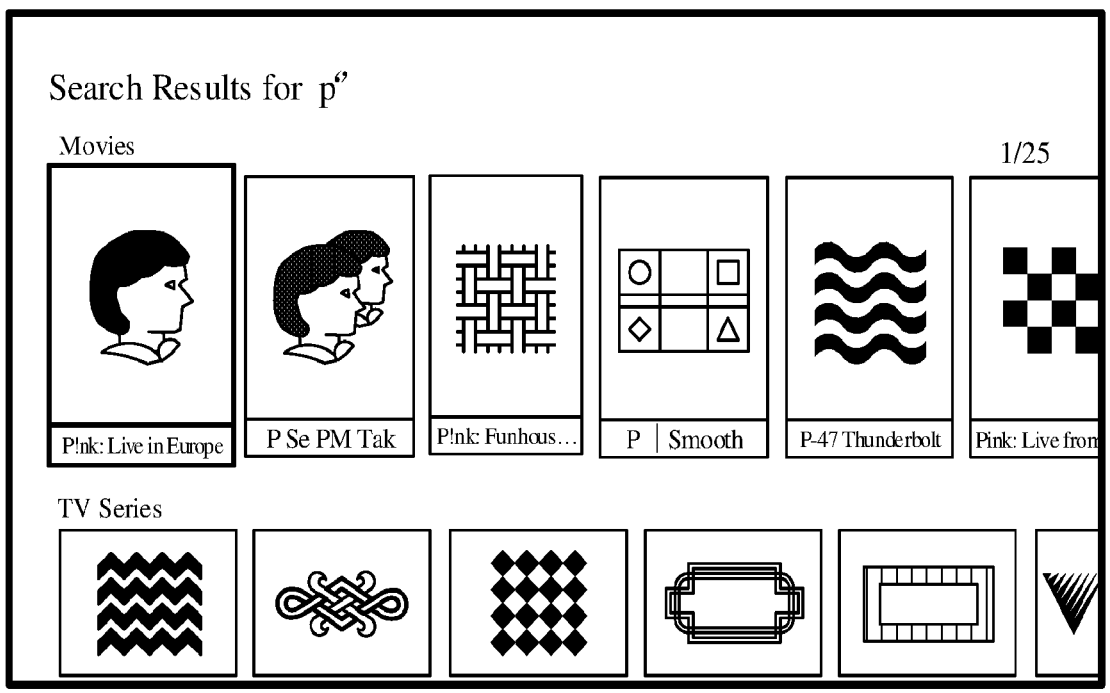
FIG. 53 is a schematic diagram of a display page according to some embodiments.

FIG. 52 is a control flowchart of the controller 250 according to some embodiments. FIG. 53 is a schematic diagram of a display page according to some embodiments.

As shown in FIG. 52, the controller 250 may receive a search command input from the user to the display apparatus 200. The search command includes content the user wants to search for. The search content may be a key phase, a keyword or a specific full name. For example, if the full name of the content the user wants to search for is "APP", the user may input letters "A", "P" or "AP", or the full name "APP".

Then, in response to the search command, the controller 250 obtains search results associated with the user's search content, and places the search results according to their respective categories, thereby forming the display page. In the embodiments of the disclosure, the display page presented finally by the display 260 under control of the controller 250 is as shown in FIG. 53. The search results in the display page are shown in the waterfall manner. First, the asset categories to which the search results belong are shown longitudinally on the display page in sequence, and then the search results under each asset category are displayed horizontally in order. For example, if the user's search content is the letter "P", the asset categories displayed on the display page may include but are not limited to "Movies", "TV Series", "Apps", "Topic", "channels", etc. Then, under the title "Movies", search results of some movie resources are displayed. Under the title "TV Series", search results of some TV series resources are displayed. Under the title "Apps", search results of some application resources are displayed. Under the title "channels", search results of some channel resources are displayed.

As shown in FIG. 53, the search results are usually displayed in two parts. One part is content titles, such as names of the movie resources, names of the TV series resources, names of Apps, names of Topic, and names of channels. The other part is images corresponding to the content titles, such as posters of the movie resources, posters of the TV series resources, icons of Apps, covers of Topics, and logos of channels. The content titles usually include the search content input by the user. For example, if the user inputs the letter "P", the content titles of all search results may have the letter "P".

In addition, since the search results often include the images, the quantity of images that may be displayed on a screen of the display 260 is limited. In order to display more content on the screen, in the embodiments of the disclosure, the display page is set as a page capable of expanding horizontally and longitudinally, so a plurality of asset categories may be displayed on a page, and a plurality of search results may also be displayed under each asset category. Even if the screen of the display 260 may only present some of the search results and asset categories, as long as the user inputs a command, the rest of the asset categories may be presented longitudinally or the rest of the search results may be presented horizontally.

Figure 54:
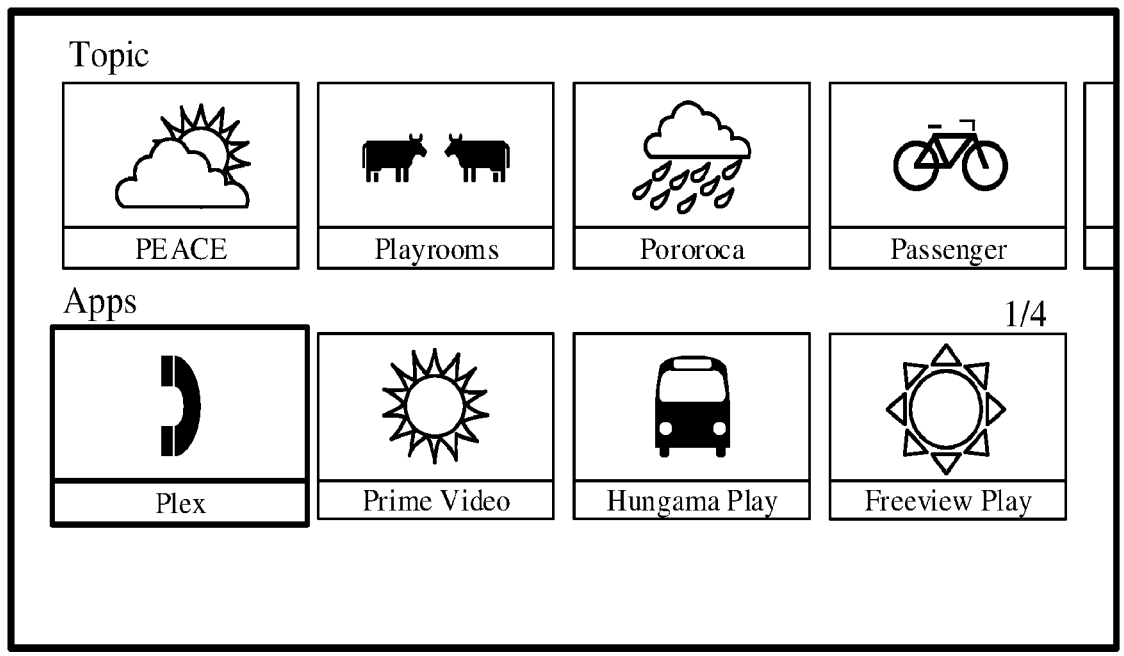
FIG. 54 is a second schematic diagram of a display page according to some embodiments.
Figure 55:
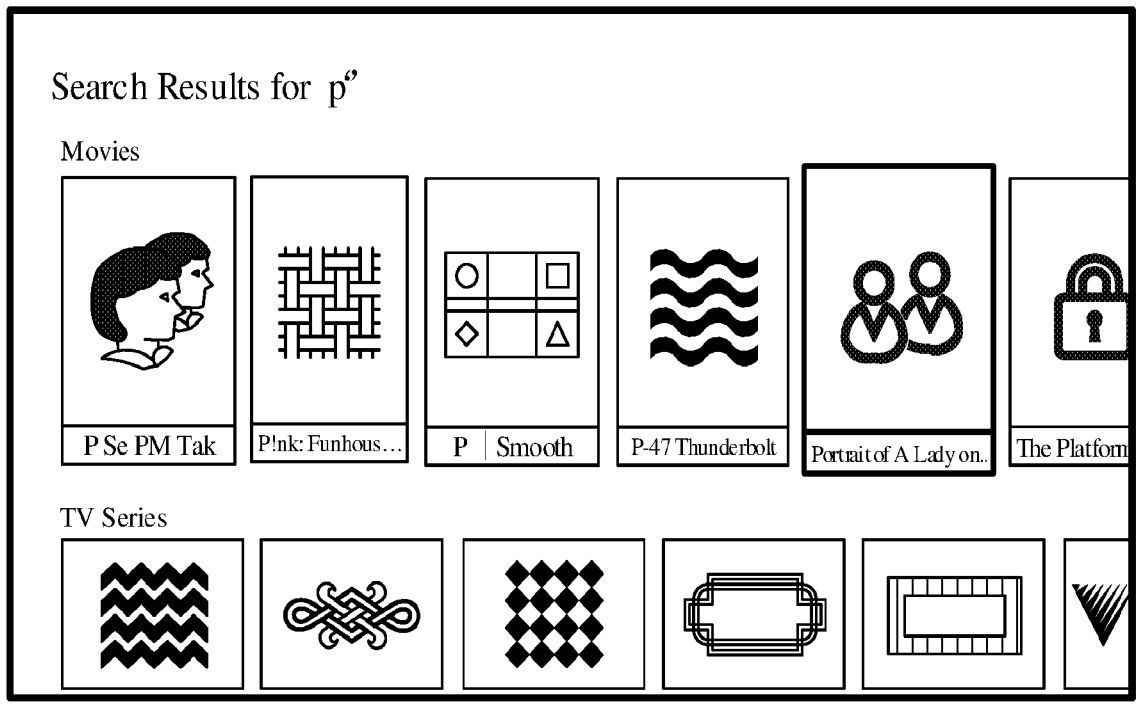
FIG. 55 is a third schematic diagram of a display page according to some embodiments.

FIG. 54 is a second schematic diagram of the display page according to some embodiments. FIG. 55 is a third schematic diagram of the display page according to some embodiments.

In the display page as shown in FIG. 53, content under the title "Movies" may only be shown horizontally at present. After the user selects the focus frame and move the focus frame down, the focus frame may automatically skip to a position of the search results of a next category title, so that the display page presents some of the search results under the title "TV Series". Or, the user continues to select to move the focus frame down, so that the focus frame skips to the position of the search results under the title "Apps", as shown in FIG. 54.

Further, in the display page as shown in FIG. 53, only part of the search results may be displayed horizontally at present. When the user selects to move the focus to the right continuously, the display page may display the rest of the movies resources under the title "Movies", as shown in FIG. 55.

It should be noted that, in the embodiments of the disclosure, the quantities of resource categories and search results that may be presented on a page of the display page need to be determined according to a set size of the display images. If the display images are set to be large, as shown in FIG. 53, only the search results of a single resource category may be completely displayed on a page. If the display images are set to be small, as shown in FIG. 54, the search results of two resource categories may be completely presented on a page.

As shown in FIG. 52, after the display page is presented for the user on the display 260, the user may input a command for moving the focus again according to the visible content. Then the controller 250 controls the focus frame on the display page to move up, down, left or right, to select a target search result that the user wants to view. In addition, the selected target search result may be enlarged for display, making it more prominent and convenient for the user to view. For example, as shown in FIG. 53, when the user selects a first movie resource under the title "Movies", a name and poster of this movie resource may be enlarged compared with other movie resources for the purpose of highlighting.

In the embodiments of the disclosure, a manner in which the user inputs the various commands includes, but is not limited to, inputting commands by pressing a button on the remote control, inputting commands by voice, and so on.

As can be seen from the above, in the display apparatus 200 in the embodiments of the disclosure, the controller 250 may receive the user's search command, and control the display 260 to show the display page including the search results. The search results are presented on the display page according to different resource categories. Each search result includes the content title and the display image corresponding to the content title, and the content title includes the user's search content. Moreover, the display page may expand horizontally and longitudinally to display more resource categories and to display more search results under each resource category. Then, the controller 250 controls the focus frame on the display page to move to the position of the target search result that the user wants to view in response to the command for moving the focus from the user, and controls the target search result to be enlarged for display for the user to view. It can be seen that in the embodiments of the disclosure, the search results may be shown in the waterfall manner, so that the search results are more intuitively and clearly presented to the user. Meanwhile, more types of search results are provided for the user, thereby improving the user experience.

Figure 56:
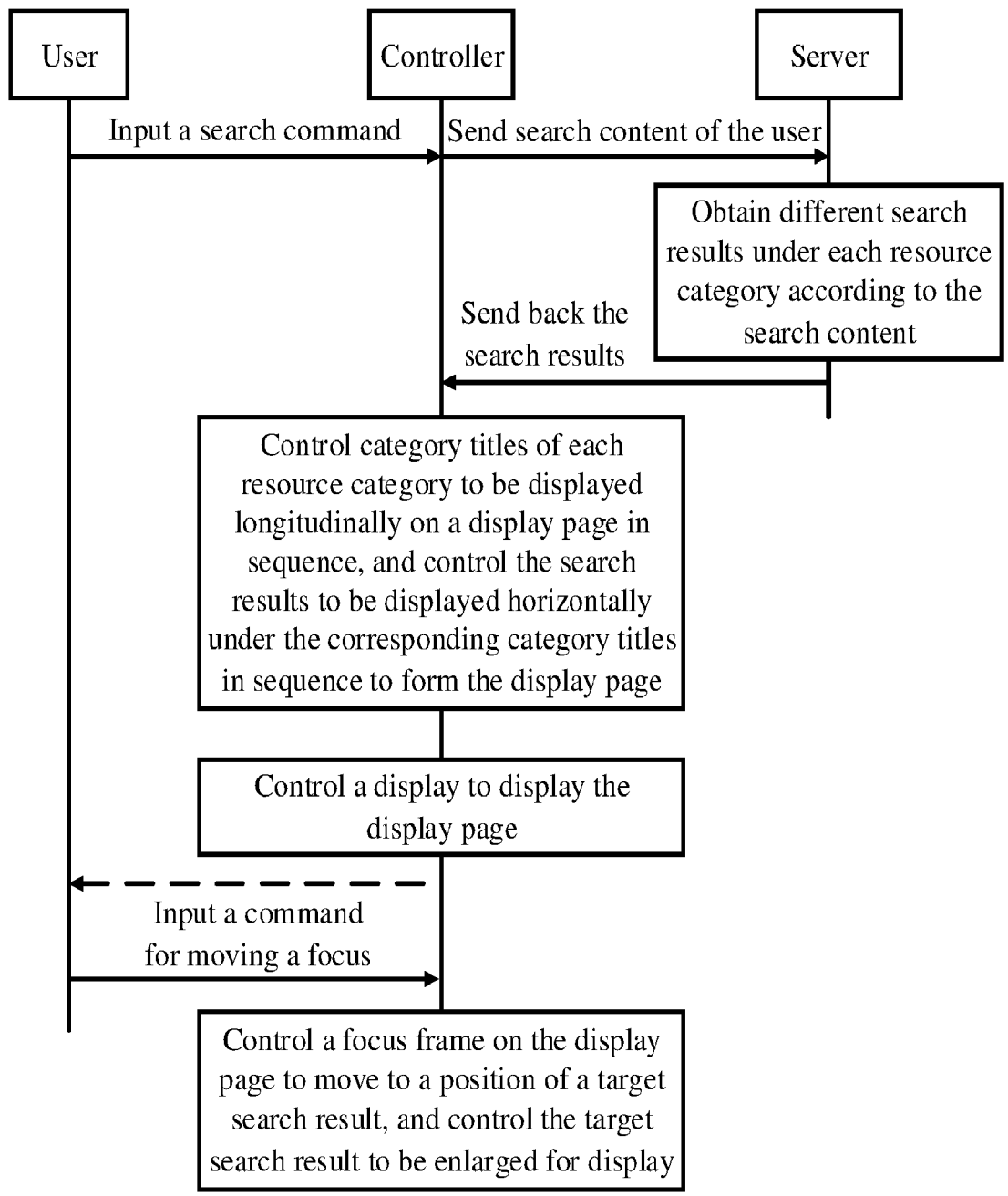
FIG. 56 is a second control flowchart of a controller 250 according to some embodiments.

FIG. 56 is a second control flowchart of the controller 250 according to some embodiments.

In some embodiments, the display apparatus 200 itself does not store many resource categories. In order to obtain more comprehensive search results, the controller 250 may send the user's search content to a server after receiving the search command from the user, and ask the server to search for more comprehensive results. Then, the server obtains different search results under each resource category according to the search content, and sends these search results back to the controller 250.

The controller 250 controls the category titles of each resource category to be presented longitudinally on the display page in sequence, and controls each search result to be presented horizontally below the corresponding category titles in sequence, as shown in FIGS. 53 and 54.

Then, the controller 250 receives a command for moving the focus from the user, controls the focus frame on the display page to move to the position of the target search result, and controls the target search result to be enlarged for display.

It can be seen that, in some embodiments, the controller 250 may also provide the user with more comprehensive search results by means of the powerful search capability of the server.

Figure 57:
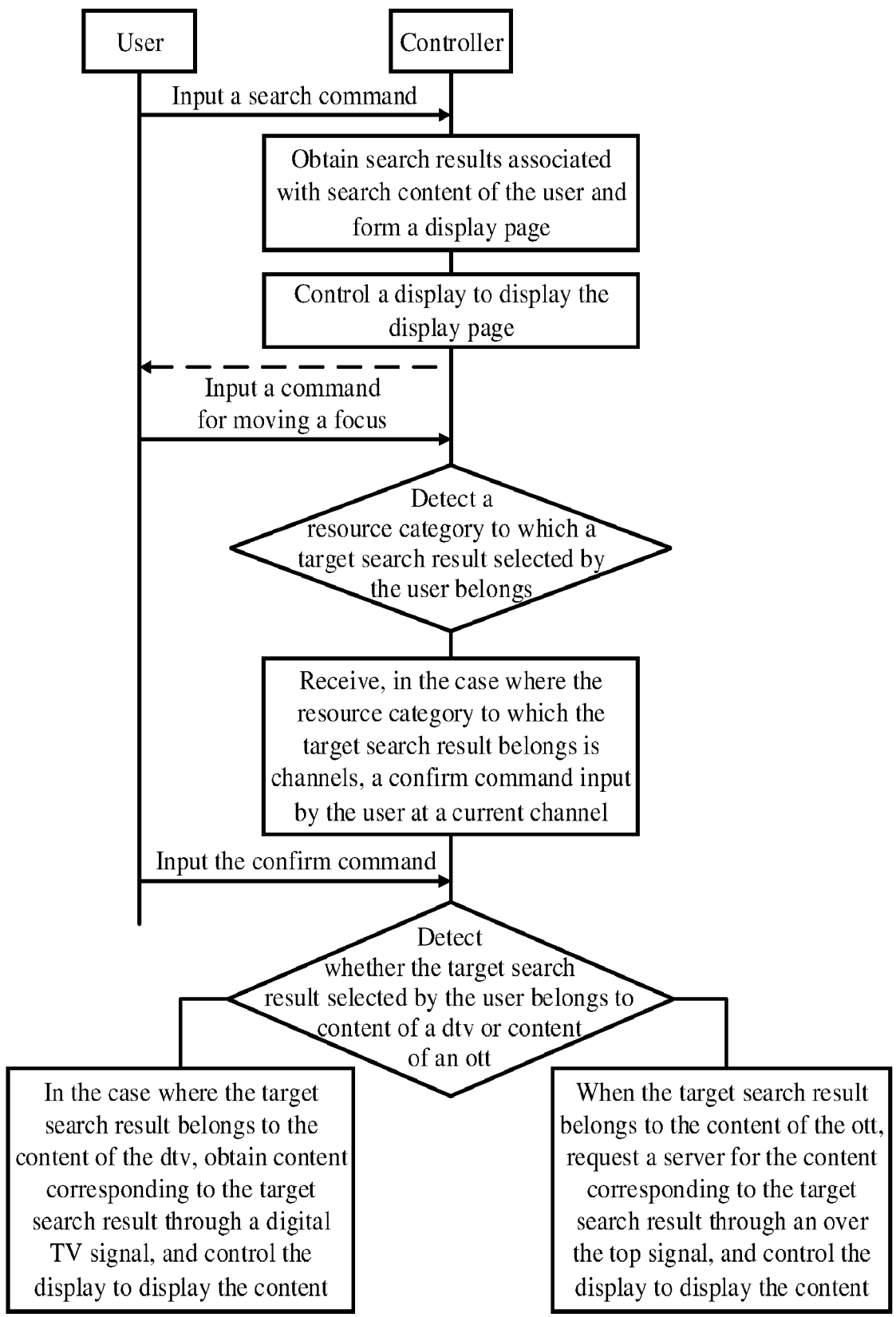
FIG. 57 is a third control flowchart of a controller 250 according to some embodiments.

FIG. 57 is a third control flowchart of the controller 250 according to some embodiments.

In some embodiments, the channels may also include digital TV (dtv) channels and over the top (ott) channels. Content of a digital TV (dtv) is channel data obtained by the controller 250 of the display apparatus 200 through connecting signal lines, satellites and so on. Content of the over the top (ott) is channel data obtained by the controller 250 from the server. Therefore, as shown in FIG. 57, in some embodiments, the controller 250 also needs to determine a resource category to which the target search result selected by the user belongs. In the case where the resource category to which the target search result belongs is a channel, the controller 250 receives a confirm command from the user under the current TV channel, and in response to the command, whether the target search result selected by the user belongs to the content of the digital TV (dtv) or the content of the over the top (ott) will be determined.

Generally, channel information of each channel is stored in a database of the display apparatus 200, and whether a channel is a digital TV (dtv) channel or an over the top (ott) channel is distinguished in the channel information using channel type (tvType). When tvType is 2, it means that the channel is the digital TV (dtv) channel. When the tvType is 100, it means that the channel is the over the top (ott) channel.

Then, in the case where the target search result belongs to the content of the digital television (dtv), the controller 250 obtains the content corresponding to the target search result through a digital television signal, and controls the display 260 to show the content, namely controlling the display 260 to show content of a target digital TV channel selected by the user. Or, in the case where the target search result belongs to the content of the over the top (ott), the controller 250 requests the server for the content corresponding to the target search result through an Internet TV signal, and controls the display 260 to present the content, namely controlling the display 260 to present content of a target ott channel selected by the user.

Figure 58:
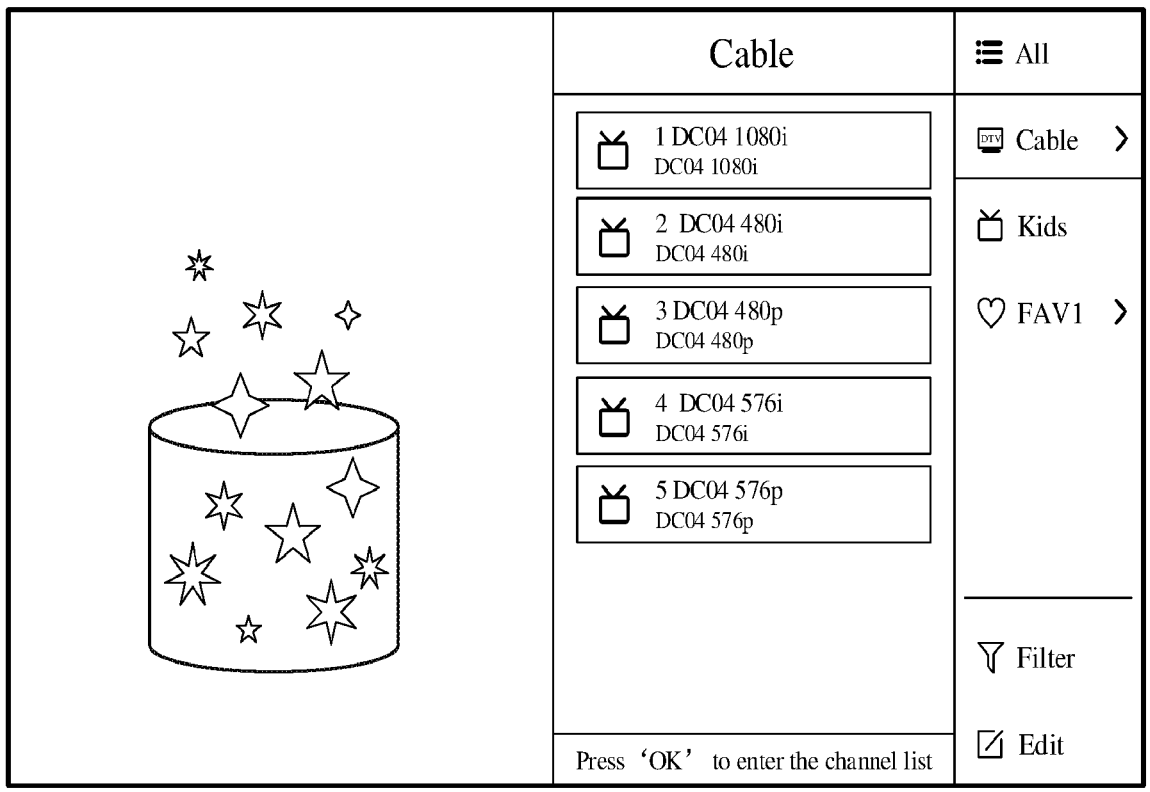
FIG. 58 is a schematic diagram of a display page of a digital TV (dtv) according to some embodiments.

FIG. 58 is a schematic diagram of a display page of the digital TV (dtv) according to some embodiments.

In some embodiments, after the display 260 presents the channel content of the digital TV (dtv), the display page of the channel may also provide some digital TV channel options for the user to select, such as "1 DC04 1080i", "2 DC04 480i", "3 DC04 480p", "4 DC04 576i", and "5 DC04 576p" as shown in FIG. 58.

Figure 59:
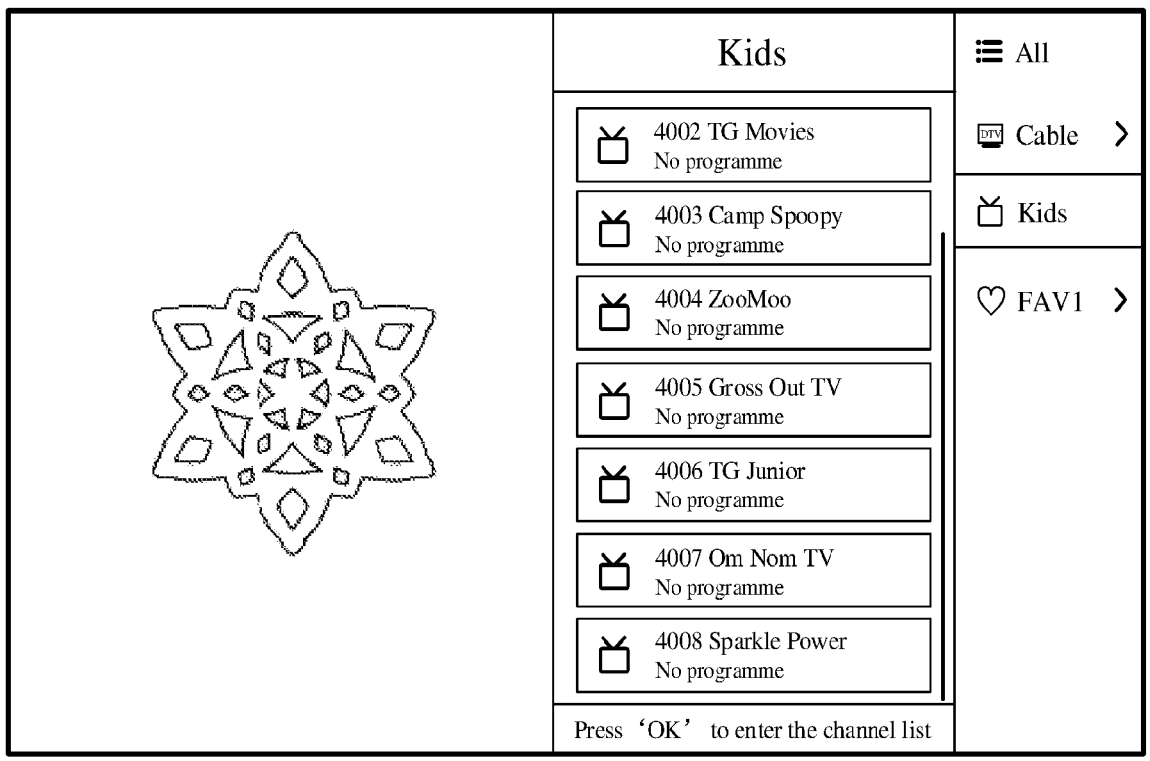
FIG. 59 is a schematic diagram of a display page of an over the top (ott) according to some embodiments.

FIG. 59 is a schematic diagram of a display page of the over the top (ott) according to some embodiments.

In some embodiments, after the display 260 presents the channel content of the over the top (ott), the display page of the channel may also provide some over the top channel options for the user to select, such as "4002 TG Movies", "4003 Camp Spoopy", "4004 ZooMoo", "4005 Gross Out TV", and "4006 TG Junior" as shown in FIG. 59.

In addition, in practical application, the channel information of the digital TV (dtv) and the over the top (ott) may be provided by the same display page, and different types of channels may also be distinguished on the display page with different content for title bars. For example, as shown in FIGS. 58-59, a channel list of the digital TV (dtv) is stored correspondingly under a title bar "Cable", and a channel list of the over the top (ott) is stored correspondingly under a title bar "Kids". The user may select different types of channels corresponding to the title bars by selecting different title bars. After the selection is made, the display 260 may continue to present the content of the channel selected by the user. At the same time, the display page may also provide some "channel favorites" functions, such as an option "FAV1" shown in FIG. 58 and FIG. 59. After the user selects this option, the display 260 may display digital TV channels and/or over the top channels the user has selected as favorites.

Figure 60:
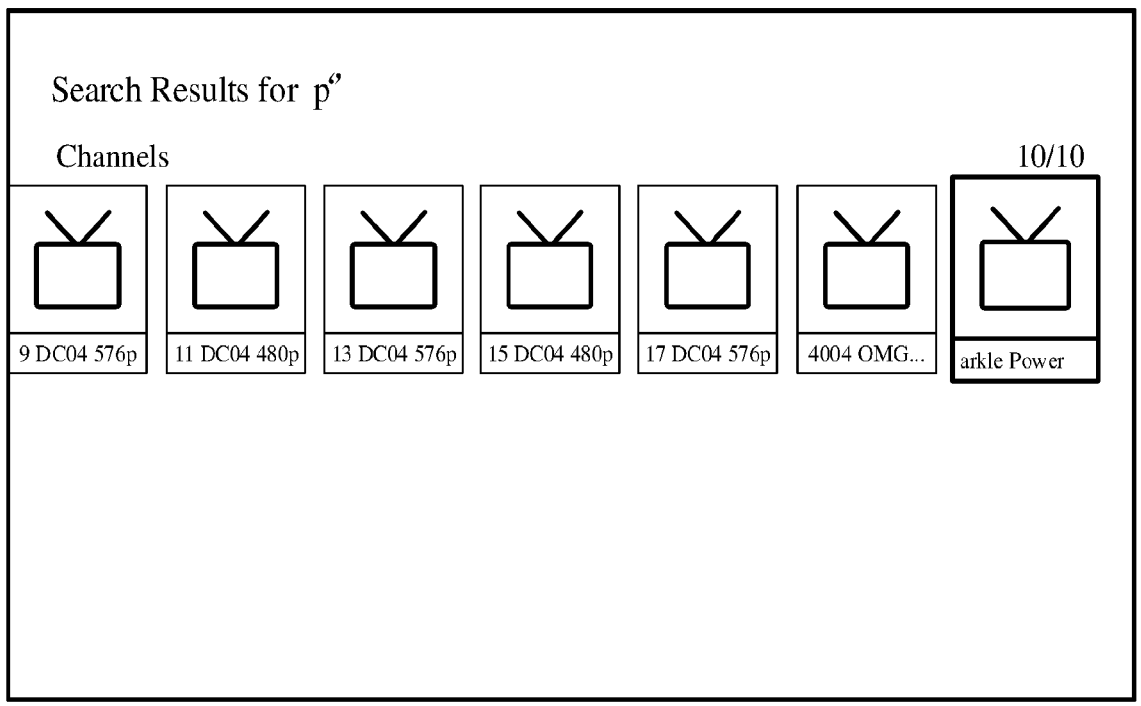
FIG. 60 is a fourth schematic diagram of a display page according to some embodiments.

FIG. 60 is a fourth schematic diagram of the display page according to some embodiments.

As shown in FIG. 60, in some embodiments, if the content searched by the user is the letter "P", a plurality of channels with channel names including "P" may be displayed under the category Channels on the display page. Taking a channel name "17 DC04 576p" as an example, 17 represents a channel number, and DC04 576p represents a channel name. Generally, content of channels with the channel number below 4000 belongs to the content of the digital TV (dtv), and content of channels with the channel number above 4000 belongs to the content of the over the top (ott). Displaying channel names in the manner as shown in FIG. 60 is also beneficial for the user to directly determine the channel category of a target channel through the name.

Figure 61:
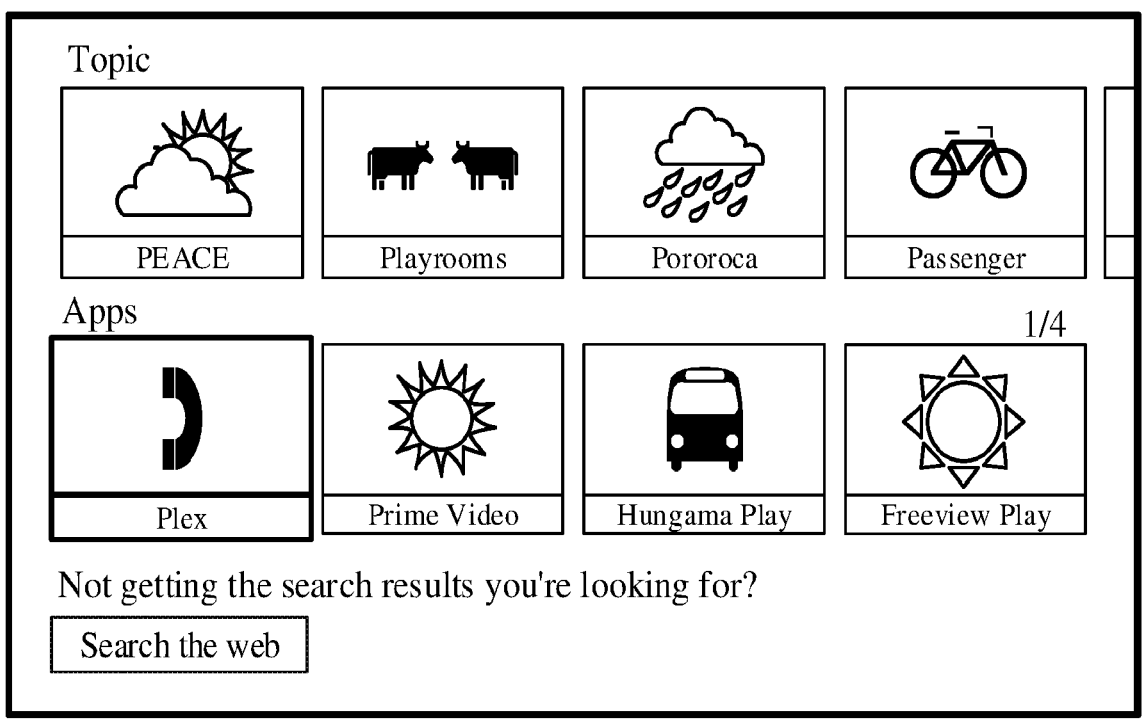
FIG. 61 is a fifth schematic diagram of a display page according to some embodiments.
Figure 62:
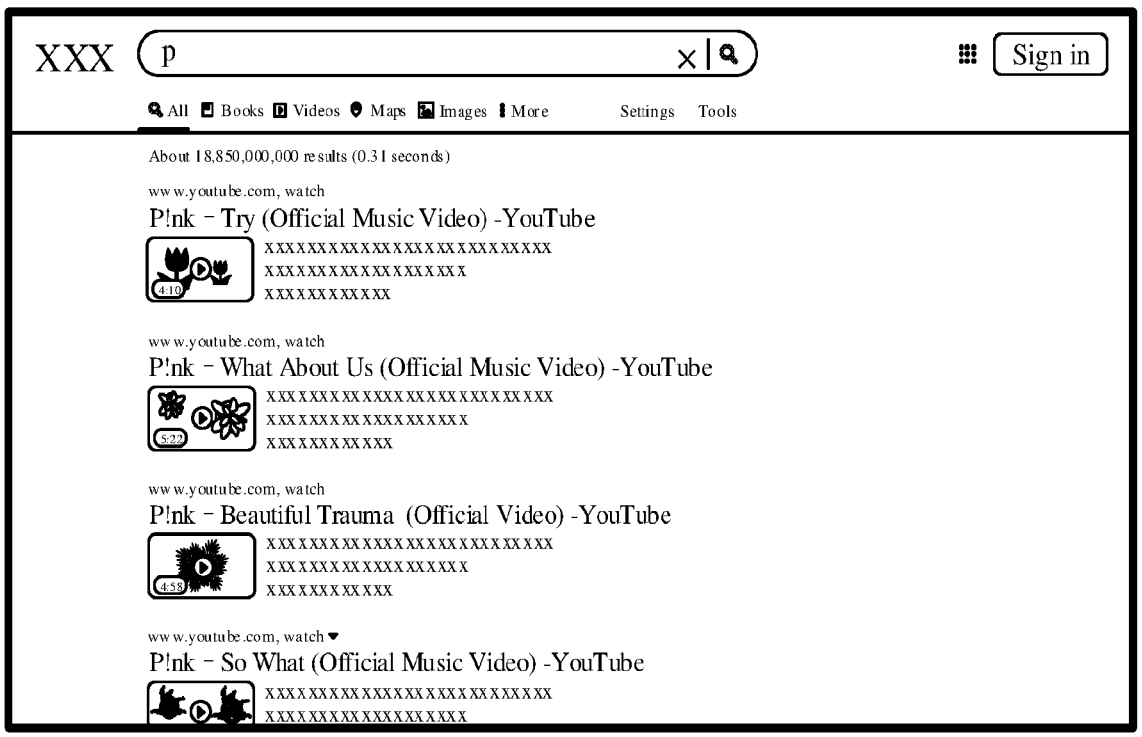
FIG. 62 is a schematic diagram of a web search page according to some embodiments.

FIG. 61 is a fifth schematic diagram of the display page according to some embodiments. FIG. 62 is a schematic diagram of a web search page according to some embodiments.

In some embodiments, as shown in FIG. 61, an option "Search the web" is also provided on the display page. When the search results shown on the display 260 are less relevant to the content the user wants, or the search results are not the content the user needs, the user may select the option "Search the web", so that the display 260 presents the web search page as shown in FIG. 62, and the user may then use the page to search for related content. The specific process may be that the user first inputs a command for moving the focus to the display apparatus 200, and the controller 250 controls the focus frame on the display page to move to the position of the option "Search the web" in response to the command for moving the focus. In addition, the controller 250 controls the display 260 to present the web search page after the user's confirmation.

It can be seen that, in some embodiments, the display page may also provide the user with a web search function, and the user may search for more and more accurate search results with this function.

Figure 63:
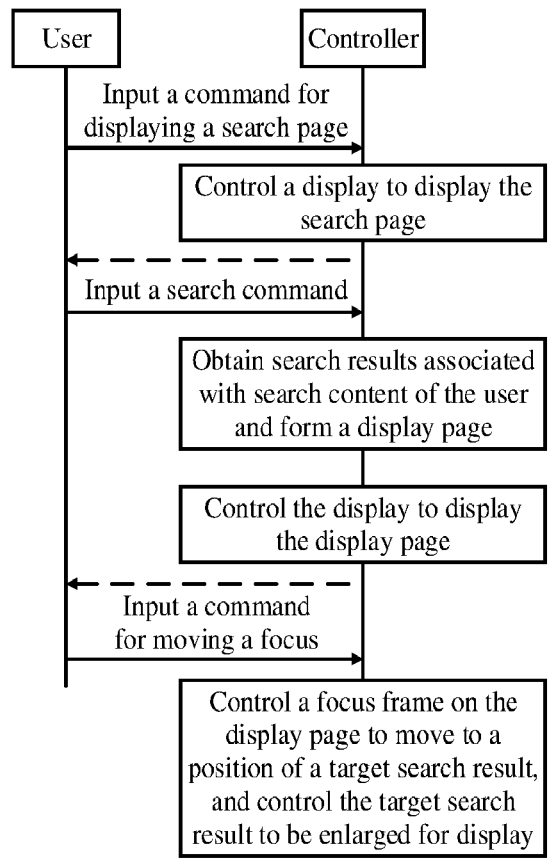
FIG. 63 is a fourth flowchart of a controller 250 according to some embodiments.
Figure 64:
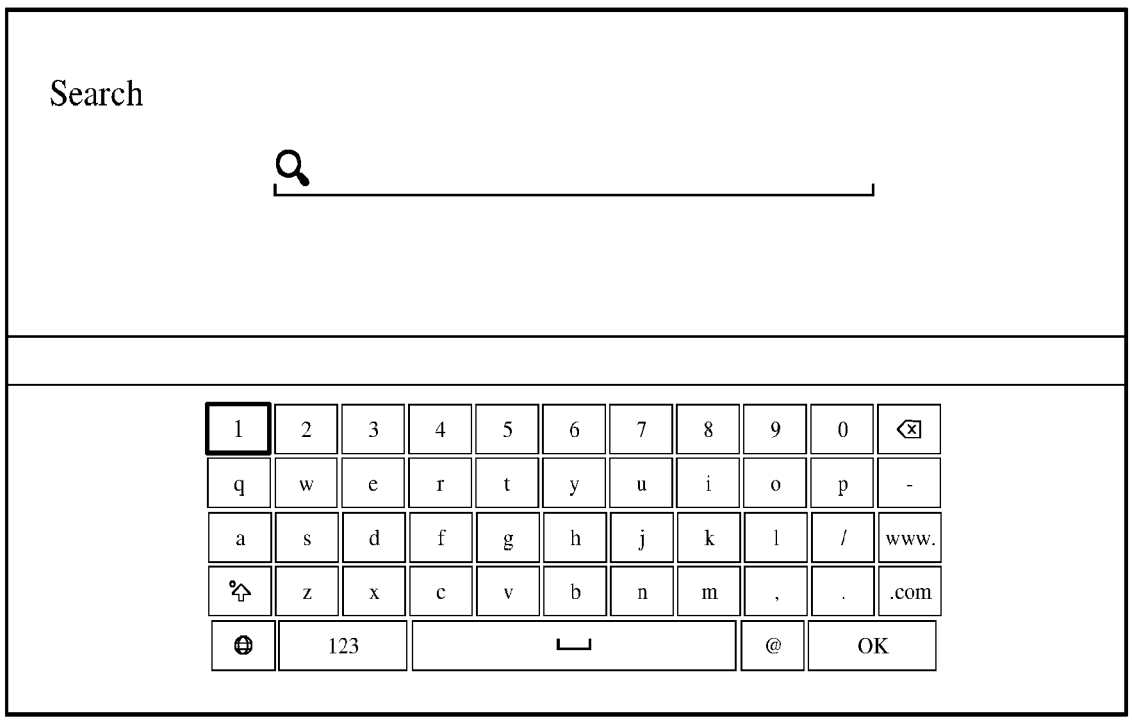
FIG. 64 is a schematic diagram of a search page according to some embodiments.

FIG. 63 is a fourth control flowchart of the controller 250 according to some embodiments. FIG. 64 is a schematic diagram of a search page according to some embodiments.

In some embodiments, the user needs to enter the search content on the search page and confirm it, and then the display 260 may present the display page including the search results. Before this, the controller 250 needs to first receive a command for displaying the search page input by the user, and then controls the display 260 to present the search page. For the specific process, please see the flowchart shown in FIG. 63. The search page, as shown in FIG. 64, includes an input box for the search content and an input keyboard. The user may select a target letter on the input keyboard by pressing direction keys on the remote control, or input the target letter by voice. The target letter is displayed in the input box for the search content, and after the user confirms that it is correct, the user selects an "OK" button on the input keyboard. Then, the controller 250 obtains different search results under different resource categories according to the search content input by the user.

Figure 65:
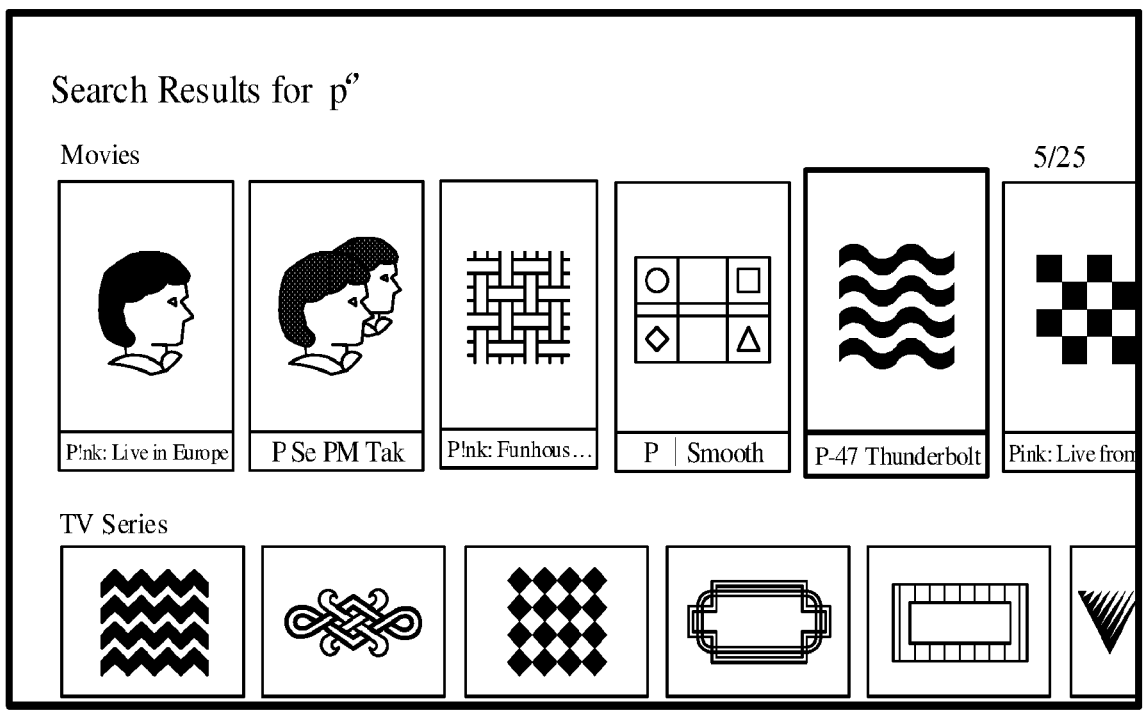
FIG. 65 is a sixth schematic diagram of a display page according to some embodiments.
Figure 66:
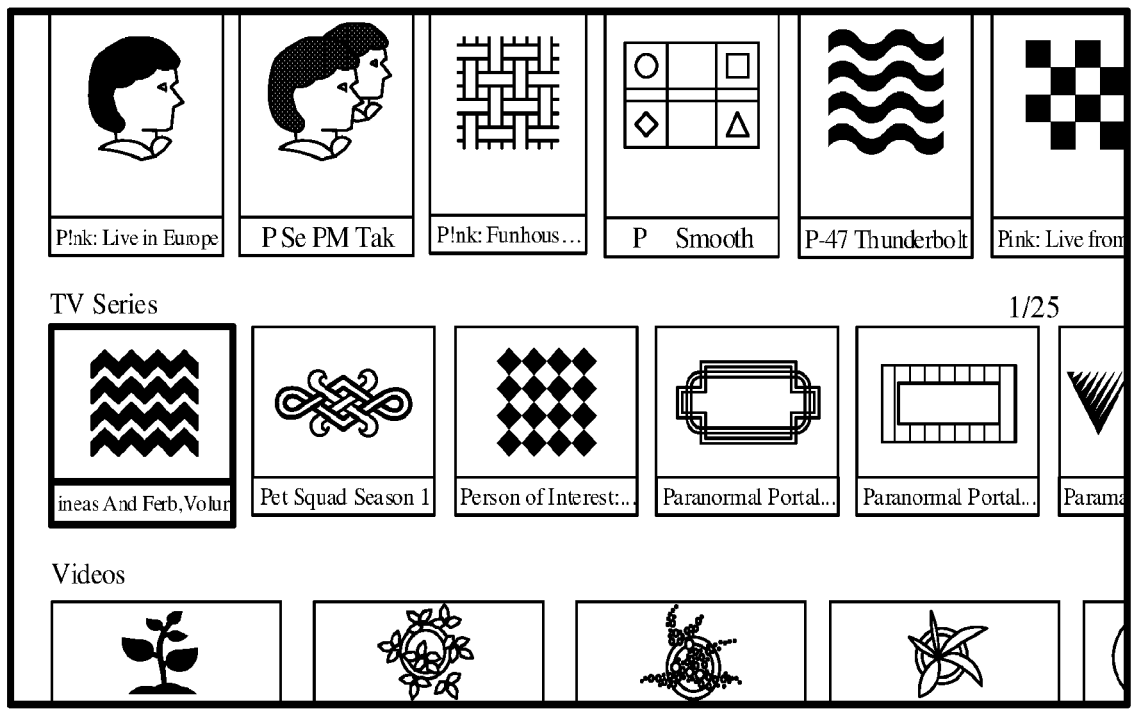
FIG. 66 is a seventh schematic diagram of a display page according to some embodiments.

FIG. 65 is a sixth schematic diagram of the display page according to some embodiments. FIG. 66 is a seventh schematic diagram of the display age according to some embodiments.

Generally, a default position of the focus frame on the display page is a first search result under a first resource category. However, after a series of operations by the user, the focus frame may be moved to different positions under each resource category, and these positions may be positions of search results with higher interest from the user. Therefore, in some embodiments, the controller 250 needs to save the last position of the focus frame under each resource category, so that when the user browses to a certain resource category again, the focus frame may be rapidly located to where the user browsed last time. A specific manner may be: when the user selects to browse to search results under other category titles adjacent to a current category title, the controller 250 takes the position of the focus frame under the current category title as a default selection position under the current category title; and when the user selects to browse to search results under the current category title again, the controller 250 controls the focus frame to move directly to the default selection position.

For example, in the display page shown in FIG. 65, the user is currently browsing a fifth movie resource "P-47 Thunderbolt" under a first resource category title "Movies", and at this time, the position of the focus frame is here. If the user directly browses TV series in the next resource category title "TV Series", as shown in FIG. 66, the position of the fifth movie resource "P-47 Thunderbolt" under the category title "Movies" needs to be used as the default selection position of the focus frame under the category title "Movies". After the user browses the search results of other resource categories and returns to browse the movie resources under the category title "Movies" again, the controller 250 directly moves the focus frame to the previously set default selection position, as shown in FIG. 65.

The display page in the embodiments of the disclosure is described by taking the category titles being longitudinally arranged in sequence as an example. In some other embodiments, the category titles may also be arranged horizontally on the top of the display page in sequence. Then, different search results may be arranged longitudinally under each category title in sequence. The search results are also composed of content titles and display images, thereby forming a display page in a vertical waterfall manner.

In addition to the resource categories of Movies, TV Series, Apps, Topic, channels, etc. mentioned in the above embodiments, the embodiments of the disclosure may further include H5 (recommended content on a web page, such as advertisements), Video, Video_Series (video series), API (Media asset request interface), Daily_Deviant (Art pictures), etc., which are not listed here.

As can be seen from the above, the display apparatus 200 in the embodiments of the disclosure may display the search results obtained according to the search content input by the user in the waterfall manner. In addition, the search results are not only displayed in the form of a plurality of category titles, but also the content titles, the display images, etc. of the search results are displayed. In this way, the search results may be more intuitively and clearly displayed to the user. At the same time, more types of search results may be provided to the user, thereby improving the user experience.

Figure 67:
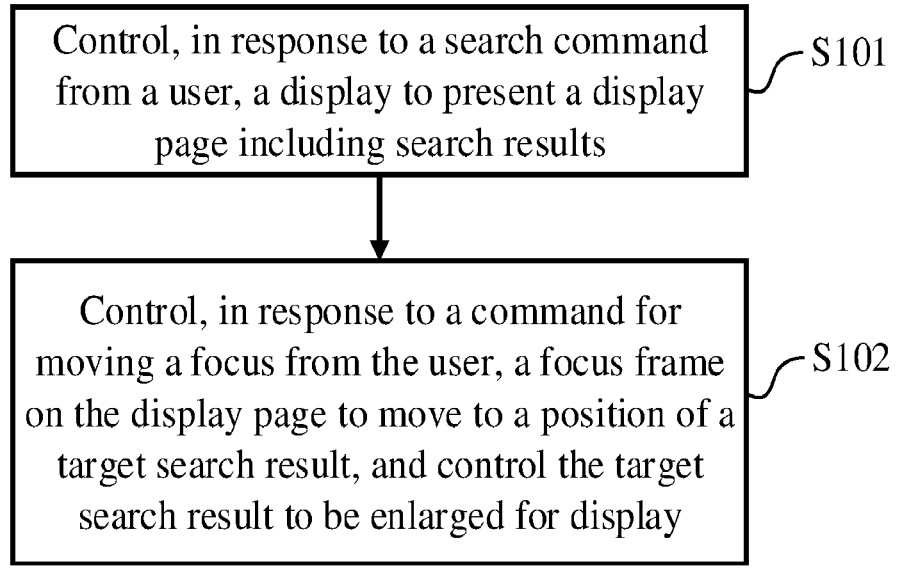
FIG. 67 is a flowchart of a method for displaying search results on a display apparatus according to some embodiments.

FIG. 67 is a flowchart of the method for displaying the search results on the display apparatus according to some embodiments.

The embodiments of the disclosure provide the method for displaying the search results on the display apparatus. The method may be applied to components that may implement control functions, such as the controller 250 described in the above embodiments. As shown in FIG. 67, the method may include the following steps.

Step S101, in response to a search command from a user, a display 260 is controlled to present a display page including the search results. The search results are presented according to different resource categories, and each search result includes a content title and a display image corresponding to the content title. The content titles include search content input by the user. The display page is as shown in FIG. 53, and may expand horizontally and longitudinally to display more resource categories and to display more search results under each resource category.

Step S102, in response to a command for moving a focus from the user, a focus frame on the display page is controlled to move to a position of a target search result, and the target search result is controlled to be enlarged for display.

The method for displaying the search results on the display apparatus in the embodiments of the disclosure may display the search results in a waterfall manner, so that the search results are more intuitively and clearly presented to the user. At the same time, more types of search results are provided for the user, thereby improving user experience.

In some embodiments, the method further includes: in response to a search command from the user, different search results under different resource categories are requested from a server; and category titles of each resource category are controlled to be presented longitudinally on the display page in sequence, and the search results are controlled to be presented horizontally below the corresponding category titles in sequence.

In some embodiments, the method further includes: in the case where a resource category to which the target search result selected by the user belongs is a channel, whether the target search result belongs to content of a digital TV (dtv) or content of over the top (ott) is determined in response to a confirm command from the user. In the case where the target search result belongs to the content of the digital TV (dtv), content corresponding to the target search result is obtained through a digital TV signal, and the display 260 is controlled to present the content corresponding to the target search result. When the target search result belongs to the content of the over the top (ott), the server is requested for the content corresponding to the target search result through an over the top signal, and the display 260 is controlled to present the content corresponding to the target search result.

In some embodiments, the method further includes: in response to a command for moving the focus from the user, the focus frame on the display page is controlled to move to a position of an option "Search the web". The option "Search the web" is located at the bottom of all category titles on the display page, and is configured to provide the user with an entry for searching the web.

In some embodiments, the method further includes: in response to a command for displaying a search page from the user, the display 260 is controlled to present the search page. The search page includes an input box for the search content and an input keyboard.

In some embodiments, the method further includes: when the user selects to browse search results under other category titles adjacent to a current category title, a position of the focus frame below the current category title is used as a default selection position below the current category title; and when the user selects to browse search results under the current category title again, the focus frame is controlled to move directly to the default selection position.

Since the method for displaying the search results on the display apparatus described in the embodiments of the disclosure may be applied to the controller 250 as described in the above embodiments, other content regarding the method for displaying the search results on the display apparatus in the embodiments of the disclosure may refer to the above embodiments, which will not be repeated here.

Some users want the display apparatus to have a prompt function. For example, when the focus moves to different display content, the display apparatus may display different prompt content. The display content may be an APP icon, a function operation region, a play window, etc. In order to meet different user requirements, some display apparatuses are configured with prompt content. When the focus moves to the display content, the display apparatus may display prompt content related to the display content. For example, when the focus moves to an APP icon, prompt content "The icon may be moved by dragging" may be displayed on the display. In related art, prompt content is usually presented in a form of text, the position of the prompt content is fixed, the display effect is poor, and the prompt content is not easy to notice by the user.

In view of the above issue, an embodiment of the disclosure shows a display apparatus. The display apparatus includes a display and a controller. The operation flow of the display apparatus is described below with reference to specific accompanying drawings.

Figure 68:
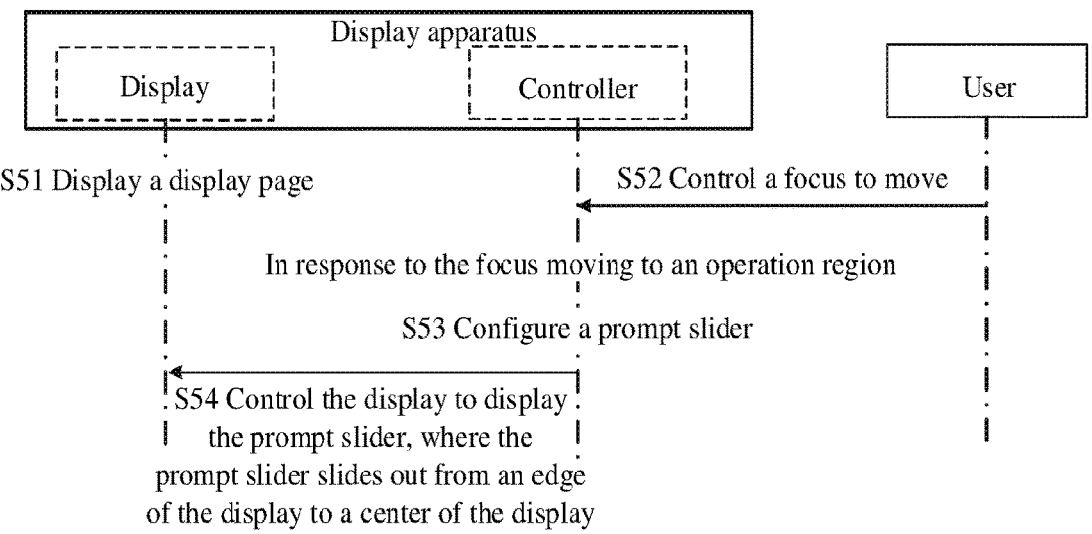
FIG. 68 is a flowchart of an interaction between a user and a display apparatus according to some embodiments.

FIG. 68 is a flowchart of an interaction between a user and the display apparatus according to some embodiments.

The display executes step S51 to present a display page.

In the embodiments, the display page may include an operation region. In response to a touch on the operation region, the controller controls the display to present content corresponding to the operation region.

For example, in some embodiments, the operation region may be a video play control, and in response to a user's touch on the video play control, the controller controls the display to show a video corresponding to the playing control. In some embodiments, the operation region may also be an application icon, and in response to the user's touch on the application icon, the controller controls the display to show an application interface corresponding to the application icon.

It should be noted that the embodiments are merely examples for several forms of the operation regions. In practical application, the operation region may be in other forms, and the applicant does not intend to limit here.

Figure 69:
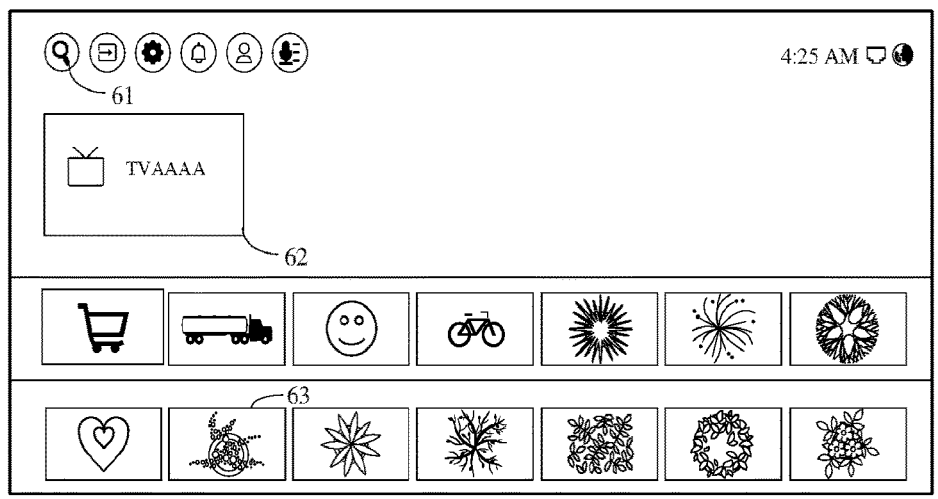
FIG. 69 is a schematic diagram of a display page according to some embodiments.

The display page is described below in combination with specific accompanying drawings. FIG. 69 is a schematic diagram of the display page according to some embodiments. It can be seen that the display page includes a plurality of operation regions, where the operation region 61 is a system control, the operation region 62 is the video play control, and the operation region 63 is the application icon.

The user executes step S52 to control a focus to move.

In the embodiment, the focus is configured to move in a controlled manner. There are a plurality of manners to control the focus to move.

For example, in some embodiments, the user may control the focus to move through a corresponding button on a remote control. For another example, in some embodiments, the controller may be equipped with a voice assistant APP, and accordingly, the user may control the focus to move through voice.

Figure 70:
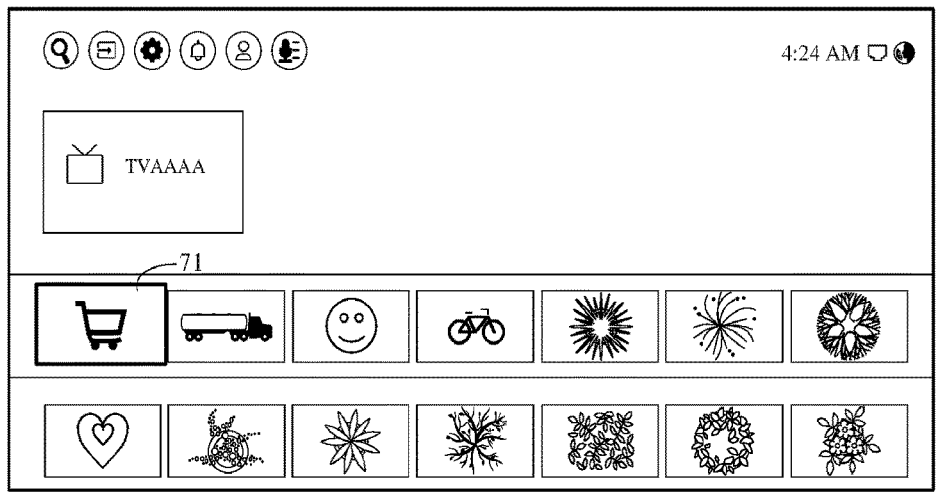
FIG. 70 is a schematic diagram of a display page according to some embodiments.

The display page in the movement process of the focus is illustrated below in combination with specific accompanying drawings. FIG. 70 is a schematic diagram of the display page according to some embodiments. In FIG. 70, the focus moves to an operation region 71.

In order to facilitate the user to know a position where the focus moves, a display form of the operation region where the focus is located may be configured different from display forms of other operation regions visually.

Referring to FIG. 70, as an implementation manner, when the focus moves to the operation region 71, an icon corresponding to the operation region 71 is larger than icons corresponding to other operation regions in size.

As an implementation manner, the focus may be presented on the display in a form of an arrow, and correspondingly, an arrow may appear in the operation region where the focus is located.

In response to the focus moving to the operation region, the controller executes step S53 to configure a prompt slider. The prompt slider is configured to display prompt content related to the operation region.

In the embodiments, an implementation manner for configuring the prompt slider may adopt a configuration manner commonly used in the art. As an implementation manner, the prompt content of the prompt slider may be fixed content.

To improve the user experience, in the embodiment, when the focus moves to the operation region, the controller controls the display to present the prompt content. The prompt content is related to the operation region.

As an embodiment, the operation region is a video play control, and correspondingly the prompt content may be a series of content related to the video play control, such as a brief about the playback content corresponding to the play control, actor information, and director information.

As an embodiment, the operation region is an application, and correspondingly the prompt content may be a series of content related to the application, such as an operation introduction of the application and a content introduction of the application.

In other embodiments, the prompt content may be configured according to requirements. Any content that can have prompting role may be used as the prompt content.

In the embodiments, the prompt content is presented in the form of the prompt slider. When the focus moves to the operation region, the prompt slider may slide out from an edge of the display. The prompt slider will be further illustrated below with reference to specific accompanying drawings.

Figure 71:
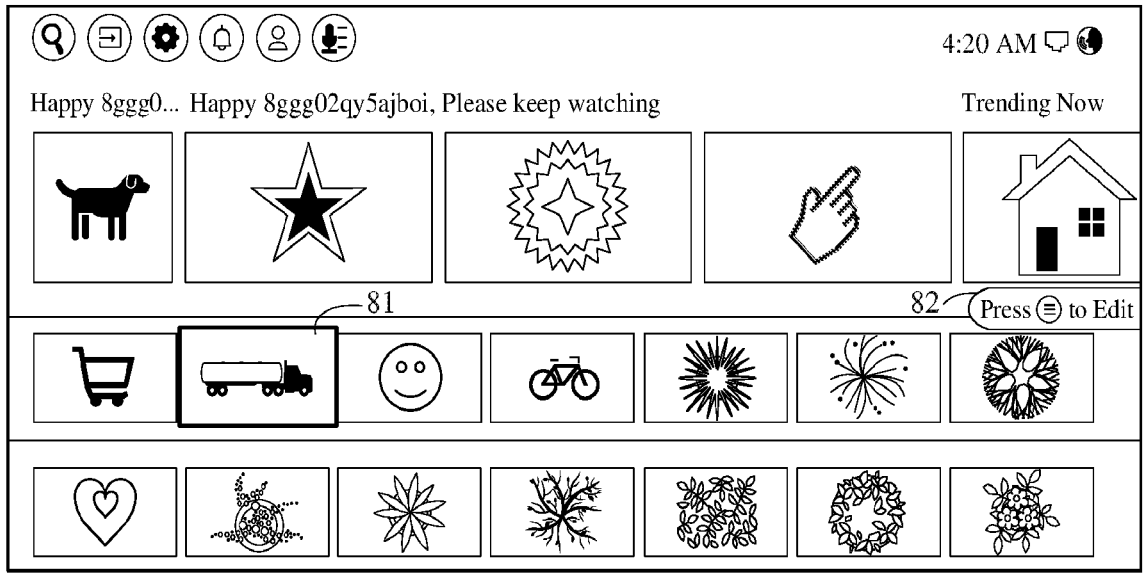
FIG. 71 is a schematic diagram of a display page according to some embodiments.

FIG. 71 is a schematic diagram of the display page according to some embodiments. In FIG. 71, the focus is moved to the operation region 81. The controller controls the display to present the prompt slider. In the embodiment shown in FIG. 71, the prompt slider 82 slides out from a right edge of the display, and content displayed on the prompt slider 82 is "Press to Edit".

Figure 72:
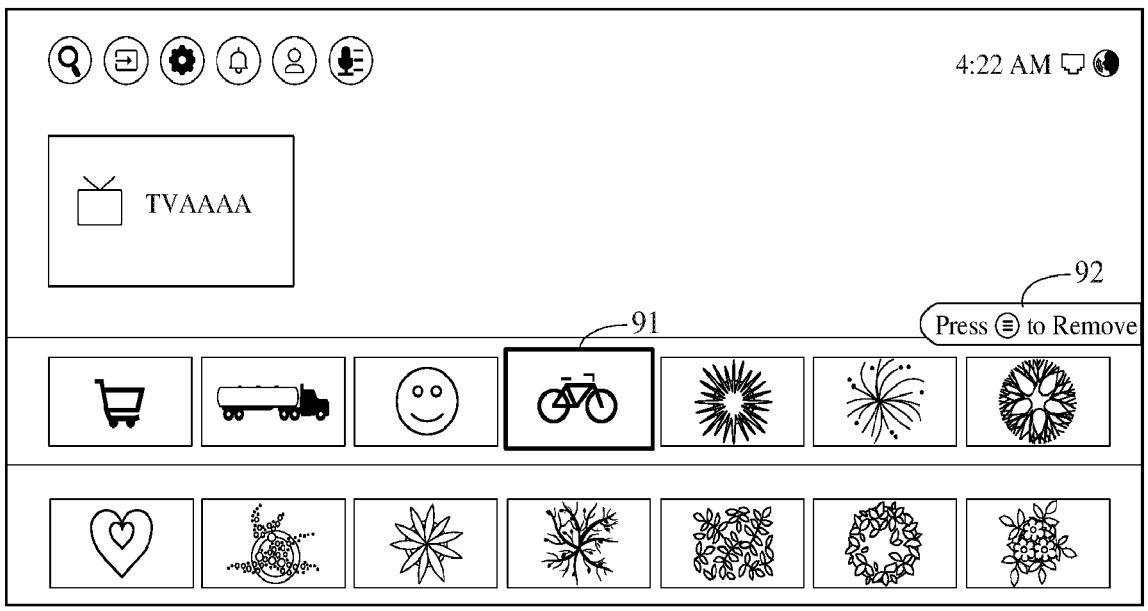
FIG. 72 is a schematic diagram of a display page according to some embodiments.

FIG. 72 is a schematic diagram of the display page according to some embodiments. In FIG. 72, the focus is moved to the operation region 91. The controller controls the display to present the prompt slider. In the embodiment shown in FIG. 72, the prompt slider 91 slides out from the right edge of the display, and content displayed on the prompt slider 92 is "Press to Remove".

It should be noted that FIG. 71 and FIG. 72 are merely examples to present the prompt content of the two kinds of prompt sliders. In other embodiments, the prompt content of the prompt slider may be not limited to the above two manners, and may take other forms.

S54, the display is controlled to present the prompt slider. The prompt slider slides out from the edge of the display to a center of the display.

Please refer to FIG. 71 and FIG. 72. In the embodiments shown in FIG. 71 and FIG. 72, the prompt slider slides from the right edge of the display to the center of the display in the process of displaying the prompt slider.

It should be noted that FIG. 71 and FIG. 72 are merely examples to display the sliding manners of the prompt slider. In other embodiments, the sliding manners of the prompt slider is not limited to the above two manners, and may take other forms.

As an embodiment, the prompt slider may include a fixed end and a sliding end. In the process of presenting the prompt slider, the fixed end is fixed on the edge of the display, and the sliding end slides out towards the center of the display.

In the embodiment, a sliding length of the prompt slider is related to the prompt content, and a width of the prompt slider may be a fixed value, or may be adapted to a width of the prompt content.

In a scenario where the width of the prompt slider is the fixed value, if the prompt content needs a large space for display, the sliding-out length of the prompt slider is long correspondingly. If the prompt content needs a small space for display, the sliding-out length of the prompt slider is short correspondingly. In the process of displaying the prompt slider, the fixed end is fixed to the edge of the display, the sliding end slides out towards the center of the display, and the sliding-out length of the prompt slider is adapted to the prompt content, that is, the prompt slider may just accommodate the prompt content.

As an embodiment, the fixed end of the prompt slider is in a right-angle shape so that the prompt slider may fit better with the edge of the display, there is no light leakage or other problems, and the user experience is good.

As an embodiment, the sliding end is in arc shape. The arc design is more likely to attract the user's attention. At the same time, our eyes may more easily adapt to changes in lines and information, realizing a good smooth transition in visual experience.

In order to further attract the user's attention to the prompt slider, the background of the prompt slider may be different from the background of the operation region. As an embodiment, the background of the prompt slider may be displayed in a gradient manner, for example, using gradient gray.

Displaying the background of the prompt slider in the gradient manner may allow the user to focus more on the entire prompt slider.

Figure 73:
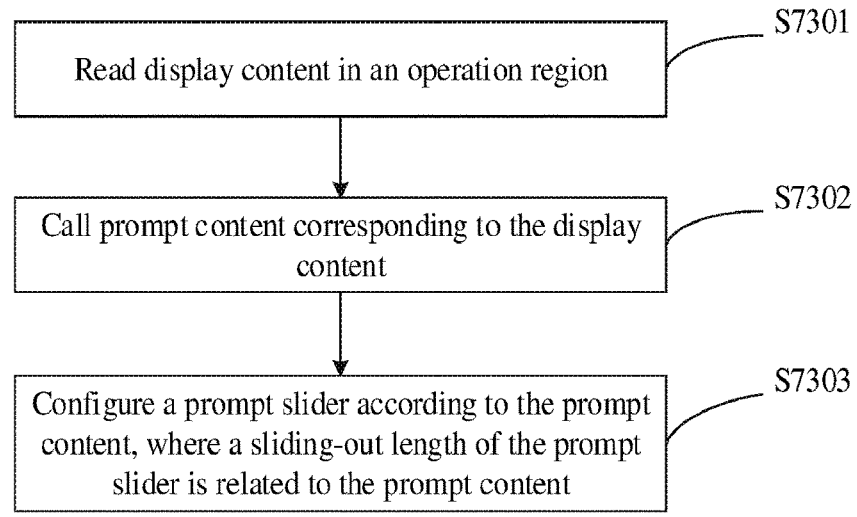
FIG. 73 is a flowchart of a manner for displaying a prompt slider according to some embodiments.

In some embodiments, in order to further improve the user experience, an embodiment further shows a manner for presenting a prompt slider. For details, please refer to FIG. 73. FIG. 73 is a flowchart of the manner for presenting the prompt slider according to the embodiment. It can be seen that, in response to a focus moving to an operation region, a controller is further configured to execute steps S7301 to S7303.

S7301, display content in the operation region is read.

There are various manners for reading the display content. The controller may store the display content of the operation region in advance, and when the focus moves to the operation region, the controller may directly call the display content corresponding to the operation region. The controller may directly identify the display content in the operation region. In other implementations, the controller may also use other implementation manners to read the display content.

S7302, prompt content corresponding to the display content is called.

In the embodiment, a corresponding relationship between the display content and the prompt content is stored in advance. In response to completing reading the display content, the controller calls the corresponding prompt content according to the pre-stored correspondence between the display content and the prompt content.

S7303, the prompt slider is configured according to the prompt content. A sliding-out length of the prompt slider is related to the prompt content.

In the embodiment, the prompt content presented on the prompt slider is not fixed, but varies according to corresponding display content of different operation regions, so the prompt content more fits with a current operation region of the user, and the user experience is good.

The prompt slide needs to be drawn every time the prompt content is called. If the prompt content includes too much content, drawing that prompt slider needs to consume a long time. In order to shorten the waiting time for the user, the embodiment displays the prompt content in stages, that is, the prompt content is not all presented on the prompt slider at one time, but time goes, the prompt content shown on the prompt slider is presented on the prompt slider in a gradually increasing manner.

The manner for presenting the prompt slider is illustrated below in combination with specific accompanying drawings.

Figure 74:
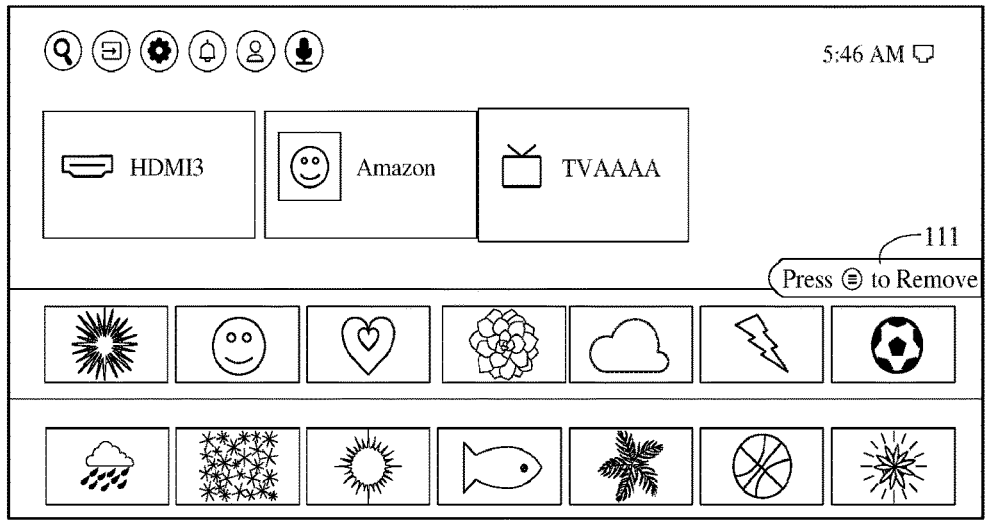
FIG. 74 is a schematic diagram of a display page according to some embodiments.

FIG. 74 is a schematic diagram of the display page according to some embodiments. In the embodiment, the prompt content shown on the prompt slider is "press to remove", and the sliding-out length of the corresponding prompt slider may just accommodate the above prompt content.

Figure 75:
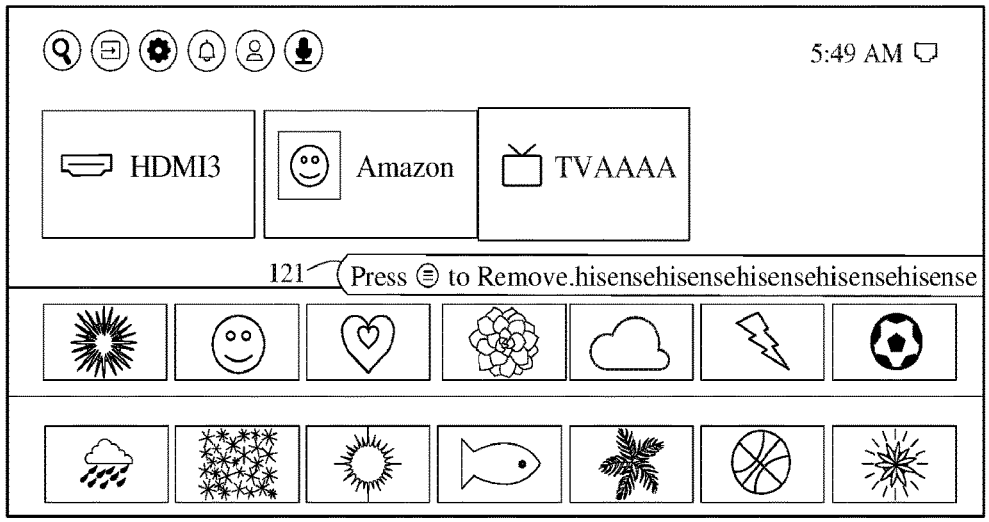
FIG. 75 is a schematic diagram of a display page according to some embodiments.

FIG. 75 is a schematic diagram of the display page according to some embodiments. In the embodiment, the prompt content shown on the prompt slider 121 is "press to remove hisense hisense hisense . . . ", and the sliding-out length of the corresponding prompt slider may just accommodate the above prompt content.

In some embodiments, a refresh rate of the prompt slider is equal to a refresh rate of the display page. Each time the prompt slider is refreshed, the prompt content shown on the prompt slider and the length of the prompt slider are updated once. In the embodiment, as the refresh rate of the prompt slider is equal to the refresh rate of the display page, it may be ensured that the prompt slider and the display page are refreshed synchronously, thereby making pictures shown on the display smooth.

Figure 76:
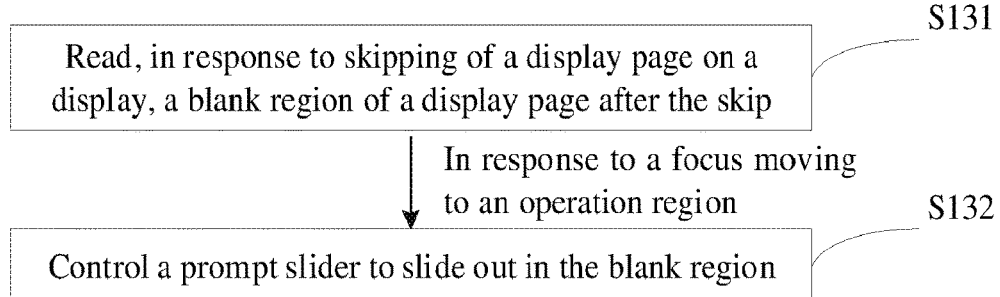
FIG. 76 is a flowchart of a manner for displaying a prompt slider according to some embodiments.

In order to prevent the prompt slider from blocking the operation region, an embodiment of the disclosure further shows a manner for presenting a prompt slider. For details, please refer to FIG. 76. FIG. 76 is a flowchart for displaying the prompt slider according to the embodiment. It can be seen that a controller is further configured to perform steps S131-S132.

S131, in response to skipping of a display page on a display, a blank region of the display page after the skip is read. The blank region is a region other than an operation region in the display page.

In the embodiment, a position of the blank region in each display page is fixed. In order to reduce calculation burden of the controller, the controller needs to re-read the blank region only in the process of refreshing the display page.

In the embodiment, the blank region is the region other than the operation region in the display page.

Figure 77:
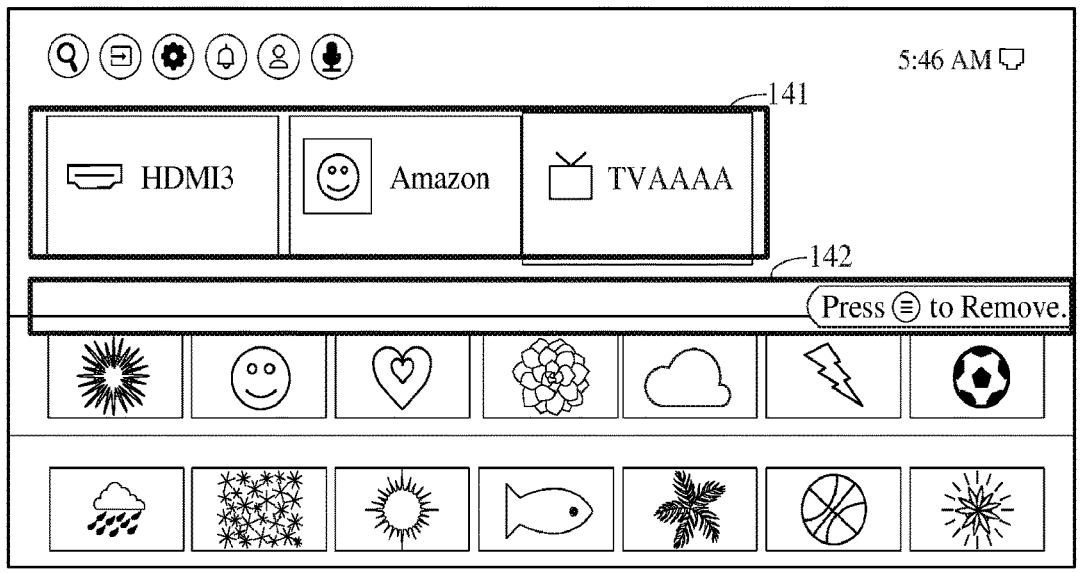
FIG. 77 is a schematic diagram of a display page according to some embodiments.

The blank region is illustrated below in combination with specific accompanying drawings. FIG. 77 is a schematic diagram of the display page according to some embodiments. In FIG. 77, a region 141 is the operation region, and a region 142 is the blank region.

FIG. 77 is merely an example to display a layout manner of the blank region and the operation region in the display page. In other embodiments, the layout of the blank region and the operation region may not limit to the above manner, and may take other forms.

S132, in response to the focus moving to the operation region, the prompt slider is controlled to slide out in the blank region.

The prompt slider slides out in the blank region, which may avoid the prompt slider from blocking the operation region, and the user experience is improved.

Figure 78:
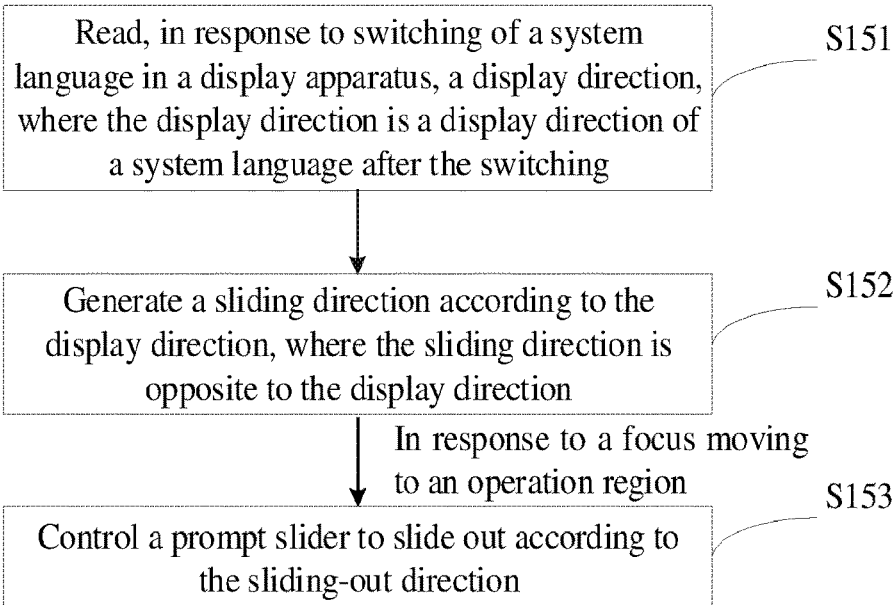
FIG. 78 is a flowchart of a manner for displaying a prompt slider according to some embodiments.

In some embodiments, in order to prevent the prompt slider from blocking the operation region, an embodiment of the disclosure further shows a manner for presenting a prompt slider. For details, please refer to FIG. 78. FIG. 78 is a flowchart of the manner for presenting the prompt slider according to the embodiment. It can be seen that a controller is further configured to execute steps S151-S153.

S151, in response to switching of a system language in a display apparatus, a display direction is read. The display direction is a display direction of a system language after the switching.

Words of most languages are displayed from left to right, and an operation region of a display suitable for these countries is also shown on the left (these languages may be referred to as a first language in the embodiment). However, words of some languages are shown from right to left, for example, Hebrew countries, Persian countries, and Arabi (these languages may be referred to as a second language in the embodiment). Since the words of these languages are shown from right to left, when a language of the display apparatus is set to the second language, the operation region is also displayed on the right.

Since the system language in the display apparatus may affect the display direction of the operation region, in the embodiment, in response to each switching of the system language in the display apparatus, the controller may read the display direction. In the embodiment, the display direction is the display direction of the system language after the switching. In the embodiment, a display manner corresponding to the first language is a left display direction, and a display manner corresponding to the second language is a right display direction.

S152, a sliding direction is generated according to the display direction. The sliding direction is opposite to the display direction.

For example, in the embodiment, if the display manner is the left display direction, the sliding-out direction is sliding out from the right, that is, a prompt slider slides from a right side of the display to a center of the display. In the embodiment, if the display manner is the right display direction, the sliding-out direction is sliding out from the left, that is, the prompt slider slides from a left side of the display to the center of the display.

S153, in response to the focus moving to the operation region, the prompt slider is controlled to slide out according to the sliding-out direction.

The sliding manner of the prompt slider is illustrated below in combination with specific accompanying drawings.

Figure 79:
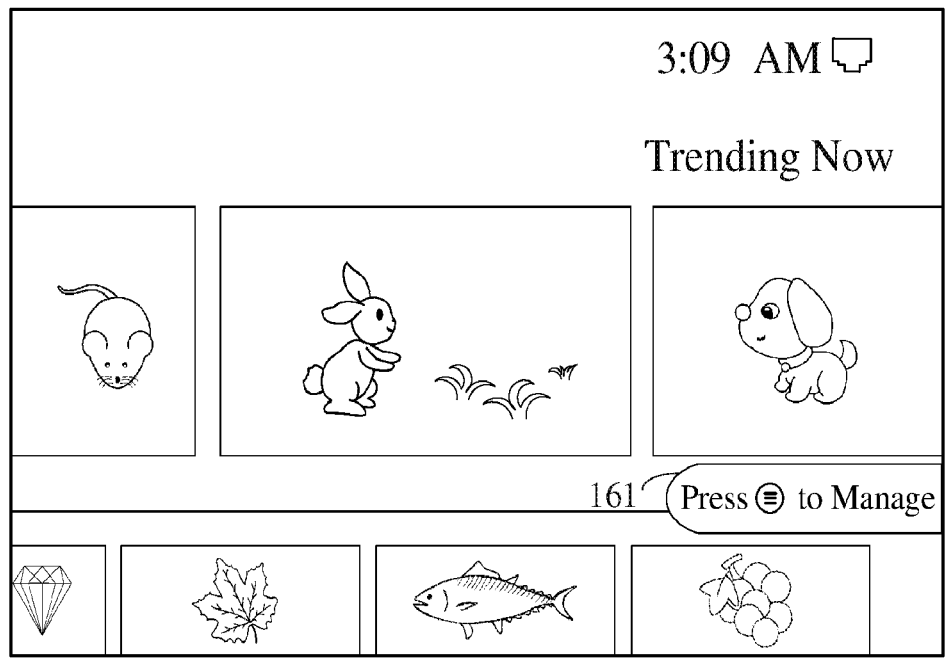
FIG. 79 is a schematic diagram of a display page according to some embodiments.

FIG. 79 is a schematic diagram of the display page according to some embodiments. In the embodiment shown in FIG. 79, the system language is the first language, the corresponding display manner is the left display direction, and a display region is arranged on the left side of the display page. In the embodiment, the prompt slider 161 slides from the right side of the display to the center of the display.

Figure 80:
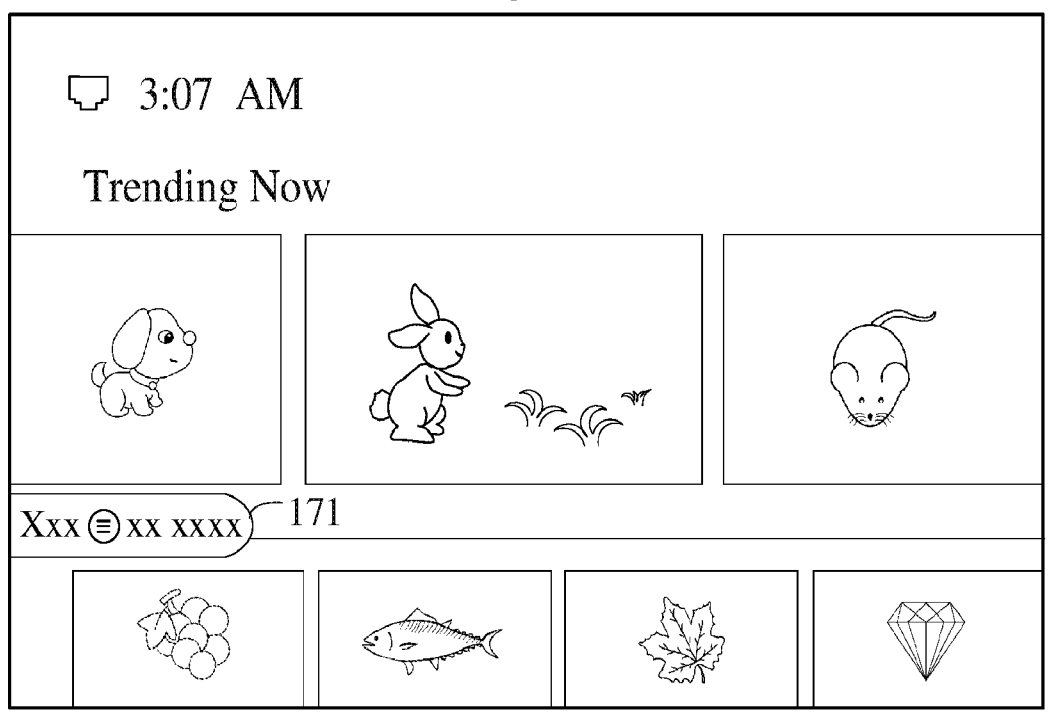
FIG. 80 is a schematic diagram of a display page according to some embodiments.

FIG. 80 is a schematic diagram of the display page according to some embodiments. In the embodiment shown in FIG. 80, the system language is the second language, the corresponding display manner is the right display direction, and a display region is arranged on the right side of the display page. In the embodiment, the prompt slider 171 slides from the left side of the display to the center of the display.

In the embodiment, the sliding-out direction of the prompt slider is opposite to the display direction of the display, which allows for reducing blocking of the prompt slider to the operation region to a certain extent, and the user experience is improved.

In order to prevent the prompt slider from being shown on the display page for a long time and affecting a viewing effect for the user, a display duration of the prompt slider may be counted. If the display duration is equal to a preset duration, the display is controlled to withdraw the prompt slider. The embodiment does not limit the preset duration, for example, in the embodiment, the preset duration may be 3 s.

In some embodiments, in order to ensure that the display apparatus may be adapted to needs of different users, users may set the sliding-out direction of the prompt slider according to their own needs. The controller is further configured to execute steps S181-S182.

S181, in response to the focus moving to the operation region, the sliding-out direction set by the user is read.

The display apparatus is provided with a sliding-out direction control, and the user may set the sliding-out direction through the sliding-out direction control. The sliding-out direction may be sliding out from top, sliding out from bottom, sliding out from left, sliding out from right, and so on.

S182, the prompt slider is controlled to slide out according to the sliding-out direction.

When the focus moves to the operation region, the controller may read the sliding-out direction set by the user, and then control the prompt slider to slide out according to the sliding-out direction. The sliding-out direction of the prompt slider may be set according to the user's preference, and the user experience is improved.

The display apparatus shown in the embodiments of the disclosure includes: the display and the controller. The controller is configured to: in response to the focus moving to the operation region, configure the prompt slider for presenting the prompt content related to the operation region; and control the display to present the prompt slider, where the prompt slider slides out from the edge of the display to the center of the display. It can be seen that the prompt content related to the operation region can be presented in the form of the prompt slider, and the prompt slider is presented in a sliding manner. The sliding prompt slider can better attract the user's attention compared with static text, and the user experience is better.

A second aspect of an embodiment of the disclosure shows a method for prompting a message. The method includes the following.

In response to a focus moving to an operation region, a prompt slider is configured, and the prompt slider is configured to present prompt content related to the operation region; and a display is controlled to present the prompt slider. The prompt slider slides out from an edge of the display towards a center of the display.

The method for prompting information shown in the embodiments of the disclosure includes: in response to a focus moving to an operation region, a prompt slider for presenting prompt content related to the operation region is configured; and a display is controlled to present the prompt slider. The prompt slider slides out from an edge of the display towards a center of the display. It can be seen that in the method for prompting the information shown in the embodiments of the disclosure, the prompt content related to the operation region may be presented in the manner of prompt slider, and the prompt slider is presented in a sliding manner. The sliding prompt slider may better attract the user's attention compared with static text, and user experience is better.

In specific implementation, the disclosure further provides a computer-readable non-transitory storage medium. The computer storage medium may store programs or instructions. The programs or instructions when executed in a processor may implement some or all steps in the above embodiments.

What is claimed is:

1. A display apparatus, comprising:
a display, configured to display an image and/or a user interface;
a user input interface, configured to receive an input signal;
a memory, configured to store instructions and data associated with the display; and
at least one processor, in connection with the display, the user input interface and the memory, and configured to execute the instructions to cause the display apparatus to:
receive a first instruction for a selector to move to a first media asset control of a plurality of media asset controls on a primary page shown on the display;
in response to content corresponding to the first media asset control being classified media assets and meeting a preset condition, send a request for previewing data corresponding to the first media asset control, wherein the preset condition comprises that a duration that the selector is located on the first media asset control reaches a preset duration or a second instruction for selecting the first media asset control is received through the selector while the selector is located on the first media asset control;

receive feedback content returned from the server according to the request for previewing data; and in response to the feedback content comprising media asset data corresponding to the first media asset control, control the display to present the media asset data on the primary page;

wherein the at least one processor is further configured to:

control the display to present a preview box on the primary page, wherein the media asset data are located in the preview box, and the preview box is presented on a side of the first media asset control;

in response to a quantity of the media asset data being less than a preset quantity, set all the media asset data in the preview box;

in response to a quantity of the media asset data being not less than a preset quantity, set some of the media asset data in the preview box, wherein an entry control for a secondary page is disposed in the preview box for accessing remaining media asset data except for said some of the media asset data in the preview box;

receive a third instruction for selecting the entry control for the secondary page; and in response to the third instruction, control the display to present the media asset data on the secondary page;

in response to an instruction for selecting media asset data from all or some of the media asset data in the preview box, play the selected media asset data, wherein the entry control for the secondary page and the media asset data, that both correspond to the first media asset control, are aligned with the plurality of media asset controls, including the first media asset control, on the primary page of the display.

2. The display apparatus according to claim 1, wherein the at least one processor is further configured to execute the instructions to cause the display apparatus to:

in response to the feedback content not comprising the media asset data, resend a request for previewing data.

3. The display apparatus according to claim 1, wherein the at least one processor is further configured to execute the instructions to cause the display apparatus to:

in response to the feedback content not comprising the media asset data, resend a request for previewing data until the resending of the request for previewing data reaches a preset threshold.

4. The display apparatus according to claim 1, wherein the at least one processor is further configured to execute the instructions to cause the display apparatus to:

in response to the feedback content not comprising the media asset data, control the display to present a prompt for a data error.

5. The display apparatus according to claim 1, wherein the at least one processor is further configured to execute the instructions to cause the display apparatus to:

in response to the content corresponding to the first media asset control being not the classified media assets and receiving a fourth instruction for selecting the first media asset control via the selector, play the media asset data corresponding to the first media asset control.

6. The display apparatus according to claim 1, wherein the at least one processor is further configured to execute the instructions to cause the display apparatus to:

receive a fifth instruction for selecting the first media asset control on a side of the preview box; and in response to the fifth instruction, control the display to present the media asset data on a secondary page.

7. The display apparatus according to claim 1, wherein the at least one processor is further configured to execute the instructions to cause the display apparatus to:

receive a sixth instruction for the selector to move to a second media asset control of the plurality of media asset controls, wherein the second media asset control is not the first media asset control and the preview box; and in response to the sixth instruction, control the preview box to retract.

8. The display apparatus according to claim 1, wherein the at least one processor is further configured to execute the instructions to cause the display apparatus to: control the preview box to retract at a preset speed.

9. A method for processing media asset data in a display apparatus, comprising:

receiving a first instruction for a selector to move to a first media asset control of a plurality of media asset controls on a primary page presented on a display of the display apparatus;

in response to content corresponding to the first media asset control being classified media assets and meeting a preset condition, sending a request for previewing data corresponding to the first media asset control, wherein the preset condition comprises that a duration that the selector is located on the first media asset control reaches a preset duration or a second instruction for selecting the first media asset control is received through the selector;

receiving feedback content returned from the server according to the request for previewing data; and in response to the feedback content comprising media asset data corresponding to the first media asset control, the display to present the media asset data on the primary page;

wherein the method further comprises:

controlling the display to present a preview box on the primary page, wherein the media asset data are located in the preview box, and the preview box is shown on a side of the first media asset control;

in response to a quantity of the media asset data being less than a preset quantity, setting all the media asset data in the preview box; and in response to the quantity of the media asset data being not less than the preset quantity, setting some of the media asset data in the preview box, wherein an entry control for a secondary page is disposed in the preview box for accessing remaining media asset data except for said some of the media asset data in the preview box;

receiving a third instruction for selecting the entry control for the secondary page; and in response to the third instruction, controlling the display to present the media asset data on the secondary page;

in response to an instruction for selecting media asset data from all or some of the media asset data in the preview box, playing the selected media asset data, wherein the entry control for the secondary page and the media asset data, that both correspond to the first media asset control, are aligned with the plurality of media asset controls, including the first media asset control, on the primary page of the display.

10. The method according to claim 9, further comprising:

in response to the feedback content not comprising the media asset data corresponding to the first media asset control, resending a request for previewing data until the resending the request for previewing data reaches a preset threshold.

11. The method according to claim 9, further comprising:
in response to the feedback content not comprising the media asset data, controlling the display to present a prompt for a data error.

12. The method according to claim 9, further comprising:
in response to the content corresponding to the first media asset control being not the classified media assets and receiving a fourth instruction for selecting the first media asset control through the selector, playing media asset data corresponding to the first media asset control.

13. The method according to claim 9, further comprising:
receiving a fifth instruction for selecting the first media asset control on a side of the preview box; and
in response to the fifth instruction, controlling the display to present the media asset data on a secondary page.

14. The method according to claim 9, further comprising:
receiving a sixth instruction for the selector to move to a second media asset control of the plurality of media asset controls, wherein the second media asset control is not the first media asset control and the preview box; and
in response to the sixth instruction, controlling the preview box to retract.

15. The method according to claim 9, further comprising:
in response to the feedback content not comprising the media asset data, resend a request for previewing data until the resending of the request for previewing data reaches a preset threshold.

16. The method according to claim 9, further comprising:
control the preview box to retract at a preset speed.

17. The display apparatus according to claim 1, wherein
the plurality of media asset controls further includes a second media asset control following the first media asset control, and
the entry control for the secondary page and the media asset data are inserted between the first and second media asset controls.

18. The display apparatus according to claim 1, wherein
the entry control for the secondary page and the media asset data are aligned with all of the plurality of media asset controls along a same direction on the primary page of the display.

19. The display apparatus according to claim 1, wherein
a height of the preview box including the entry control for the secondary page and the media asset data on the primary page is less than a height of the first media asset control.

20. The method according to claim 9, wherein
the plurality of media asset controls further includes a second media asset control following the first media asset control, and
the entry control for the secondary page and the media asset data are inserted between the first and second media asset controls.

21. The method according to claim 9, wherein
the entry control for the secondary page and the media asset data are aligned with all of the plurality of media asset controls along a same direction on the primary page of the display.

22. The method according to claim 9, wherein
a height of the preview box including the entry control for the secondary page and the media asset data on the primary page is less than a height of the first media asset control.

* * * * *